US012775447B2

(12) United States Patent
Mehendale et al.

(10) Patent No.: US 12,775,447 B2
(45) Date of Patent: Oct. 27, 2026

(54) NEURAL NETWORK PROCESSOR

(71) Applicant: Texas Instruments Incorporated, Dallas, TX (US)

(72) Inventors: Mahesh M Mehendale, Dallas, TX (US); Nagendra Gulur, Plano, TX (US); Srinivasa BS Chakravarthy, Bangalore (IN); Atul Lele, Bangalore (IN); Hetul Sanghvi, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/355,689

(22) Filed: Jul. 20, 2023

(65) Prior Publication Data

US 2024/0103875 A1 Mar. 28, 2024

Related U.S. Application Data

(60) Provisional application No. 63/407,757, filed on Sep. 19, 2022, provisional application No. 63/407,758, (Continued)

(51) Int. Cl.
*G06F 9/30* (2018.01)
*G06F 7/544* (2006.01)
(Continued)

(52) U.S. Cl.
CPC .......... *G06F 7/5443* (2013.01); *G06F 9/3004* (2013.01); *G06F 9/3814* (2013.01);
(Continued)

(58) Field of Classification Search
CPC .... G06F 7/5443; G06F 9/3004; G06F 9/3814; G06N 3/048; G06N 3/0464; G06N 3/063
See application file for complete search history.

(56) References Cited

U.S. PATENT DOCUMENTS 5,524,175 A * 6/1996 Sato ........................ G06N 3/063
706/41
11,132,195 B2 * 9/2021 Wang ...................... G06N 3/045
(Continued)

OTHER PUBLICATIONS

International Searching Authority, Search Report for PCT/US2023/032902, mailed Jan. 22, 2024, 3 pages.
(Continued)

*Primary Examiner* — Cheng Yuan Tseng
(74) *Attorney, Agent, or Firm* — Zhenhai Fu; Charles F. Koch

(57) ABSTRACT

In one example, a neural network processor comprises a memory interface, an instruction buffer, a weights buffer, an input data register, a weights register, an output data register, a computing engine, and a controller. The controller is configured to: receive a first instruction from the instruction buffer; responsive to the first instruction, fetch input data elements from the memory interface to the input data register, and fetch weight elements from the weights buffer to the weights register. The controller is also configured to: receive a second instruction from the instruction buffer; and responsive to the second instruction: fetch the input data elements and the weight elements from, respectively, the input data register and the weights register to the computing engine; and perform, using the computing engine, computation operations between the input data elements and the weight elements to generate output data elements.

24 Claims, 60 Drawing Sheets

Related U.S. Application Data filed on Sep. 19, 2022, provisional application No. 63/407,760, filed on Sep. 19, 2022.

(51) Int. Cl.

| | |
|---|---|
| ***G06F 9/38*** | (2018.01) |
| ***G06N 3/0464*** | (2023.01) |
| ***G06N 3/048*** | (2023.01) |
| ***G06N 3/063*** | (2023.01) |

(52) U.S. Cl.

CPC ........... *G06N 3/0464* (2023.01); *G06N 3/048* (2023.01); *G06N 3/063* (2013.01)

(56) References Cited

U.S. PATENT DOCUMENTS

| | | | | |
|---|---|---|---|---|
| 11,182,668 | B2 * | 11/2021 | Martin | G06N 3/063 |
| 11,681,498 | B2 * | 6/2023 | Suda | G06N 3/063 706/41 |
| 11,803,738 | B2 * | 10/2023 | Martin | G06N 3/0464 |
| 11,922,051 | B2 * | 3/2024 | Kim | G11C 11/408 |
| 11,972,137 | B2 * | 4/2024 | Kim | G11C 11/54 |
| 2020/0341758 | A1 * | 10/2020 | Wan | G06F 9/3802 |
| 2020/0380357 | A1 | 12/2020 | Yao | |
| 2021/0133583 | A1 | 5/2021 | Chetlur | |
| 2021/0174214 | A1 | 6/2021 | Venkatesan | |
| 2021/0397974 | A1 | 12/2021 | Hoang | |
| 2022/0103186 | A1 | 3/2022 | Kaminitz | |
| 2022/0138586 | A1 * | 5/2022 | Kim | G06N 3/063 |
| 2022/0207356 | A1 * | 6/2022 | Kim | G06F 17/16 |
| 2022/0245436 | A1 * | 8/2022 | Kim | G06F 17/15 |
| 2022/0261650 | A1 | 8/2022 | Zhao | |
| 2022/0284294 | A1 | 9/2022 | Keller | |
| 2022/0292366 | A1 | 9/2022 | Raha | |
| 2022/0319162 | A1 | 10/2022 | Rangachar Srinivasa | |
| 2022/0343147 | A1 * | 10/2022 | Kwon | G11C 7/1006 |
| 2023/0168894 | A1 | 6/2023 | Li | |
| 2023/0185880 | A1 | 6/2023 | Da Costa | |
| 2023/0297519 | A1 * | 9/2023 | Kim | G06F 12/0804 706/15 |
| 2023/0325656 | A1 | 10/2023 | Li | |

OTHER PUBLICATIONS

International Searching Authority, Search Report for PCT/US2023/033008, mailed Dec. 22, 2023, 3 pages.

International Searching Authority, Search Report for PCT/US2023/33012, mailed Dec. 21, 2023, 4 pages.

International Searching Authority, Written Opinion for PCT/US2023/033008, mailed Dec. 22, 2023, 8 pages.

International Searching Authority, Written Opinion for PCT/US2023/33012, mailed Dec. 21, 2023, 8 pages.

International Searching Authority, Written Report for PCT/US2023/032902, mailed Jan. 22, 2024, 8 pages.

Khan, "Programmable Address Generation Unit for Deep Neural Network Accelerators", Dec. 31, 2020, Retrieved from the Internet: URL:https://www.diva-portal.org/smash/get/diva2:1422835/FULLTEXT01.pdf, 85 pages.

Wang et al, "High-Performance Mixed-Low-Precision CNN Inference Accelerator on FPGA", IEEE Micro, vol. 41, No. 4, May 19, 2021, pp. 31-38.

* cited by examiner

400

```
402 for (n = 0 to (N_out-1))
404   for (m = 0 to (N_in-1))
406     for (i = 0 to (F_h-1))
408       for (j = 0 to (F_w-1))
410         for (h = 0 to (K_h-1))
412           for (w = 0 to (K_w-1))
                Y[n][i][j] += X[m][i+h-(Kh/2)][j+w-(Kw/2)] * F[n][m][h][w];
```

FIG. 4

24b TYPE 1 (630)

| COMPUTE TMA/BNORM/MAXPOOL | | | | ADDRESS Gen1 INPUT/OUTPUT | | | INPUT/OUTPUT FEATURE MAP | | INS TYPE (614) | LOOP/MACRO CONTROL (612) |
|---|---|---|---|---|---|---|---|---|---|---|
| [23:21] | [20:20] | [19:17] | [16:15] | [14:11] | [10:8] | [7:6] | [5:5] | [4:3] | [2:1] | [0:0] |
| SRC-wt | SRC-in | DST-TMAreg | TMA | SRC-Areg | DST-Areg | ADD/ADDI MOV | Din/Dout | LD ARin0/ ST ARout0 | 48b/24b | LOOP/ MACRO END |

602 606 640

24b TYPE 2 (632)

| COMPUTE TMA/BNORM/MAXPOOL | | | | LD WEIGHT/BIAS/ Scale-shft WITH/WITHOUT POST INCREMENT | | | RESERVED | INSTR FORMAT EXTEND | INS TYPE (614) | LOOP/MACRO CONTROL (612) |
|---|---|---|---|---|---|---|---|---|---|---|
| [23:21] | [20:20] | [19:17] | [16:14] | [13:13] | [12:10] | [9:7] | ins[6:4] | ins[3:3] | [2:1] | [0:0] |
| SRC-wt | SRC-in | DST-TMAreg | TMA | SRC-Areg | DST-TMAreg | LD | | TYPE 2 | 48b/24b | LOOP/ MACRO END |

602 608'

FIG. 6C

24b TYPE 3 (634)

| PROGRAM CONTROL INSTRUCTIONS (640) | | | RESERVED | INSTR FORMAT EXTEND | INS TYPE (614) | LOOP/MACRO CONTROL (612) |
|---|---|---|---|---|---|---|
| [23:19] | [19:9] | [8:6] | [6:4] | [3:3] | [2:1] | [0:0] |
| REPEAT COUNT' | PC | STOP/BreakPt/ MACRO-START | | TYPE 3 | 48b/24b | LOOP/ MACRO END |

24b TYPE 4 (636)

| ADDRESS Gen2 INPUT/OUTPUT/WT/BIAS/SS/LS (604) | | | ADDRESS Gen1 INPUT/OUTPUT (606) | | | RESERVED | INS TYPE (614) | LOOP/MACRO CONTROL (612) |
|---|---|---|---|---|---|---|---|---|
| [23:20] | [19:16] | [15:13] | [12:9] | [8:6] | [5:4] | [3:3] | [2:1] | [0:0] |
| SRC-Areg | DST-Areg | ADD/SUB/ MOV | SRC-Areg | DST-Areg | ADD/ADDI/ MOV | | 48b/24b | LOOP/ MACRO END |

FIG. 6D

700

| 702 | 704 | 706 | 708 | 710 | 712 |
|---|---|---|---|---|---|
| 0 | LD Din0 ARin0 | LDWT Wt0 ARwt0 | ADDI ARin0 #1 | ADDI ARwt0 #1 | |
| 1 | | | | | |
| 2 | | LDWT Wt1 ARwt0 | | ADDI ARwt0 #1 | MAC MACreg0 Din0 Wt0L |
| 3 | LD Din1 ARin0 | | ADDI ARin0 #1 | | MAC MACreg1 Din0 Wt0H |
| 4 | | LDWT Wt0 ARwt0 | | ADDI ARwt0 #1 | MAC MACreg2 Din0 Wt1L |
| 5 | | | | | MAC MACreg3 Din0 Wt1H |
| 6 | | LDWT Wt1 ARwt0 | | ADDI ARwt0 #1 | MAC MACreg4 Din0 Wt0L |
| 7 | | | | | MAC MACreg5 Din0 Wt0H |
| 8 | | LDWT Wt0 ARwt0 | | ADDI ARwt0 #1 | MAC MACreg6 Din0 Wt1L |
| 9 | | | | | MAC MACreg7 Din0 Wt1H |
| 10 | | LDWT Wt1 ARwt0 | | ADDI ARwt0 #1 | MAC MACreg0 Din1 Wt0L |
| 11 | LD Din0 ARin0 | | ADDI ARin0 #1 | | MAC MACreg1 Din1 Wt0H |
| 12 | | LDWT Wt0 ARwt0 | | ADDI ARwt0 #1 | MAC MACreg2 Din1 Wt1L |
| 13 | | | | | MAC MACreg3 Din1 Wt1H |
| 14 | | LDWT Wt1 ARwt0 | | ADDI ARwt0 #1 | MAC MACreg4 Din1 Wt0L |
| 15 | | | | | MAC MACreg5 Din1 Wt0H |
| 16 | | LDWT Wt0 ARwt0 | | ADDI ARwt0 #1 | MAC MACreg6 Din1 Wt1L |
| 17 | | | | | MAC MACreg7 Din1 Wt1H |
| 18 | | LDWT Wt1 ARwt0 | | ADDI ARwt0 #1 | MAC MACreg0 Din0 Wt0L |
| 19 | LD Din1 ARin0 | | ADDI ARin0 #1 | | MAC MACreg1 Din0 Wt0H |
| 20 | | LDWT Wt0 ARwt0 | | ADDI ARwt0 #1 | MAC MACreg2 Din0 Wt1L |
| 21 | | | | | MAC MACreg3 Din0 Wt1H |
| 22 | | LDWT Wt1 ARwt0 | | ADDI ARwt0 #1 | MAC MACreg4 Din0 Wt0L |
| 23 | | | | | MAC MACreg5 Din0 Wt0H |
| 24 | | • • • | | • • • | MAC MACreg6 Din0 Wt1L |
| 25 | | | | | MAC MACreg7 Din0 Wt1H |
| 26 | | | | | MAC MACreg0 Din1 Wt0L |
| 27 | | | | | MAC MACreg1 Din1 Wt0H |
| | | | | | MAC MACreg2 Din1 Wt1L |
| | | | | | MAC MACreg3 Din1 Wt1H |
| | | | | | • • • |

FIG. 7

T2

806 → (row 1)
804 → (row 3)

| | | | |
|---|---|---|---|
| fm1_01c0 | fm1_01c1 | fm1_01c2 | fm1_01c3 |
| fm0_01c0 | fm0_01c1 | fm0_01c2 | fm0_01c3 |
| fm0_02c0 | fm0_02c1 | fm0_02c2 | fm0_02c3 |
| fm0_03c0 | fm0_03c1 | fm0_03c2 | fm0_03c3 |
| fm0_04c0 | fm0_04c1 | fm0_04c2 | fm0_04c3 |
| fm0_05c0 | fm0_05c1 | fm0_05c2 | fm0_05c3 |
| fm0_06c0 | fm0_06c1 | fm0_06c2 | fm0_06c3 |
| fm0_07c0 | fm0_07c1 | fm0_07c2 | fm0_07c3 |
| fm0_08c0 | fm0_08c1 | fm0_08c2 | fm0_08c3 |
| fm0_09c0 | fm0_09c1 | fm0_09c2 | fm0_09c3 |
| fm0_10c0 | fm0_10c1 | fm0_10c2 | fm0_10c3 |
| fm0_11c0 | fm0_11c1 | fm0_11c2 | fm0_11c3 |
| fm0_12c0 | fm0_12c1 | fm0_12c2 | fm0_12c3 |
| fm0_13c0 | fm0_13c1 | fm0_13c2 | fm0_13c3 |
| fm0_14c0 | fm0_14c1 | fm0_14c2 | fm0_14c3 |
| fm0_15c0 | fm0_15c1 | fm0_15c2 | fm0_15c3 |
| fm1_00c0 | fm1_00c1 | fm1_00c2 | fm1_00c3 |

T3

806 → (row 15)

| | | | |
|---|---|---|---|
| fm1_01c0 | fm1_01c1 | fm1_01c2 | fm1_01c3 |
| fm1_02c0 | fm1_02c1 | fm1_02c2 | fm1_02c3 |
| fm1_03c0 | fm1_03c1 | fm1_03c2 | fm1_03c3 |
| fm1_04c0 | fm1_04c1 | fm1_04c2 | fm1_04c3 |
| fm1_05c0 | fm1_05c1 | fm1_05c2 | fm1_05c3 |
| fm1_06c0 | fm1_06c1 | fm1_06c2 | fm1_06c3 |
| fm1_07c0 | fm1_07c1 | fm1_07c2 | fm1_07c3 |
| fm1_08c0 | fm1_08c1 | fm1_08c2 | fm1_08c3 |
| fm1_09c0 | fm1_09c1 | fm1_09c2 | fm1_09c3 |
| fm1_10c0 | fm1_10c1 | fm1_10c2 | fm1_10c3 |
| fm1_11c0 | fm1_11c1 | fm1_11c2 | fm1_11c3 |
| fm1_12c0 | fm1_12c1 | fm1_12c2 | fm1_12c3 |
| fm1_13c0 | fm1_13c1 | fm1_13c2 | fm1_13c3 |
| fm1_14c0 | fm1_14c1 | fm1_14c2 | fm1_14c3 |
| fm1_15c0 | fm1_15c1 | fm1_15c2 | fm1_15c3 |
| | | | |
| fm1_00c0 | fm1_00c1 | fm1_00c2 | fm1_00c3 |

FIG. 8B

900

902

T0

| | | | | | | | |
|---|---|---|---|---|---|---|---|
| fm0_00c0 | fm0_00c1 | fm0_00c2 | fm0_00c3 | fm0_00c4 | fm0_00c5 | fm0_00c6 | fm0_00c7 |
| fm0_01c0 | fm0_01c1 | fm0_01c2 | fm0_01c3 | fm0_01c4 | fm0_01c5 | fm0_01c6 | fm0_01c7 |
| fm0_02c0 | fm0_02c1 | fm0_02c2 | fm0_02c3 | fm0_02c4 | fm0_02c5 | fm0_02c6 | fm0_02c7 |
| fm0_03c0 | fm0_03c1 | fm0_03c2 | fm0_03c3 | fm0_03c4 | fm0_03c5 | fm0_03c6 | fm0_03c7 |
| fm0_04c0 | fm0_04c1 | fm0_04c2 | fm0_04c3 | fm0_04c4 | fm0_04c5 | fm0_04c6 | fm0_04c7 |
| fm0_05c0 | fm0_05c1 | fm0_05c2 | fm0_05c3 | fm0_05c4 | fm0_05c5 | fm0_05c6 | fm0_05c7 |
| fm0_06c0 | fm0_06c1 | fm0_06c2 | fm0_06c3 | fm0_06c4 | fm0_06c5 | fm0_06c6 | fm0_06c7 |
| fm0_07c0 | fm0_07c1 | fm0_07c2 | fm0_07c3 | fm0_07c4 | fm0_07c5 | fm0_07c6 | fm0_07c7 |
| fm0_08c0 | fm0_08c1 | fm0_08c2 | fm0_08c3 | fm0_08c4 | fm0_08c5 | fm0_08c6 | fm0_08c7 |
| ⋮ | | | | | | | |
| fm0_24c0 | fm0_24c1 | fm0_24c2 | fm0_24c3 | fm0_24c4 | fm0_24c5 | fm0_24c6 | fm0_24c7 |

T1

902

| | | | | | | | |
|---|---|---|---|---|---|---|---|
| fm0_25c0 | fm0_25c1 | fm0_25c2 | fm0_25c3 | fm0_25c4 | fm0_25c5 | fm0_25c6 | fm0_25c7 |
| fm0_26c0 | fm0_26c1 | fm0_26c2 | fm0_26c3 | fm0_26c4 | fm0_26c5 | fm0_26c6 | fm0_26c7 |
| fm0_27c0 | fm0_27c1 | fm0_27c2 | fm0_27c3 | fm0_27c4 | fm0_27c5 | fm0_27c6 | fm0_27c7 |
| fm0_03c0 | fm0_03c1 | fm0_03c2 | fm0_03c3 | fm0_03c4 | fm0_03c5 | fm0_03c6 | fm0_03c7 |
| fm0_04c0 | fm0_04c1 | fm0_04c2 | fm0_04c3 | fm0_04c4 | fm0_04c5 | fm0_04c6 | fm0_04c7 |
| fm0_05c0 | fm0_05c1 | fm0_05c2 | fm0_05c3 | fm0_05c4 | fm0_05c5 | fm0_05c6 | fm0_05c7 |
| fm0_06c0 | fm0_06c1 | fm0_06c2 | fm0_06c3 | fm0_06c4 | fm0_06c5 | fm0_06c6 | fm0_06c7 |
| fm0_07c0 | fm0_07c1 | fm0_07c2 | fm0_07c3 | fm0_07c4 | fm0_07c5 | fm0_07c6 | fm0_07c7 |
| fm0_08c0 | fm0_08c1 | fm0_08c2 | fm0_08c3 | fm0_08c4 | fm0_08c5 | fm0_08c6 | fm0_08c7 |
| ⋮ | | | | | | | |
| fm0_24c0 | fm0_24c1 | fm0_24c2 | fm0_24c3 | fm0_24c4 | fm0_24c5 | fm0_24c6 | fm0_24c7 |

T2

| | | | | | | | |
|---|---|---|---|---|---|---|---|
| fm0_25c0 | fm0_25c1 | fm0_25c2 | fm0_25c3 | fm0_25c4 | fm0_25c5 | fm0_25c6 | fm0_25c7 |
| fm0_26c0 | fm0_26c1 | fm0_26c2 | fm0_26c3 | fm0_26c4 | fm0_26c5 | fm0_26c6 | fm0_26c7 |
| fm0_27c0 | fm0_27c1 | fm0_27c2 | fm0_27c3 | fm0_27c4 | fm0_27c5 | fm0_27c6 | fm0_27c7 |
| fm0_28c0 | fm0_28c1 | fm0_28c2 | fm0_28c3 | fm0_28c4 | fm0_28c5 | fm0_28c6 | fm0_28c7 |
| fm0_29c0 | fm0_29c1 | fm0_29c2 | fm0_29c3 | fm0_29c4 | fm0_29c5 | fm0_29c6 | fm0_29c7 |
| fm0_30c0 | fm0_30c1 | fm0_30c2 | fm0_30c3 | fm0_30c4 | fm0_30c5 | fm0_30c6 | fm0_30c7 |
| fm0_06c0 | fm0_06c1 | fm0_06c2 | fm0_06c3 | fm0_06c4 | fm0_06c5 | fm0_06c6 | fm0_06c7 |
| fm0_07c0 | fm0_07c1 | fm0_07c2 | fm0_07c3 | fm0_07c4 | fm0_07c5 | fm0_07c6 | fm0_07c7 |
| fm0_08c0 | fm0_08c1 | fm0_08c2 | fm0_08c3 | fm0_08c4 | fm0_08c5 | fm0_08c6 | fm0_08c7 |
| ⋮ | | | | | | | |
| fm0_24c0 | fm0_24c1 | fm0_24c2 | fm0_24c3 | fm0_24c4 | fm0_24c5 | fm0_24c6 | fm0_24c7 |

902

FIG. 9

2610

```
CMP-hi:
if (signed-data) { sign-extend Din and Dout }
else {pre-pend 0 to Din and Dout) }
if ((Din > Dout) .OR. (instr == 'assgn')) {
   mux-cntrl = 1; cmp-res = 'GT'}
else if (Din == Dout) { mux-cntrl = 0; cmp-res = 'EQ'}
else { mux-cntrl = 0; cmp-res = 'LT'}
```

2612

```
CMP-lo:
if (signed-data && 4b-data) { sign-extend Din and Dout }
else {pre-pend 0 to Din and Dout) }
if (4b-data) {
   if ((Din > Dout) .OR. (instr == 'assgn')) {mux-cntrl = 1} else {mux-cntrl = 0)
} else {
   if ((cmp-res == GT) .OR. ((cmp-res == EQ) && (Din > Dout))) {mux-cntrl = 1}
   else {mux-cntrl = 0}
}
```

FIG. 26B

NEURAL NETWORK PROCESSOR

CROSS-REFERENCE TO RELATED APPLICATIONS

This application claims priority to: (a) U.S. Provisional Patent Application No. 63/407,757, titled “Programmable HWA for Deep Neural Networks”, filed Sep. 19, 2022; (b) U.S. Provisional Patent Application No. 63/407,760, titled “Configurable and Scalable MAC engine for Reduced Precision Deep Neural Networks”, filed Sep. 19, 2022; and (c) U.S. Provisional Patent Application No. 63/407,758, titled “Post processing Hardware Engine for Reduced Precision DNNs”, filed Sep. 19, 2022, all of which are incorporated herein by reference in their entireties.

BACKGROUND

Artificial neural networks are computing systems with an architecture based on biological neural networks. Artificial neural networks can be trained in a training process, using training data, to learn about how to perform a certain computing task. Artificial neural networks can be implemented on a neural network processor, which can include memory and computation resources to support computation operations of artificial neural networks. Certain applications may impose limit on the amounts of memory and computation resources available on the neural network hardware accelerator.

SUMMARY

In one example, a neural network processor is provided. The neural network processor comprises a memory interface, an instruction buffer, a weights buffer, an input data register, a weights register, an output data register, a computing engine, and a controller. The controller is configured to receive a first instruction from the instruction buffer, and responsive to the first instruction: fetch input data elements from the memory interface to the input data register, and fetch weight elements from the weights buffer to the weights register. The controller is also configured to receive a second instruction from the instruction buffer, and responsive to the second instruction: fetch the input data elements and the weight elements from, respectively, the input data register and the weights register to the computing engine, perform, using the computing engine, computation operations between the input data elements and the weight elements to generate output data elements, and store the output data elements at the output data register.

In one example, a method is provided. The method comprises receiving a first instruction from an instruction buffer of a neural network processor, and responsive to the first instruction: fetching input data elements from a memory external to the neural network processor to an input data register of the neural network processor; and fetching weight elements from a weights buffer of the neural network processor to the a weights register of the neural network processor. The method further comprises: receiving a second instruction from the instruction buffer, and responsive to the second instruction: fetching the input data elements and the weight elements from, respectively, the input data register and the weights register to a computing engine of the neural network processor, performing, using the computing engine, computation operations between the input data elements and the weight elements to generate output data elements, and storing the output data elements at an output data register of the neural network processor.

In one example, a neural network processor comprises a memory interface, an instruction buffer, a weights buffer, an input data register, a weights register, an output data register, address registers, an address generation engine, a data load/store engine, a computing engine, and a controller. The address generation engine is configurable to set input data addresses, output data addresses, and weights addresses in the address registers. The data load/store engine is configurable to fetch input data from the memory interface to the input data register based on the input data addresses, fetch output data from the output data register to the memory interface based on the output data addresses, and fetch weights from the weights buffer to the weights register based on the weight addresses. The computing engine is configurable to perform computations based on the input data and the weights to generate the output data. The controller is configured to, responsive to one or more instructions from the instruction buffer: extract a first sub-instruction directed to the address generation engine to set one of the input data addresses or the output data addresses, extract a second sub-instruction directed to the address generation engine to set the weights addresses, extract a third sub-instruction directed to the computing engine to perform the computations, extract a fourth sub-instruction directed to the data load/store engine to fetch the weights at the weight addresses of the weights buffer, extract a fifth sub-instruction directed to the data load/store engine to fetch the input data at the input data addresses via the memory interface, and configure the address generation engine with the first and second sub-instructions, the computing engine with the third sub-instruction, and the data load/store engine with the fourth and fifth instructions in parallel.

BRIEF DESCRIPTION OF THE DRAWINGS

FIG. 2, FIG. 3, and FIG. 4 are schematics and charts that illustrate examples of data processing operations performed by electronic devices of the system of FIG. 1, according to some examples.

FIGS. 6A, 6B, 6C and 6D are charts illustrating examples of instructions executable by the neural network processor of FIG. 5, according to some examples.

FIG. 7 includes a chart illustrating a set of instructions executable by the neural network processor of FIG. 5, according to some examples.

FIGS. 8A, 8B, and 9 are charts illustrating memory management schemes provided by the neural network processor of FIG. 5, according to some examples.

FIGS. 21A-1, 21A-2, 21B-1, 21B-2, 21C-1, 21C-2, 21D-1, 21D-2, 21E-1, 21E-2, 21F-1, 21F-2, 21G-1, 21G-2, 21H-1, and 21H-2 are schematics illustrating different configurations of the computing engine of FIG. 13 for different input and weight precisions, according to some examples.

FIGS. 26A-1, 26A-2, and 26B are schematics and charts illustrating internal components of the max pooling engine of FIG. 13 and their operations, according to some examples.

The same reference numbers are used in the drawings to designate the same (or similar) features.

DETAILED DESCRIPTION

Figure 1:
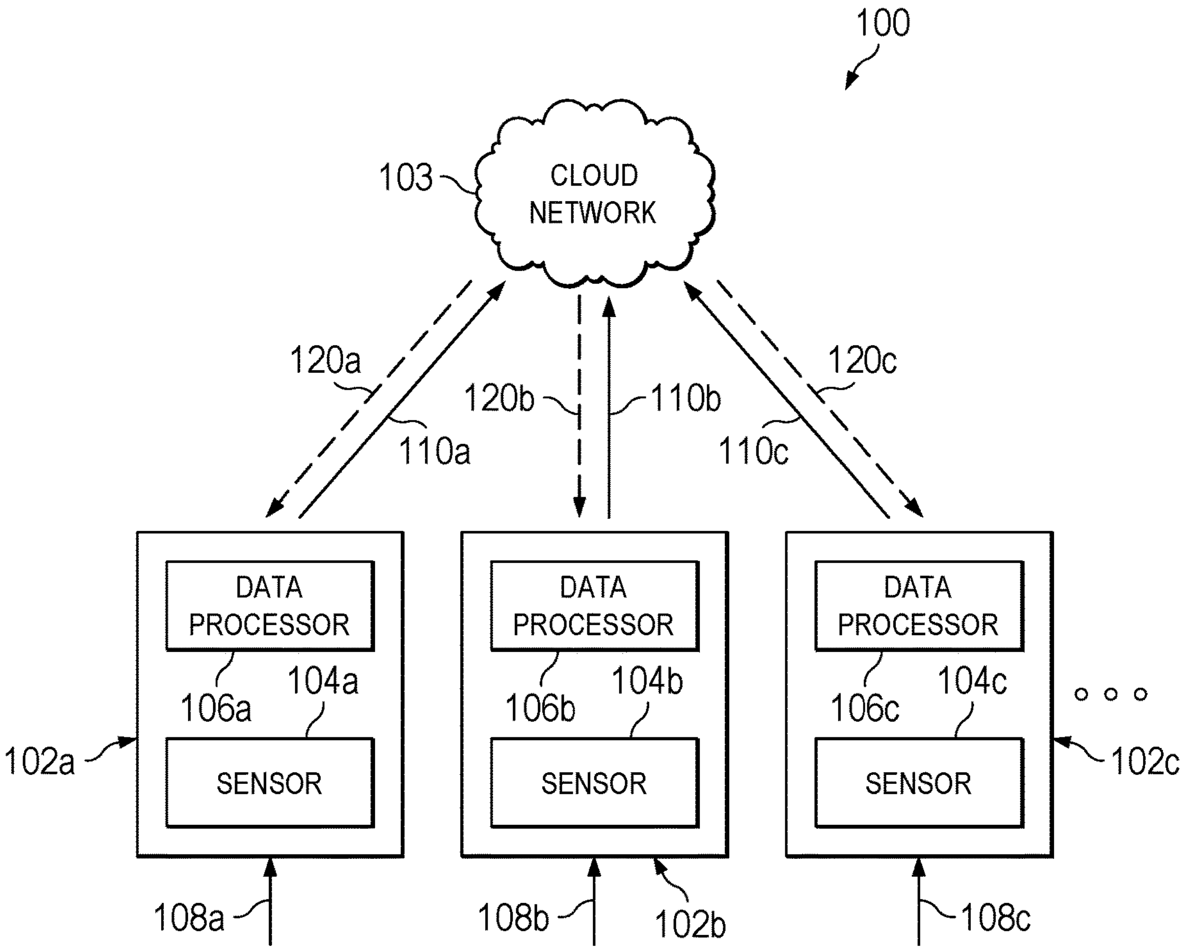
FIG. 1 is a schematic diagram illustrating a system in which inferencing operations can be performed, according to some examples.

FIG. 1 is a schematic diagram illustrating a system 100. System 100 can include multiple electronic devices 102, including electronic devices 102*a*, 102*b*, and 102*c*., and a cloud network 103. Each electronic device 102 can include a sensor 104 and a data processor 106. For example, electronic device 102*a* includes sensor 104*a* and data processor 106*a*, electronic device 102*b* includes sensor 104*b* and data processor 106*b*, and electronic device 102*c* includes sensor 104*c* and data processor 106*c*. Sensor 104 can be of various types, such as audio/acoustic sensors, motion sensor, image sensors, etc. In some examples, each electronic device 102 can include multiple sensors of different types (e.g., acoustic sensor and motion sensor), or multiple instances of the same type of sensors (e.g., multiple microphones). Each sensor system can receive a stimulus 108 (e.g., acoustic signal, light signal, motion, etc.) and generate a decision 110 based on the received stimulus. The decision can indicate, for example, whether an event of interest is detected. For example, electronic device 102*a* can generate decision 110*a* based on stimulus 108*a*, electronic device 102*b* can generate decision 110*b* based on stimulus 108*b*, and electronic device 102*c* can generate decision 110*c* based on stimulus 108*c*. In some examples, each electronic device 102 can be an Internet-of-Things (IoT) end node, and can be edge devices of network 103. Each electronic device 102 can transmit its respective decision 110 to cloud network 103, which can then perform operations based on the decisions (e.g., transmitting an alert about an abnormal event, contacting law enforcement agencies, etc.).

Data processor 106 of a particular electronic device 102 can perform data processing operations on the data collected by sensor 104 on the particular electronic device to generate decision 110. For example, in examples where sensor 104 includes an audio/acoustic sensor, data processor 106 can perform data processing operations such as keyword spotting, voice activity detection, and detection of a particular acoustic signature (e.g., glass break, gunshot). Also, in examples where sensor 104 includes a motion sensor, data processor 106 can perform data processing operations such as vibration detection, activity recognition, and anomaly detection (e.g., whether a window/a door is hit or opened when no one is at home or in night time). Further, in examples where sensor 104 includes an image sensor data processor 106 can perform data processing operations such as face recognition, gesture recognition, and visual wake word detection (e.g., determining whether a person is present in an environment). Data processor 106 can also generate and output decision 110 based on the result of the data processing operations including, for example, detection of a keyword in a speech, detection of a particular acoustic signature, a particular activity, a particular gesture, etc. In a case where electronic device 102 includes multiple sensors, data processor 106 can perform a sensor fusion operation on the different types of sensor data to generate decision 110.

Data processor 106 can include various circuitries to process the sensor signal generated by sensor 104. For example, data processor 106 may include sample and hold (S/H) circuits to sample sensor signal. Data processor 106 may also include analog-to-digital converters (ADCs) to quantize the samples into digital signals. Data processor 106 can also include a neural network processor to implement an artificial neural network to process the samples. An artificial neural network (herein after "neural network") may include multiple processing nodes. The neural network can perform an inferencing operation or a classification operation on the sensor data to generate the aforementioned decision. The inferencing operation can be performed by combining the sensor data with a set of weight elements, which are obtained from a neural network training operation, to generate the decision. Examples of neural networks can include a deep neural network (DNN), a convolutional neural network (CNN), etc.

The processing nodes of a neural network can be divided into layers including, for example, an input layer, a number of intermediate layers (e.g., hidden layers), and an output layer. The input layer and the intermediate layers can each be a convolution layer forming CNN, whereas the output layer can be a fully-connected layer, and the input layer, intermediate layer, and the output layer together form a DNN. Each processing node of the input layer receives an element of an input set, and scales the element with a weight element to indicate the element's degree of influence on the output. The input set may include, for example, acoustic data, motion data, image data, a combination of different types of data, or a set of input features extracted from those data. Also, the processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The intermediate output can represent output features of a particular immediate layer. The output layer may generate a sum of the scaled intermediate outputs from the final intermediate layer. In some examples, the output layer may generate a binary output (e.g., "yes" or "no") based on whether the sum of the scaled intermediate outputs exceeds a threshold, which can indicate a decision from the data processing operation (e.g., detection of a keyword in a speech, detection of a particular acoustic signature, a particular activity, a particular gesture).

The neural network processor of data processor 106 can be programmed to perform computations based on an artificial neural network model. The neural network processor can be programmed based on a sequence of instructions that include computation operations (e.g., adding, multiplication, processing of activation function, etc.) associated with the model. The instructions may also access internal and external memory devices to obtain and store data. A compiler may receive information about the neural network model, the input data, and the available memory and computation resources, and generate the set of instructions to indicate, for example, when to access the internal and external memory devices for the data, which component of the neural network processor to perform computations on the data based on the neural network model, etc., to perform the neural network processing. In the example of FIG. 1, the data processor 106 of each electronic device 102 can receive data 120 (e.g., 120*a*, 120*b*, and 120*c*) including, for example, a set of weight elements, compiled instructions representing each layer of a neural network model, etc., from cloud network 103. In some examples, the neural network processor of each electronic device 102 can perform training operations to adjust the initial weight elements. In some examples, the training operations can also be performed at cloud network 103, and each electronic device 102 can receive updated weight elements from clouding network 103 and performs inferencing/classification operations using the updated weights.

Figure 2:
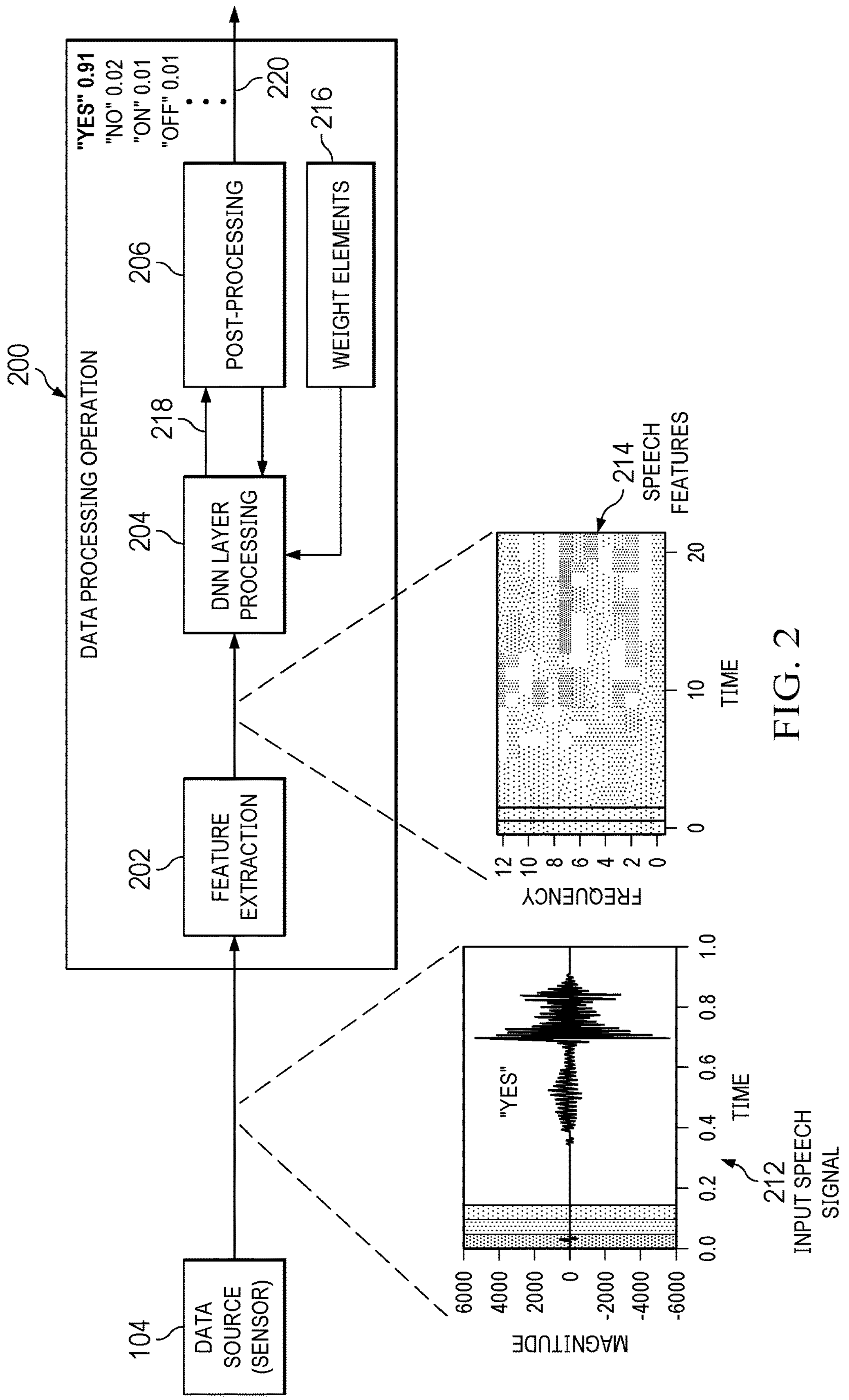
Figure 3:
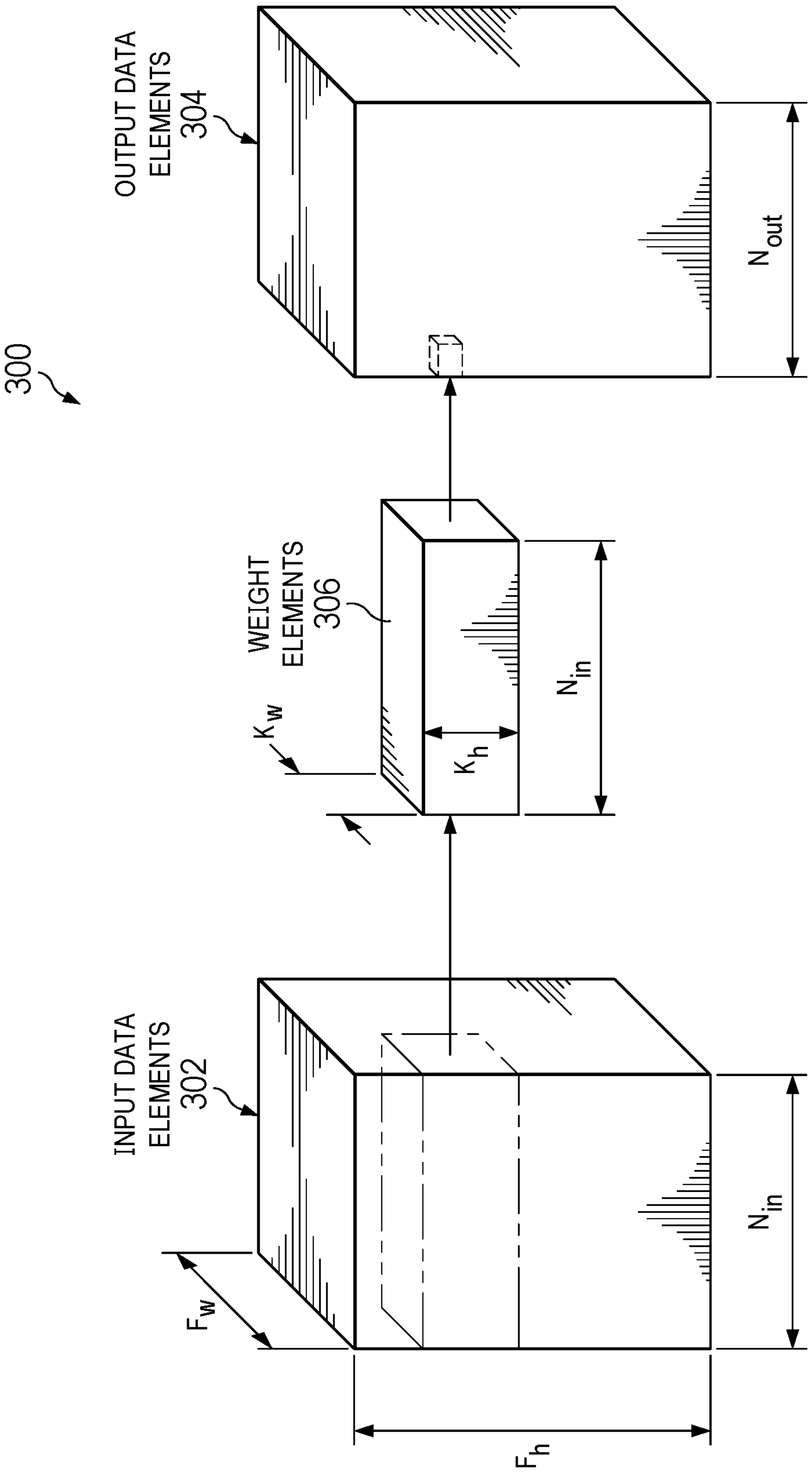

FIG. 2, FIG. 3, and FIG. 4 are schematics that illustrate examples of data processing operations performed by electronic device 102 in processing acoustic signals. FIG. 2 illustrates an example data processing operation 200 to identify words in speech. The example data processing operation includes a feature extraction operation 202, a DNN layer processing operation 204, and a post processing operation 206. As part of feature extraction operation 202, data processor 106 can receive samples of acoustic signal 212 from sensor 104, and extract features 214 from the samples. The acoustic signal can represent a speech signal having a magnitude/power level that varies with time. Also, features 214 can include discriminating characteristics of acoustic signal from which the subsequent processing operations (e.g., DNN layer processing operation 204 and post processing operation 206) can identify words in a speech. In the example of FIG. 2, features 214 can include a time-frequency distribution of signal power. In some examples, feature extraction operation 202 can include convolution operations, which can be performed by a neural network processor that implements a CNN, a general purpose processor (e.g., a microcontroller), a computation-in-memory (CIM) circuit, etc., of data processor 106.

Also, as part of DNN layer processing operation 204, data processor 106 can process features 214 using a multi-layer DNN and a sets of weight elements 216 and compute a set of outputs 218. Post processing operation 206 can post-process and quantize outputs 218 to generate inferencing outputs 220. The post processing operation can include, for example, activation function processing to map outputs 218 to the set of inferencing outputs, as well as other post processing operations such as batch normalization (batch norm, or BNorm) and residual layer processing to facilitate convergence in training. Inferencing outputs 220 can include a set of probabilities for a set of candidate words. In the example of FIG. 2, inferencing outputs 220 can map the candidate word "Yes" with a probability of 0.91, "No" with a probability of 0.02, and other words with probability of 0.01. In some examples, as part of post processing operation 206, a decision that speech signal 212 includes the word "Yes" can also be made based on the candidate word "Yes" is mapped to the highest probability among the candidate words. In some examples, as shown in FIG. 2, the output of post processing operation 206, which can represent the output of a neural network layer, can be fed back into DNN layer processing operation 204 as input to another neural network layer.

FIG. 3 illustrates examples of an example processing operation 300 that can be part of DNN layer processing operation 204 of FIG. 2. In FIG. 3, processing operation 300 can be a convolution operation performed by a neural network layer on a set of input data elements 302 to generate a set of output data elements 304. The input data elements 302 and the output data elements 304 can each be in the form of a multi-dimensional array including a first dimension (input height), a second dimension (input width), and a third dimension (input channel). The array of input data elements 302 can have a height $F_h$, a width $F_w$, and have $N_{in}$ number of input channels. For example, input data elements 302 can represent features 214, where the first dimension can represent time, the second dimension can represent frequency, and the third dimension can represent a data channel (or channel). The channel can represent a data source. For example, in a case where input data elements 302 are audio data generated by multiple microphones, data generated from a particular microphone can be associated with a particular data channel. As another example, in a case where input data elements 302 are image data generated by image sensor of different color channels (e.g., red, green, and blue), data generated for a particular color channel can be associated with a particular data channel.

To perform a convolution operation to compute one output data element (e.g., output data element 304*a*), data processor 106 can compute a dot product between a set of weight elements 306 and a subset of the input data elements 302. In the example of FIG. 3, weight elements 306 can also be a multi-dimensional array having a weight height $K_h$, a weight width $K_w$, and also $N_{in}$ number of input channels. The set of weight elements 306 can be moved with respect to the set of input data elements 302 by strides D to overlap with different subsets of the input data elements 302. Different dot products (and different output data element 304)

can be computed between the set of weight elements 306 and the different overlapping subsets of input data elements 302 at different strides as follows:

$$Y_{e,f}=\sum_{r=0}^{Kw-1}\sum_{s=0}^{Kh-1}\sum_{c=0}^{Nin-1}X^{c}_{eD+r,fD+s}\times F^{c}_{r,s} \quad \text{(Equation 1)}$$

In Equation 1, r represents an index along the width dimension, s represents an index along the height dimension, and c represents an index along the input channel dimension. Also, $X^{c}_{eD+r,fD+s}$ represents an input data element 302 of input channel c and having indices eD+r along the width dimension and fD+s along the height dimension, where e and f are multiples of stride D, $F^{c}_{r,s}$ represents a weight data element 306 having indices r along the width dimension and s along the height dimension, and $Y_{e,f}$ represents an output data element 304 having indices e along the width dimension and f along the height dimension. In some examples, data processor 106 can perform convolution operation between input data elements 302 with multiple sets of weight elements 306 to generate output data elements 304 having $N_{out}$ number of output channels, where convolution between input data elements and one set of weight elements 306 can generate output data elements 304 of a particular output channel.

FIG. 4 illustrates an example of a set of loop instructions 400. In some examples, loop instructions 400 can represent part of the processing operation 300 of FIG. 3, or other processing operations, performed by one neural network layer. For example, the set of loop instructions 400 can represent part of a convolution operation at a particular stride D. The neural network processor of data processor 106 can execute the set of loop instructions to compute the multi-dimensional array of output data elements 304 having $N_{out}$ number of output channels from input data elements 302 and multiple sets of weight elements 306. Loop instructions 400 can represent a nested loop structure including the outermost loops 402 and 404 that sweep through ranges of indices in the output channel (n between 0 to $N_{out}-1$) and input channel (m between 0 to $N_{in}-1$) dimensions, middle loops 406 and 408 that sweep through ranges of indices in the input height (i between 0 to $F_h-1$) and input width (j between 0 to $F_w-1$) dimensions, and innermost loops 410 and 412 that sweep through ranges of indices in the weight filter/kernel height (h between 0 to $K_h-1$) and weight width (w between 0 to $K_w-1$) dimensions, and compute an output data element Y as a dot product between the input data elements associated with the range of input height, input width, and input channel indices and weight elements associated with range of weight height, weight width, input channel and output channel indices.

The parameters of the set of loop instructions 400 can be configured based on a particular type/topology of neural network layer to be represented by the set of loop instructions. For example, to implement a depth wise convolution layer, where each output data element is generated from the dot product of input data elements and weight elements of a same input channel, the outermost loops 402 and 404 can be merged into one loop, or the variable m can be set to a constant. Also, to implement an average pooling layer, all of the weight elements provided to the neural network layer can be set to $1/(K_w*K_h)$. Further, to implement a pointwise convolution layer, where each output data element is generated from the dot product of input data elements and a 1×1 kernel having a depth equal to the number of input channels $N_{in}$, $K_m$ and $K_h$ (width and height of the weight elements array) can each be set to 1. Further, to implement a fully connected layer, $K_w$, $K_h$, $F_w$, and $F_h$ can each be set to 1.

Referring again to FIG. 1, having electronic devices 102 performing inferencing operations on sensor data locally, rather than sending the sensor data to cloud network 103 to perform the inferencing, can confer various advantages. For example, by retaining and processing the sensor data locally, transmission of sensor data from electronic devices 102 to cloud network 103 can be reduced or eliminated entirely. Such arrangements can reduce power and bandwidth involved in transmission of sensor data, especially in a case where electronic devices 102 generates a large volume of sensor data continuously (e.g., being part of an always-on system). Also, security and privacy risks associated with transmission of sensor data (e.g., images, speech data, etc.) can also be reduced. Further, the speed and reliability in providing the inferencing decisions can also be improved, or at least are less affected by factors external to electronic devices 102, such as network bottleneck in transmission of sensor data, unavailability of cloud network 103, etc.

Although it is advantageous to have electronic devices 102 perform inferencing operations on sensor data locally, there are various challenges. Specifically, inferencing operations, even when performed by dedicated hardware such as a neural network processor, can be power intensive, and may use substantial memory and computation resources. On the other hand, electronic devices 102 may be low power devices and may also have small form factors, especially in a case where they are IoT devices. Accordingly, a neural network processor on an electronic device 102 may have very limited memory and computation resources available to perform the inferencing operations. Further, different applications may have different and conflicting requirements for the inferencing operations. For example, some applications may require a high precision in the inferencing computations, while some other applications may not require such a high precision. Also, the neural network processor may support a wide range of neural network topologies, layer types, kernel/filter size, and dimensions for filter, input data, and output data to support different applications. All these present challenges to have a neural network processor that can perform various inferencing operations with limited memory and computation resources to support a wide range of applications.

Figure 5:
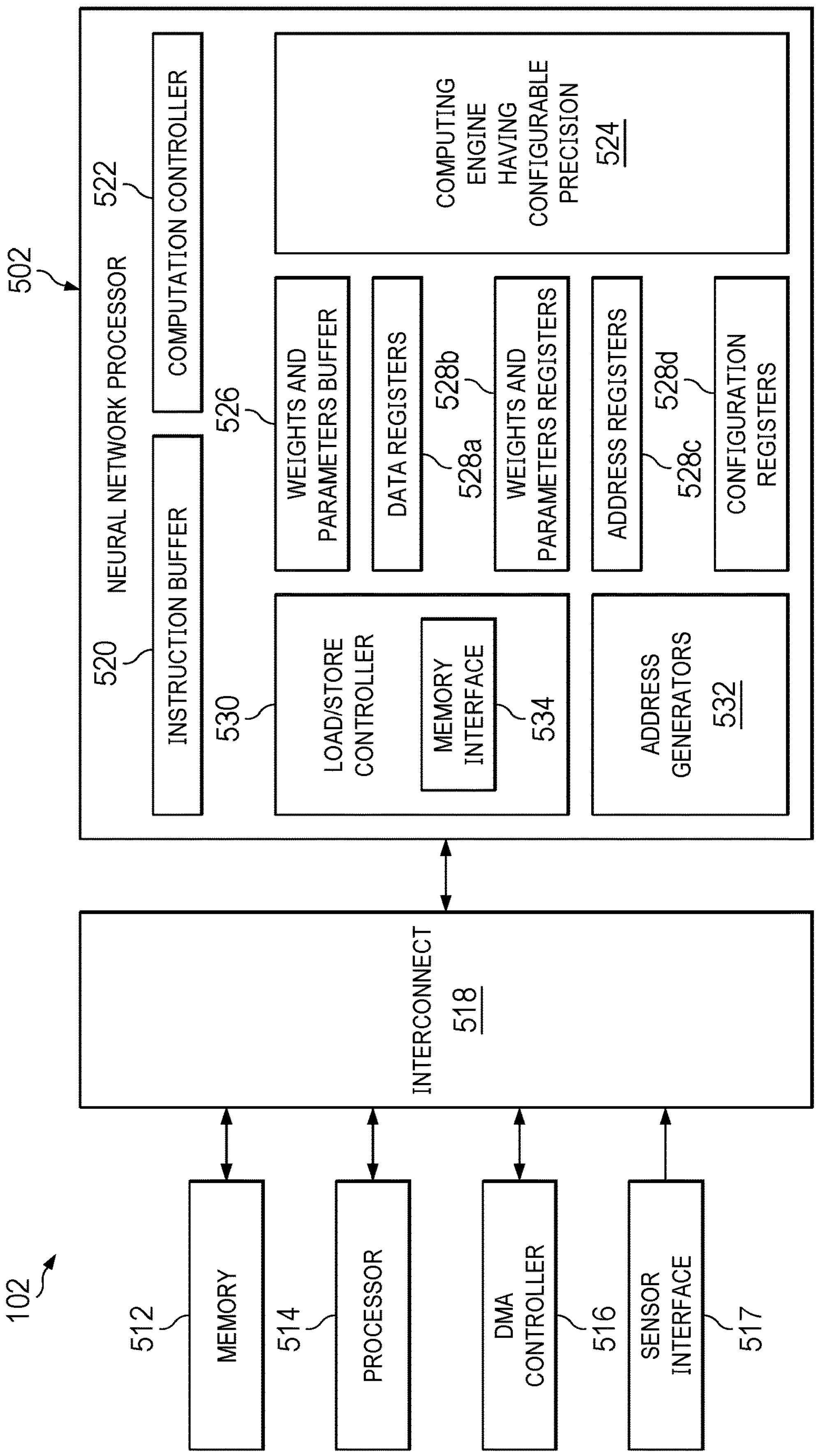
FIG. 5 is a schematic illustrating a neural network processor, according to some examples.

FIG. 5 is a schematic illustrating examples of internal components of electronic device 102 having a neural network processor 502 that can address at least some of the challenges discussed above. Referring to FIG. 5, electronic device 102 may include neural network processor 502 coupled to a memory 512, a direct memory access (DMA) controller 516, a processor 514, and a sensor interface circuit 517 via an interconnect 518. Sensor interface circuit 517 can include interface circuitry (e.g., analog to digital converter (ADC)) that interfaces with sensor 104. In some examples, neural network processor 502, memory 512, DMA controller 516, interconnect 518, and sensor 104 can be part of an integrated circuit (IC) such as a System-on-Chip (SoC). In some examples, neural network processor 502 can be a standalone application specific integrated circuit (ASIC). Interconnect 518 can be an SoC bus interconnect, or other types of interconnects. Also, processor 514 may be a general purpose processor and include, for example, a central processing unit (CPU), one or more processor cores, etc., capable of executing instructions to perform various tasks.

Memory 512 is shared by neural network processor 502 and processor 514. Memory 512 may store the instructions, input data and weights of each neural network layer to be provided to neural network processor 502 to perform inferencing operations, and output data generated by neural network processor 502 from the inferencing operations. The input data can include, for example, sensor data provided by sensor 104, feature data extracted from the sensor data, or intermediate output data generated by a prior neural network layer. Memory 512 can also store other data, such as program instructions and data for processor 514. Memory 512 may include any suitable on-chip memory, such as flash memory devices, static random access memory (SRAM), resistive random access memory (ReRAM), etc.

By having processor 514 and neural network processor 502 sharing memory 512 rather than providing dedicated memory devices separately for neural network processor 502 and processor 514, the total memory size of electronic device 102 can be reduced, which can reduce power and footprint of electronic device 102. As to be described in more details below, neural network processor 502 can implement various memory management schemes, such as in-place computation where output data overwrites input data using circular addressing of output data, and circular addressing of input data to support always on applications, to reduce memory resource usage and memory data movement, which allows neural network processor 502 to operate with limited memory resources. Moreover, neural network processor 502 is configured to handle variable latency for accessing data from memory 512, thereby allowing concurrent operation of the processor 514 with minimal performance impact on neural network processor 502.

Processor 514 can execute software programs that use neural network processor 502 to perform inferencing operations, and then perform additional operations based on the results of the inferencing operations. For example, processor 514 can execute a software program for a home security system. The software program can include instructions (e.g., application programming interface (API)) to neural network processor 502. One API may be associated with computations at one neural network layer, and the software program may include multiple APIs for multipole neural network layers. Upon invoking/executing an API, processor 514 can provide memory addresses of neural network layer instructions executable by neural network processor 502, as well as weights, parameters, and input data, to neural network processor 502, which can then fetch these data at the memory addresses of memory 512. Processor 514 can also transmit a control signal to neural network processor 502 to start computations for that neural network layer. Upon completion of the neural network layer computations and output data are stored in memory 512, neural network processor 502 can transmit the memory addresses of the output data and a control signal back to processor 514 to signal completion, and processor 514 can invoke another API for the next neural network layer. Processor 514 can also execute the software program to perform other functions, such as transmitting the inferencing decision to cloud network 103 (or other devices/systems), providing a graphical user interface, among others. Processor 514 can perform those other functions concurrently with neural network processor 502.

DMA controller 516 may be configured to perform DMA operations to transfer certain data between memory 512 and neural network processor 502. For example, upon invoking an API, processor 514 can provide the memory addresses for the stored instructions, weights, and parameters to neural network processor 502 (e.g., in the form of memory descriptors). Neural network processor 502 can then obtain the stored instructions, weights, and parameters based on the memory addresses provided by the processor 514. As to be described below, in some examples, neural network processor 502 can fetch input data directly from memory 512 on an as-needed basis, instead of fetching the input data in bulk using DMA controller 516. Also, neural network processor 502 can store newly generated output data directly to memory 512 in relatively small chunks (e.g., a chunk size of 32 bits) as the output data is generated and reaches the chunk size, instead of fetching the output data in bulk using DMA controller 516. Such arrangements can avoid having (or at least reduce the size of) an input/output data buffer on neural network processor 502, which can reduce the power and footprint of neural network processor 502.

Neural network processor 502 can be a neural network hardware accelerator, and can provide hardware resources, including computation resources and memory resources, for neural network layer computations to support the inferencing operations. Neural network processor 502 can include an instruction buffer 520, a computation controller 522, and a computing engine 524 having configurable computation precision. Neural network processor 502 also includes weights and parameters buffer 526, registers 528, load/store controller 530, and address generators 532. Load/store controller 530 further includes a memory interface 534. Each component of neural network processor 502 can include combinational logic circuits (e.g., logic gates), sequential logic circuits (e.g., latches, flip flops, etc.), and/or memory devices (e.g., SRAM) to support various operations of neural network processor 502 as to be described below.

Instruction buffer 520 can fetch and store computation instructions for a neural network layer from memory 512 responsive to a control signal from processor 514. For example, responsive to an API being invoked to start a neural network layer computation, processor 514 can control instruction buffer 520 to transfer instructions of the neural network layer computations (e.g., microcodes) from memory 512, or to receive the instructions from other sources (e.g., another processor), and store the instructions at instruction buffer 520.

Computation controller 522 can decode each computation instruction stored in instruction buffer 520 and control computing engine 524, load/store controller 530, and address generators 532 to perform operations based on the instruction. For example, responsive to an instruction to perform a convolution operation, computation controller 522 can control computation engine 524 to perform computations for the convolution operation after the data and weights for the convolution operation are fetch and stored in, respectively data registers **528*a* and weights/parameters register 528*b*. Computation controller 522 can maintain a program counter (PC) that tracks/points to the instruction to be executed next. In some examples, the computation instruction can include flow control elements, such as loop elements, macro elements, etc., that can be extracted by computation controller 522. Computation controller 522 can then alter the PC value responsive to the flow control elements, and alter the flow/sequence of execution of the instructions based on the flow control elements. Such arrangements allow the neural network layer instructions to include loop instructions that reflect convolutional layer computations, such as those shown in FIG. 4**, and can be more compact, which can reduce the microcode size and facilitate the conversion of a neural network layer topology to instructions.

Computing engine 524 can include circuitries to perform convolution operations to support a CNN network layer computation, and circuitries to perform post processing operations on the neural network output data (e.g., BNorm and residual layer processing). As to be discussed below, computing engine 524 is configurable to perform MAC (e.g., convolution) and post processing operations for weights and input data across a range of bit precisions (e.g., binary precision, ternary precision, 4-bit precision, 8-bit precision, etc.) based on parameters provided by processor 514 and stored in configuration registers 528*c*. The parameters can be provided for a particular neural network layer, and can be updated between the execution of different neural network layers. This allows processor 514 to dynamically configure the bit precisions of the convolution and post processing operations at computing engine 524 based on, for example, the need of the inferencing operation to be performed, the application that uses the inferencing result, the available power of electronic device 102, etc. In some examples, computing engine 524 allows different bit precisions for weights and input data for different neural network layers, which can enable a wide range of accuracy vs compute tradeoffs. This also allows neural network processor 502 to operate as a domain-specific or an application-specific instruction set processor, where neural network processor 502 can be configured/customized to perform certain applications (e.g., machine learning based on deep neural network) efficiently.

Weights and parameters buffer 526 can store the weights for multiple neural network layers, as well as parameters for different internal components of neural network processor 502 to support the post processing operations. Neural network processor 502 can fetch the weights and parameters from memory 512 via, for example, DMA controller 516. In some examples, weights and parameters buffer 526 can include SRAM devices. Having weights and parameters buffer 526 to store the weights and parameters, which are static for a particular neural network layer, can reduce the movement of such static data between neural network processor 502 and memory 512 during the computations for a neural network layer. Also, the size of weights and parameters data can be relatively small compared with the size of input and output data for the neural network layer computations, which allows weights and parameters buffer 526 to have a small footprint.

Further, registers 528 can include data registers 528*a*, weights and parameters registers 528*b*, address registers 528*c*, and configuration registers 528*d*. Data registers 528*a* can store a subset of the input data and a subset of the output data for computations of a neural network layer, and weights and parameters registers 528*b* can store a subset of the weights for the neural network layer computation, and parameters for post processing operations. Address registers 528*c* can store memory addresses to be accessed by load/store controller 530 at memory 512 for weights and input/output data. Address registers 528*c* can also store addresses in weights and parameters buffer 526 to be accessed by load/store controller 530 to fetch the weights and parameters. Configuration registers 528*d* can store configuration parameters that are common for various components for neural network processor 502. For example, configuration registers 528*d* can store parameters to set the bit precisions of input data elements and weight elements for the convolution computations and post processing operations at computing engine 524, a particular memory management scheme (e.g., in-place computation, circular addressing of input data, etc.) of neural network processor 502, etc. As described above, some of these parameters can be provided/updated by processor 514 between the execution of a neural network, or between the execution of two neural network layers.

The read/write operations of data registers 528*a* and weight registers 528*b* can be performed by load/store controller 530 based on instructions executed by computation controller 522. For example, responsive to an instruction that indicates fetching of input data to data register 528*a*, load/store controller 530 can fetch the input data from memory 512 directly via memory interface 534 (e.g., without through DMA controller 516) and store the fetched data at data registers 528*a*. Also, responsive to an instruction that indicates storing of output data back to memory 512, load/store controller 530 can fetch the output data from data registers 528*a* and store the output data at memory 512 directly via memory interface 534 (e.g., without through DMA controller 516). As discussed above, such arrangements can avoid having (or reduce the size of) an input/output data buffer on neural network processor 502, which can reduce the power and footprint of neural network processor 502.

Also, as to be described below, load/store controller 530 can implement various memory management schemes, such as in-place computation where output data overwrites input data, and circular addressing of input data to support always on applications, by setting the memory addresses stored in address registers 528*c*. Such arrangements can reduce the footprint of input/output data in memory 512 and to reduce movement of input/output data in memory 512, which facilitate shared access to memory 512 between neural network processor 502 and processor 514. On the other hand, load/store controller 530 can also fetch weights and parameters from weights and parameters buffer 526 to weight register 528*b*, based on instructions executed by computation controller 522. As described above, processor 514 can control neural network processor 502 to fetch the weights and parameters from memory 512 via a separate memory interface (not shown in FIG. 5) and using DMA controller 516, or from another processor, and store the weights and parameters at weights and parameters buffer 526.

Figure 6A:
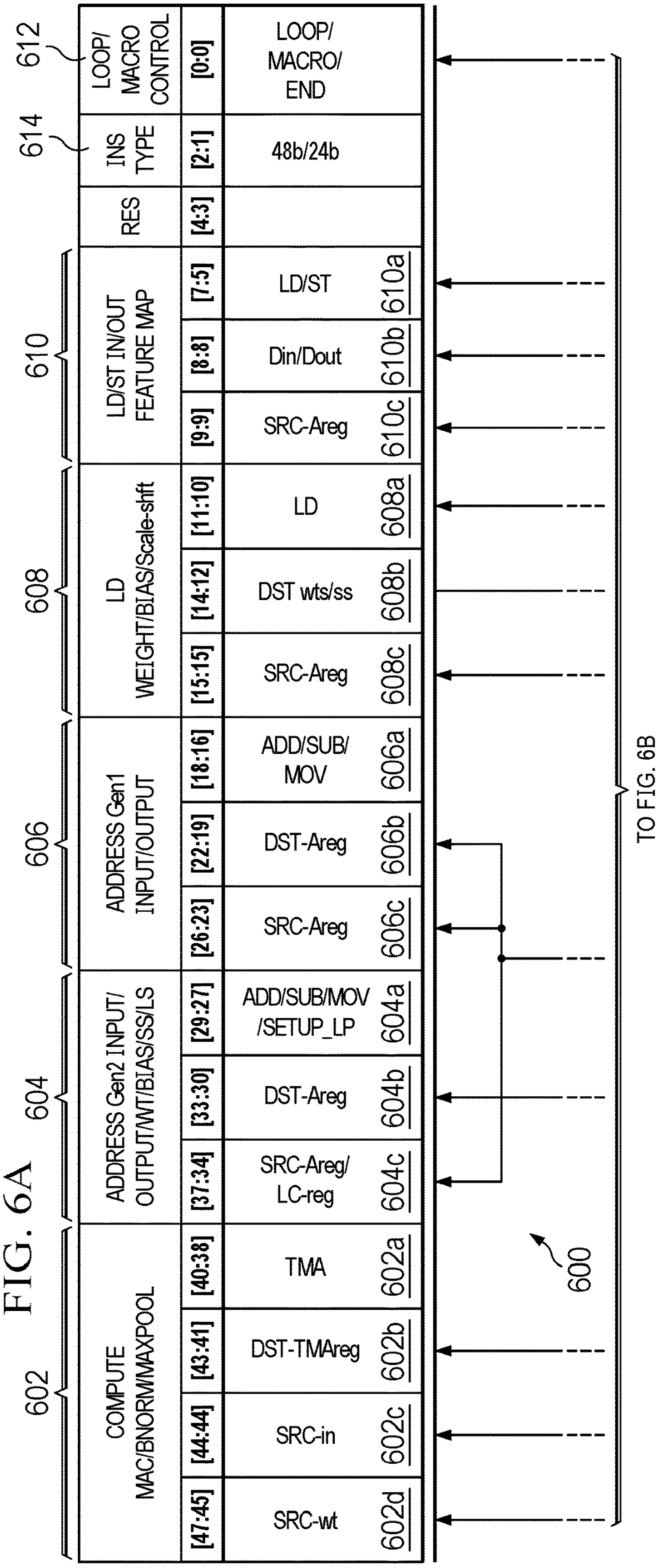
Figure 6B:
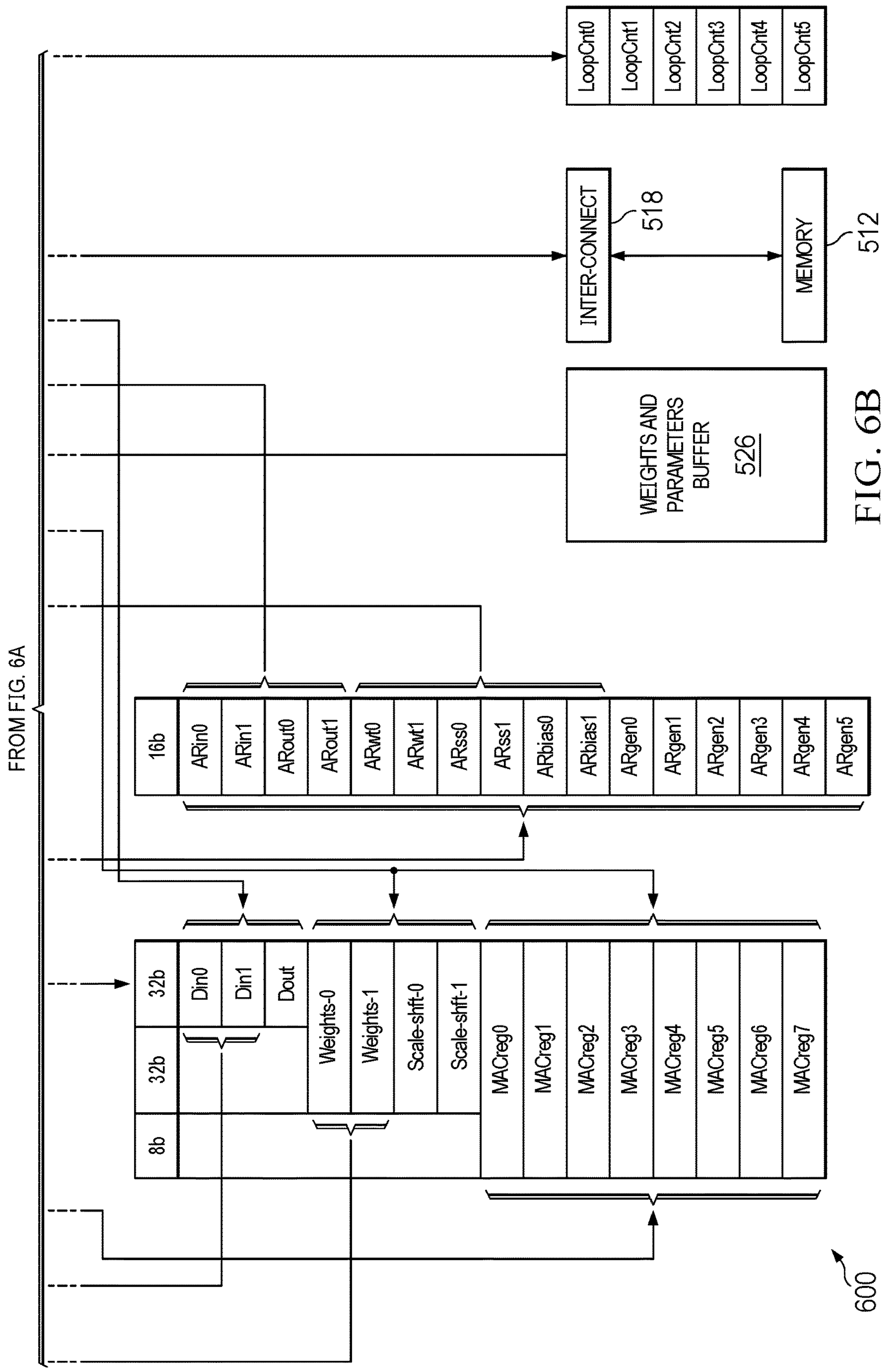

FIGS. 6A, 6B, 6C and 6D are charts illustrating examples of instructions executable by neural network processor 502. Referring to FIGS. 6A and 6B, an instruction 600 can include multiple sub-instructions, including sub-instruction 602, 604, 606, 608, 610, 612, and 614. Each sub-instruction can be targeted at a particular component of neural network processor 502, and the different components can be programmed by the sub-instructions and perform operations represented by the sub-instructions in parallel and/or independently. For example, sub-instruction 602 is targeted at computing engine 524. Sub-instruction 604 is targeted at parts of address generators 532 that generate memory addresses for accessing weights, input data, output data, and post processing parameters such as bias, scale, and shift. Sub-instruction 604 may also include a start loop indicator and can also be targeted at computation controller 522. Sub-instruction 606 is targeted at parts of address generators 532 that generate memory addresses for accessing input data and output data. Also, sub-instruction 608 is targeted at load/store controller 530 for fetching weights and post processing parameters (e.g., bias, scale, and shift) from weights and parameters buffer 526 to weight/parameter registers 528*b*. Further, sub-instruction 610 is targeted at load/store controller 530 for fetching input data from memory 512 to data registers 528*a*, and storing output data from data registers 528*a* at memory 512. Also, sub-instruction 612 is targeted at computation controller 522 and provides an end indicator for instructions of a loop or of a macro.

Further, sub-instruction 614 indicates a type of instruction 600. Neural network processor 502 can support instructions of different types and bit lengths. For example, in FIGS. 6A and 6B, instruction 600 is a 48-bit (48 b) instruction having five sub-instructions (602, 604, 606, 608, and 610) targeted at computing engine 524, address generators 532, and load/store controller 530. Neural network processor 502 can also support a 24-bit (24 b) instruction having a subset of sub-instructions 602-610, in addition to other sub-instruction(s). Based on sub-instruction 614, computation controller 522 can determine the type and bit length of an instruction, and decode and extract the sub-instructions from the instruction based on the type and bit length.

Computation controller 522 can extract the sub-instructions from pre-determined bit positions of the instruction, and generate control signals for the target component of neural network processor 502 based on the extracted sub-instruction. Computation controller 522 can control computing engine 524, address generators 532, and load/store controller 530 to execute the respective sub-instructions in parallel, which allows neural network processor 502 to provide N-way (e.g., 5-way in execution of sub-instructions 602-610) parallel programmability.

Each of sub-instructions 602-610 includes fields that identify an operation to be executed by the target component and/or registers to be accessed. For example, sub-instruction 602 includes fields 602*a*, 602*b*, 602*c*, and 602*d*. Field 602*a* can identify a computation to be performed by computing engine 524, such as a multiply-and-accumulation (MAC) computation operation, BNorm computation operation, or a max pooling computation operation. Field 602*b* can identify a destination data register (labelled MACreg0-MACreg7) to store the output of the computation. Fields 602*c* and 602*d* identify, respectively, a source input data register (labelled Din0 and Din1 in FIGS. 6A and 6B) and a weight register (labelled weights-0 and weights-1 in FIGS. 6A and 6B) from which input data elements and weight elements are fetched for the computation. As to be described below, in some examples, field 602*c* can also indicate whether a max pooling operation is to be performed by computing engine 524, or whether the max pooling operation is to provide a zero output.

Also, sub-instruction 604 includes fields 604*a*, 604*b*, and 604*c*. Field 604*a* can identify an operation to be performed to update an address stored in a source address register identified by field 604*c*, and the updated address is to be stored in a destination address register identified by field 604*b*. The operation can include, for example, an increment by one (ADD), a decrement by one (SUB), and a move operation (MOV) to replace the address in the destination address register with the address in the source address register. The address can be a memory address in memory 512 (for input data/output data) or an alias/reference/address to a location in weights and parameters buffer 526 (for weights or parameters). The source/destination address registers can include address registers for input data and output data (labelled ARin0, ARin1, ARout0, and ARout1 in FIGS. 6A and 6B), address registers for weights (labelled ARwt0 and ARwt1 in FIGS. 6A and 6B), address registers for shift and scale (labelled ARss0 and ARss1 in FIGS. 6A and 6B), and address registers for bias values (labelled ARbias0 and ARbias1 in FIGS. 6A and 6B). In some examples, field 604*a* can also identify a setup loop operation (SETUP_LP) which can be a start indicator for instructions of a loop, field 604*c* can identify a loop count register LC-reg (which can be part of configuration registers 528*d*) that stores a loop count value for the loop, and sub-instruction 604 can be handled by computation controller 522.

Further, sub-instruction 606 includes fields 606*a*, 606*b*, and 606*c*. Field 606*a* can identify an operation to be performed to update an address stored in a source address register identified by field 606*c*, and the updated address is to be stored in a destination address register identified by field 606*b*. The operation can include, for example, an increment by one (ADD), a decrement by one (SUB), and a move operation (MOV) to replace the address in the destination address register with the address in the source address register. The address is a memory address in memory 512 for input or output data, and the source/destination address registers can include address registers for input data and output data (labelled ARin0, ARin1, ARout0, and ARout1 in FIGS. 6A and 6B). As to be described below, in a case where in-place computation or circular addressing of input data are to be performed, address generators 532 can process the adjusted address using a circular buffer to provide circular addressing of input/output data.

Also, sub-instruction 608 includes fields 608*a*, 608*b*, and 608*c*. Field 608*a* can indicate a load instruction to fetch a weight/bias/scale/shift from an address stored in an address register identified by field 608*c* (e.g., ARwt0, ARwt1, ARss0, ARss1, ARbias0, ARbias1) and store the fetched weight/bias/scale/shift to a register identified by field 608*b* (weights-0, weights-1, scale-shift-0, scale-shift-1, MACreg0-MACreg7).

Further, sub-instruction 610 includes fields 608*a*, 608*b*, and 608*c*. Field 608*a* can indicate whether sub-instruction 610 is a load instruction or a store instruction. For a load instruction, field 610*c* can identify the address register (ARin0, Arin1) that stores the memory address from which input data is to be loaded, and field 610*b* can identify the input data register to store the input data (Din0 or Din1). For a store instruction, field 610*c* can identify the address register (ARout0, ARout1) that stores the memory address for storing the output data, and field 610*b* can identify the output data register (Dout) from which the output data is to be fetched.

In some examples, each of Din0, Din1, and Dout register has 32 bits, each of weights and scale-shift registers has 64 bits, and each MACreg register has 72 bits.

FIG. 6C and FIG. 6D illustrate examples of 24-bit instructions 630, 632, 634, and 636. Instruction 630 can be a 24b type 1 instruction and includes sub-instructions 602, 606, 610. Instruction 632 can be a 24b type 2 instruction and includes sub-instruction 602 and a sub-instruction 608' that includes the function of sub-instruction 608 (for fetching weights and post processing parameters from weights and parameters buffer 526 to weight/parameter registers 528*b*) and an auto-incrementation of the buffer address. Instruction 634 can be a 24b type 3 instruction and includes a sub-instruction 640 for flow control (macro, stop) and debug (break-point). Further, instruction 636 can be a 24b type 4 instruction and includes sub-instructions 604 and 606. Each of 24 b instructions 630, 632, 634, and 634 also includes sub-instructions 614 (to indicate the type/bit length of the instruction) and 612 (to support flow control).

Having neural network processor 502 configured to execute instructions of various bit lengths and various number of sub-instructions can reduce code size and power, while providing flexibility to maximize parallelism in execution of the sub-instructions. Specifically, neural network processor 502 do not always execute the five sub-instructions 602, 604, 606, 608, and 610 to support a neural network computation, while some combinations of the sub-instructions are executed together more often (e.g., sub-instructions that read from the memory and incrementing the address register) than other combinations. Accordingly, by supporting 24*b* instructions having sub-instructions that are more often executed together, the code size can be reduced. The power consumed in fetching and decoding the shortened instructions can also be reduced. On the other hand, by supporting 48*b* instructions including five sub-instructions 602-610, the parallelism in execution of the sub-instructions can also be maximized. All these can improve the flexibility of neural network processor 502 in supporting different applications having different requirements for power, code size, and execution parallelism.

FIG. 7 includes a chart 700 illustrating a set of instructions/microcodes stored in instruction buffer 520. In FIG. 7, the values in column 702 can represent addresses of each instruction in in instruction buffer 520. In the example of FIG. 7, neural network processor 502 can execute the instructions sequentially according to the values in column 702, and each value in column 702 can also represent a time slot of execution. Also, column 706 represents sub-instruction 610 executed by load/store controller 530 in fetching weights, column 704 represents sub-instructions 608 executed by load/store controller 530 in fetching input data, column 708 represents sub-instructions 606 executed by address generators 532 in updating the memory address from which input data are fetched, column 710 represents sub-instructions 604 executed by address generators 532 in updating the memory address from which weights are fetched, and column 712 represents sub-instructions 602 executed by computing engine 524 in performing MAC computations.

At time slot 0, load/store controller 530 starts the fetching of input data at a first memory address of memory 512 specified in the ARin0 register. The input data are to be stored at input data register Din0. Also, load/store controller 530 fetches a first set of weight elements at a first buffer address (of weights and parameters buffer 526) specified in the ARwt0 register, and store the weights at weights register Wt0. Address generators 532 also increments the first memory address in the ARin0 register to generate a second memory address, and increment the first buffer address in the Wt0 register to generate a second buffer address. The fetching of input data from memory 512 can continue in time slot 1.

At time slot 2, the fetching of input data from memory 512 to input data register Din0 completes. Also, load/store controller 530 fetches a second set of weight elements at a second buffer address specified in the ARwt0 register, and store the weights at weights register Wt1. Address generators 532 also increment the second buffer address in the Wt0 register to generate a third buffer address. Computing engine 524 also executes sub-instruction 602 to perform a MAC computation between the input data stored in Din0 and a subset of weight elements in weights register Wt0 (Wt0L), while load/store controller 530 fetches weights to weights register Wt1.

At time slot 3, load/store controller 530 starts the fetching of input data at the second memory address of memory 512 specified in the ARin0 register. The input data are to be stored at input data register Din1. Address generators 532 also increment the second memory address in the ARin0 register to generate a third memory address. Computing engine 524 also executes sub-instruction 602 to perform a MAC computation between the input data stored in Din0 and the remainder of weight elements in weights register Wt0 (Wt0H). Load/store controller 530 holds off on fetching weights from the third buffer address at time slot 3 because the weights in weights registers Wt0 and Wt1 are either in use (at time slot 3) or yet to be used.

At time slot 4, the fetching of input data at the second memory address of memory 512 continues. The MAC computation between the input data stored in Din0 and the remainder of weight elements in weights register Wt0 completes. Accordingly, load/store controller 530 fetches a third set of weight elements from the third buffer address to weights register Wt0. Address generators 532 also increment the third buffer address to a fourth buffer address. Computing engine 524 also executes sub-instruction 602 to perform a MAC computation between the input data stored in Din0 and a subset of weight elements in weights register Wt1 (Wt1L).

The fetching of input data to Din1 completes at time slot 5. However, load/store controller 530 holds off on fetching of input data from the third memory address to input data register Din0 because computing engine 524 is still operating on the input data in Din0. At time slot 5 computing engine 524 also executes sub-instruction 602 to perform a MAC computation between the input data stored in Din0 and the remainder of weight elements in weights register Wt1 (Wt1H).

At time slot 6, load/store controller 530 fetches a fourth set of weight elements from the fourth buffer address to weights register Wt1, while computing engine 524 executes sub-instruction 602 to perform a MAC computation between the input data stored in Din0 and a first set of weights stored in weights register Wt0 (Wt0L), which load/store controller 530 updated at time slot 4. Address generators 532 also increment the fourth buffer address to the fifth buffer address. At time slot 7, computing engine 524 also executes sub-instruction 602 to perform a MAC computation between the input data stored in Din0 and the remainder of weight elements in weights register Wt0 (Wt0H).

At time slot 8, while computing engine 524 executes sub-instructions 602 to perform MAC computations between the input data stored in Din0 and weights elements in weights registers Wt1 (Wt1L and Wt1H), load/store controller 530 fetches weights at the fifth buffer address to weight register Wt0. The weights fetched to weight registers Wt0 at time slot 8 are to be used by computing engine 524 for MAC operations with the input data stored in Din1. Address generators 532 also increment the fifth buffer address to generate a sixth buffer address.

At time slot 9, computing engine 524 also executes sub-instruction 602 to perform a MAC computation between the input data stored in Din0 and the remainder of weight elements in weights register Wt1 (Wt1H), and completes a first set of the MAC computations between Din0 and the weights. The results of the MAC computations are stored in data registers MACreg0-MACreg7.

At time slot 10, load/store controller 530 fetches weights at the sixth buffer address to weight register Wt1, while computing engine 524 executes sub-instructions 602 to perform MAC computations between the input data stored in Din1 and a subset of weights elements in weights registers Wt0 (Wt0L).

At time slot 11, load/store controller 530 fetches input data at the third memory address of memory 512 to register Din0. Address generator 532 also increment the third memory address to generate a fourth memory address, and computing engine 524 executes sub-instructions 602 to perform MAC computations between the input data stored in Din1 and the remainder of weights elements in weights registers Wt0 (Wt0H).

As shown in FIG. 7, neural network processor 502 can execute the instructions to maximize (or at least increase) the parallelism among the fetching of weights and input data by load/store controller 530, updating of memory and buffer addresses for fetching of weights and input data by address generators 532, and the computation operations at computing engine 524. Stalling in computing engine 524 because of delay in fetching of weights and input data by load/store controller 530 can also be minimized (or at least reduced). For example, at time slots 2 and 3, while computing engine 524 perform computations on weights in register Wt0, load/store controller 530 updates weights in register Wt1, which allows computing engine 524 to perform computations on the updated weights in register Wt1 in subsequent time slots 4 and 5 without further delay, and computing engine 524 needs not be stalled in order to wait for the weights in register Wt1 to be updated. Also, input data are fetched from memory 512 to one register (e.g., Din1) while computing engine 524 operates on input data stored in the other register (e.g., Din0), so that computing engine 524 needs not be stalled in order to wait for the updated input data. Further, by separating out the accesses to memory 512 by a relatively long duration (e.g., separated by 8 time slots in FIG. 7), memory access collisions between processor 514 and neural network processor 502 can also be avoided or at least reduced.

Figure 8A:
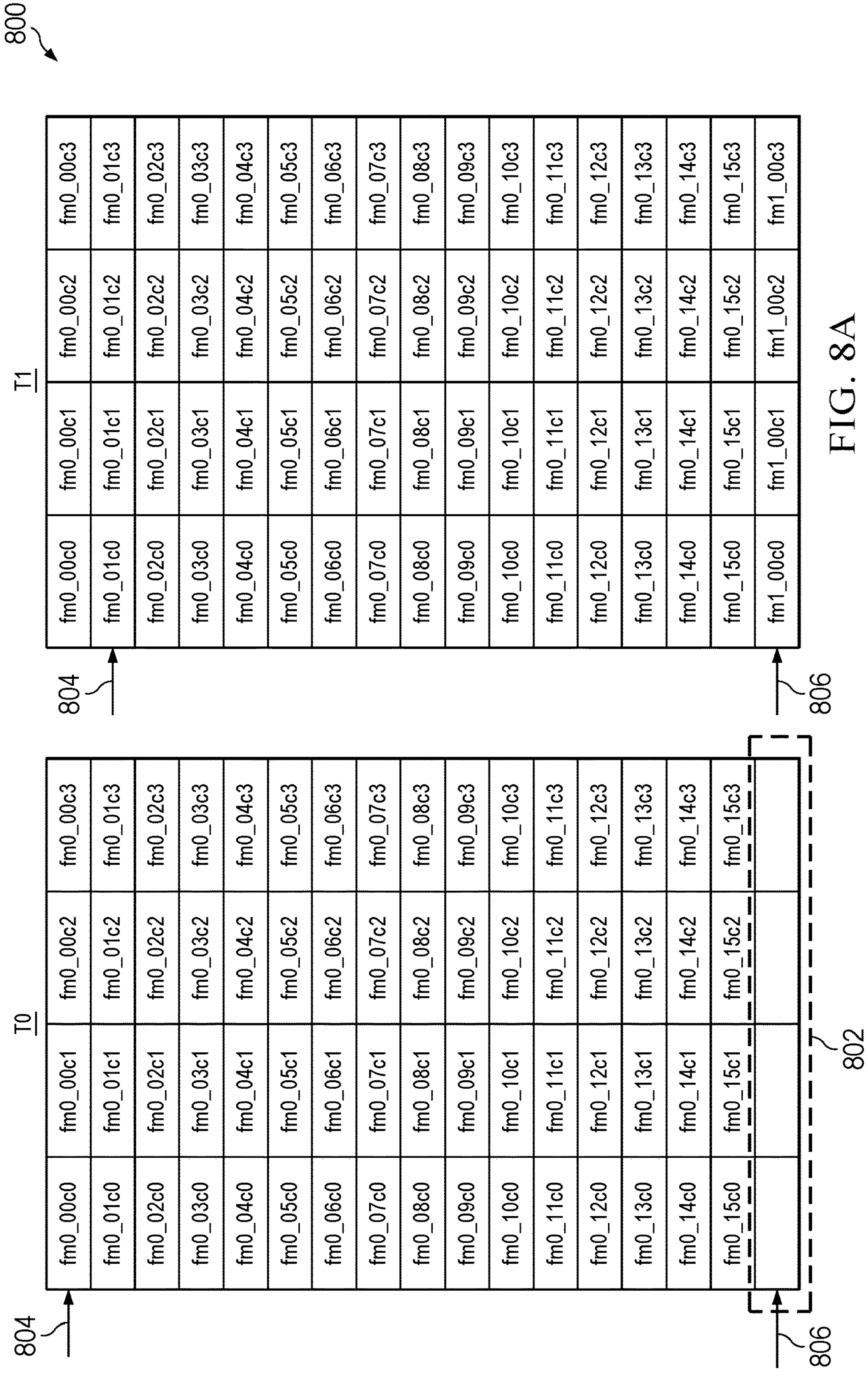

FIG. 8A and FIG. 8B are charts that illustrate an example memory management scheme that can be implemented by address generators 532. The example memory management scheme in FIGS. 8A and 8B can represent an in-place computation where output data overwrites input data, and circular addressing of output data is implemented. With such arrangements, the input and output data need not be stored in separate spaces in memory 512, which can reduce the memory resource usage by neural network processor 502.

Referring to chart 800, memory 512 may store 16 sets of input data elements (fm0), with each set of input data elements including four input data elements for four different channels (c0, c1, c2, and c3). Each row in chart 800 can be associated with a memory address, and rows can be associated with consecutive addresses. However, the space for storing 17 sets of input data elements can be allocated, with row 16 (memory space 802) being empty and available to store one set of output data elements (fm1).

At time T0, the initial read address is at row 0, as indicated by a pointer 804. A first set of input data elements in row 0 are fetched to an input data register (e.g., Din0), which are then fetched to computing engine 524 for a computation operation. The initial write address for the first set of output data elements of the computation operation is associated with memory space 802, as indicated by a pointer 806. Such arrangements can prevent the output data overwriting the first set of input data elements, which may still be in use. The initial read and write addresses can be set using sub-instruction 606. After fetching the first set of input data elements, address generators 532 can increment the read address by one responsive to another sub-instruction 606, so that pointer 804 can point to row 1 subsequently.

At time T1, a second set of input data elements (fm0_0*c*0-fm0_O1*c*3) in row 1 are fetched to input data register, as indicated by pointer 804. After fetching the second set of input data elements, address generators 532 can increment the read address by one responsive to a sub-instruction 606, so that pointer 804 can point to row 2 subsequently. A first set of output data elements (fm1_00*c*0-fm1_00*c*3) is stored in row 16, as indicated by pointer 806. After storing the first set of output data elements in row 16, address generators 532 can increment the write address by one responsive to sub-instruction 606. However, to support in-place computation, circular addressing can be provided for output data, so that the incremented write address can wrap around and point to row 0, so that a next set of output data elements can overwrite the first set of input data elements.

Referring to FIG. 8B, at time T2, a third set of input data elements (fm0_02*c*0-fm0_02*c*3) in row 2 are fetched to input data register, as indicated by pointer 804. After fetching the third set of input data elements, address generators 532 can increment the read address by one responsive to a sub-instruction 606, so that pointer 804 can point to row 3 subsequently. A second set of output data elements (fm1_00*c*0-fm1_00*c*3) is stored in row 0, as indicated by pointer 806. After storing the second set of output data elements in row 0, address generators 532 can increment the write address by one responsive to sub-instruction 606, so that pointer 806 can point to row 1 subsequently. Finally, at time T3, all the output data elements are stored in rows 0-14 and 16, and pointer 806 points at row 14, which stores output data elements fm1_15_*c*0-fm1_15_*c*3.

FIG. 9 includes charts that illustrate another example memory management scheme that can be implemented by address generators 532. The example memory management scheme in FIG. 9 can represent circular addressing of input data to support always-on applications, such as voice command recognition applications. For such applications, the inferencing operations can be performed more frequently than the command length. Accordingly, there can be significant overlap in the input data between two inferencing operations.

For example, for voice command recognition, the input speech samples can be grouped into 40 millisecond (ms) frames, and 8 frequency domain features can be extracted for each of the frames. Thus for a command length of 1 second, features are extracted for 25 frames, resulting in input features with 25 locations and 8 channels per location. In a case where inferencing operation is performed for every 120 ms, the new input features to be processed by the inferencing operation can have three new sets of features (at three locations, 8 channels per location) relative to the previous set of input features. The overlapping 22 sets of input features can be moved in the memory so that the input features are fit within the same set of allocated memory addresses, but such data movement adds to the latency in memory access and power consumption by the memory.

Instead of moving the overlapping input data in memory 512, the new input data can be stored (e.g., by sensor 104, by processor 514, etc.) in memory 512 following a circular addressing scheme, and address generators 532 can also update the input data addresses for fetching the input data based on the same circular addressing scheme. Chart 900 in FIG. 9 illustrates an example of the circular addressing scheme. In chart 900, memory 512 may store 25 sets of input data elements, with each set of input data elements including eight input data elements for eight different channels (c0-c7). Each row in chart 900 can be associated with a memory address, and rows can be associated with consecutive addresses.

At time T0, memory 512 stores 25 initial sets of input data elements (fm0_00*-fm0_24*). The first address for fetching the 25 sets of input data elements to perform a first inferencing operation is at row 0, indicated by pointer 902. Address generators 532 can provide the initial input data address as the address associated with row 0, and increment the input data address responsive to sub-instructions 606, and load/store controller 530 can fetch the 25 sets of input data elements from memory 512 from the input data addresses.

At time T1, a new three sets of input data elements (fm0_25*-fm0_27*) are stored in memory 512. To avoid movement of the rest of the initial sets of input data elements, the new sets of input data elements are stored in memory addresses associated with rows 0, 1, and 2, and overwrite input data elements fm0_00*-fm0_02*. The first address for fetching the 25 sets of input data elements to perform a second inferencing operation is at row 3, indicated by pointer 902. Address generators 532 can provide the initial input data address as the address associated with row 3, and increment the input data address responsive to sub-instructions 606, and load/store controller 530 can fetch the 25 sets of input data elements from memory 512 from the input data addresses. But to read the new sets of input data elements, address generators 532 also implements a circular addressing scheme for input data, where the input data address wraps around after incrementing beyond the address associated with row 24 (storing input data elements fm0_24*) and restart at row 0, and ends at row 2.

At time T2, another new three sets of input data elements (fm0_28*-fm0_30*) are stored in memory 512. To avoid movement of the rest of the initial sets of input data elements, the new sets of input data elements are stored in memory addresses associated with rows 3, 4, and 5, and overwrite input data elements fm0_03*-fm0_05*. The first address for fetching the 25 sets of input data elements to perform a third inferencing operation is at row 6, indicated by pointer 902. Address generators 532 can provide the initial input data address as the address associated with row 6, and increment the input data address responsive to sub-instructions 606, and load/store controller 530 can fetch the 25 sets of input data elements from memory 512 from the input data addresses. But to read the new sets of input data elements, address generators 532 also implements a circular addressing scheme for input data, where the input data address wraps around after incrementing beyond the address associated with row 24 (storing input data elements fm0_24*) and restart at row 0, and ends at row 5.

Figure 10A:
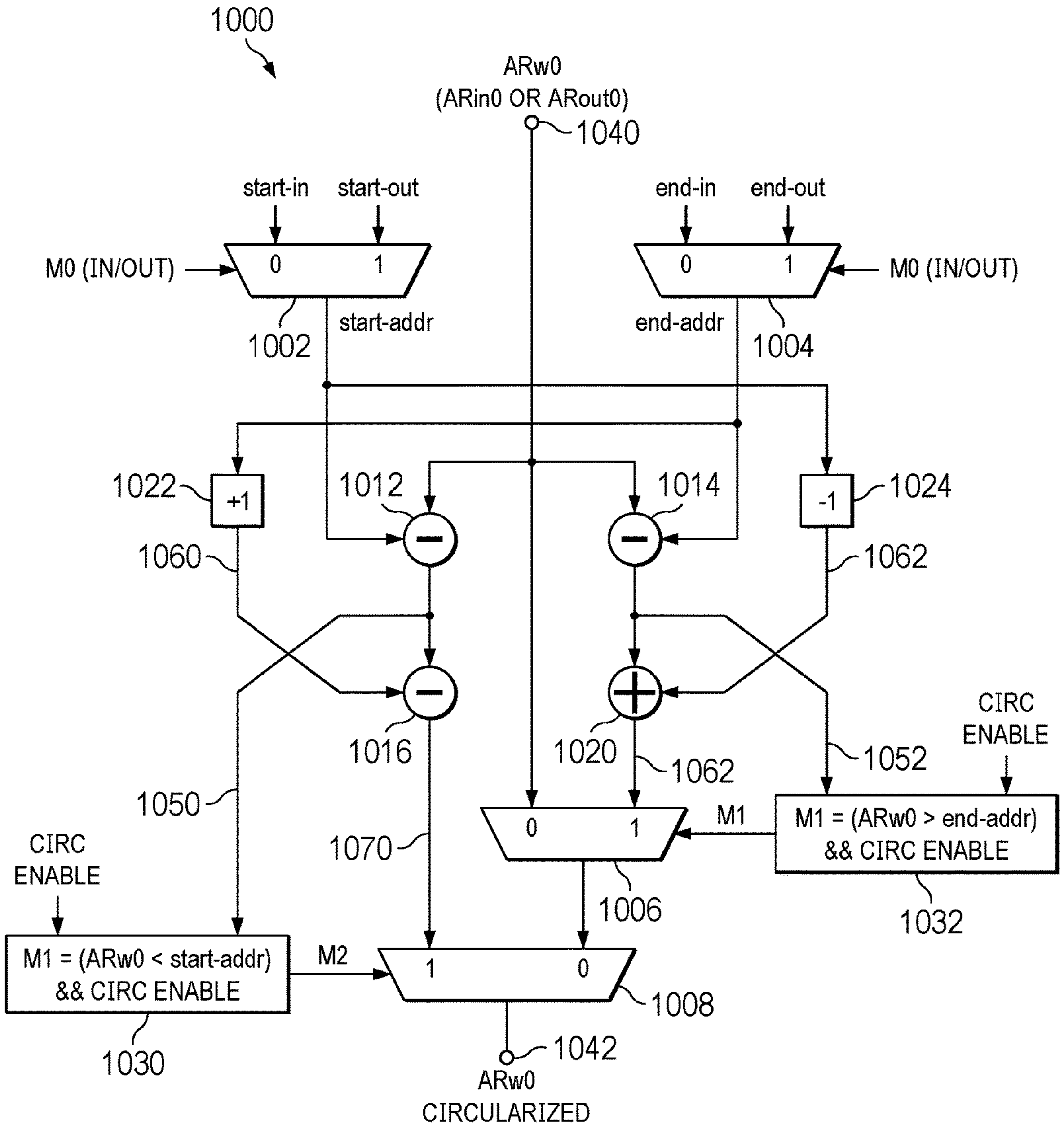
FIG. 10A is a schematic diagram illustrating a circular buffer circuit of the neural network processor of FIG. 5, according to some examples.
Figure 10B:
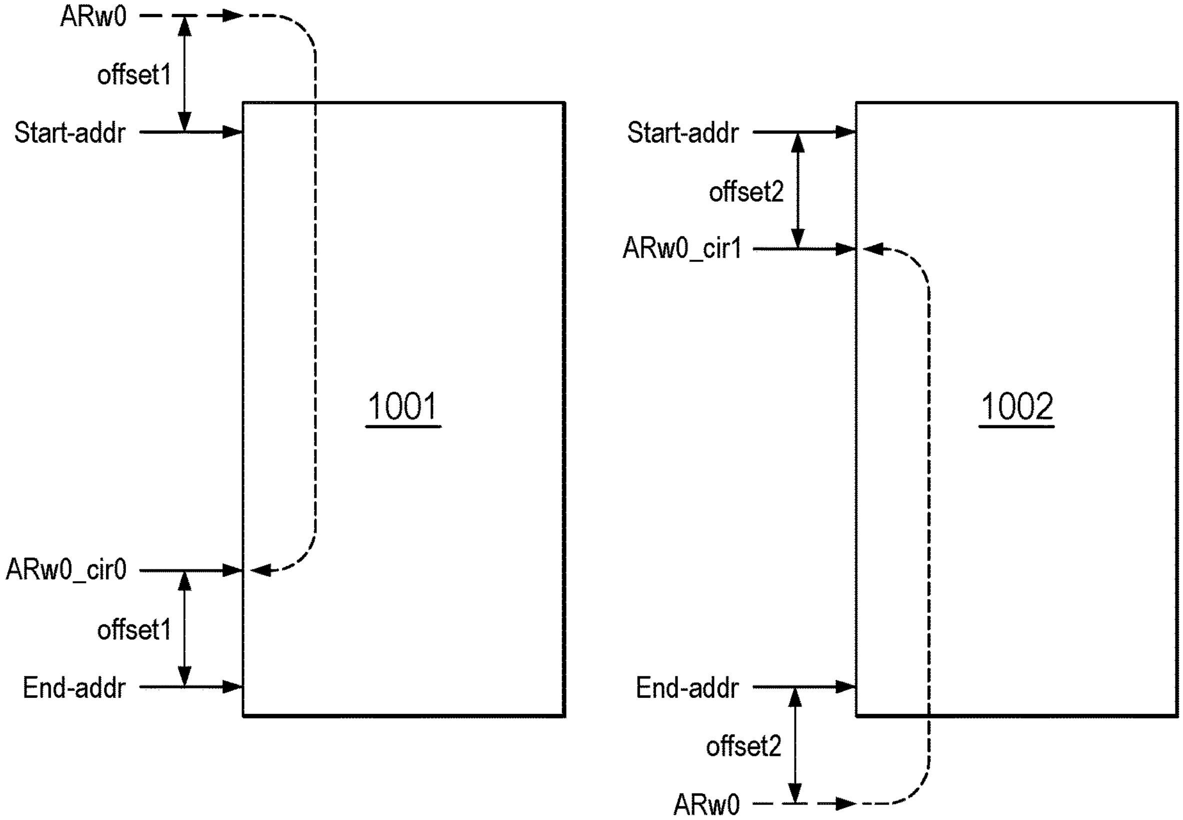
FIG. 10B are charts illustrating operations of the circular buffer circuit of FIG. 10A, according to some examples.

FIG. 10A illustrates an example of a circular buffer circuit 1000 that can be part of address generators 532, while FIG. 10B provides a graph illustrating example operations of circular buffer 1000. Referring to FIG. 10B, circular buffer circuit 1000 can receive an input/output data address ARw0. Circular buffer 1000 can forward ARw0 as the output address if circular addressing is disabled, or ARw0 is within a start address (start-addr in FIGS. 10A and 10B) and an end address (end-addr in FIG. 10A and FIG. 10B) of a memory region 1001 allocated for the input/output data. Referring to the diagram on the left, if circular addressing is enabled, and if ARw0 (through decrementing) becomes below the start address by an offset (offset 1), circular buffer circuit 1000 can perform a wrap around and provide a circularized version of ARw0 (ARw0_cir0) by subtracting offset1 from the end address. Also, referring to the diagram on the right, if circular addressing is enabled, and if ARw0 (through incrementing) becomes above the start address by an offset (offset 2), circular buffer circuit 1000 can perform a wrap around and provide a circularized version of ARw0 (ARw0_cir1) by subtracting offset2 from the start address. On the other hand, if circular addressing is disabled, or if ARw0 is within memory region 1001, circular buffer circuit 1000 can forward ARw0 as the output address.

Referring to FIG. 10A, circular buffer circuit 1000 can include multiplexers 1002, 1004, 1006, and 1008, difference circuits 1012, 1014, and 1016, a summation circuit 1020, an increment circuit 1022, a decrement circuit 1024, and multiplexer control circuits 1030 and 1032. Circular buffer circuit 1000 have an address input 1040 coupled to an input/output data address register (e.g., ARin0 or ARout0) to receive an input/output data address (ARw0).

Multiplexer 1002 can receive a start input data address ("start-in" in FIG. 10) and a start output data address ("start-out" in FIG. 10), and multiplexer 1004 can receive an end input data address ("end-in" in FIG. 10) and an end output data address ("end-out" in FIG. 10). The start and end input data addresses can define a memory region allocated to input data, and the start and end output data addresses can define a memory region allocated to output data, where start address is below/smaller than the end address. Each of multiplexers 1002 and 1004 can also receive an indication M0 indicating whether circular addressing mode is provided for updating input data address (e.g., for always-on application) or for output data address (e.g., for in-place computation). The indication M0 can also be received from configuration registers 528*c*. If circular addressing mode is provided for updating input data address, multiplexer 1002 can provide start input data address as start address ("start-addr in FIG. 10), and multiplexer 1004 can provide end input data address as end address ("end-addr in FIG. 10), otherwise multiplexer 1002 can provide start output data address as start address, and multiplexer 1004 can provide end output data address as end address. Increment circuit 1022 has an input coupled to the output of multiplexer 1004 and can generate an incremented end address 1060, and decrement circuit 1024 has an input coupled to the output of multiplexer 1002 and can generate a decremented start address 1062.

Also, difference circuit 1012 has a first input coupled to address input 1040 and a second input coupled to the output of multiplexer 1002. Difference circuit 1014 has a first input coupled to address input 1040 and a second input coupled to the output of multiplexer 1004. Difference circuit 1012 can generate an offset 1050 between start address and ARw0, which also indicates whether ARw0 is above or below the start address. Also, difference circuit 1014 can generate an offset 1052 between end address and ARw0, which also indicates whether ARw0 is above or below start address. Further, difference circuit 1016 can generate an address 1070 by subtracting offset 1050 from incremented end address 1060, and summation circuit 1020 can generate an address 1072 by adding offset 1052 to decremented end address 1062. Address 1070 can be the wrap-around address ARw0_cir0 if ARw0 is below the start address, and address 1072 can be the wrap-around address ARw0_cir1 if ARw0 is above the end address.

Multiplexers 1006 and 1008 can selectively forward one of the input address ARw0, address 1070 (ARw0_cir0), or address 1072 (ARw0_cir1) to address output 1042. The selection is performed by multiplexer control circuits 1030 and 1032. Specifically, multiplexer control circuits 1030 and 1032 can each receive an indication of whether circular addressing is enabled ("circ enable" in FIG. 10) from, for example, configuration registers 528*c*. If circular addressing is disabled, or ARw0 is above the start address, or ARw0 is below the end address, multiplexers 1006 and 1008 can connect address input 1040 to address output 1042 and provide the address stored in the input/output data address register as output. On the other hand, if circular address is enabled, and ARw0 is below the start address, multiplexers

1006 and 1008 can provide ARw0_cir0 (address 1070) to address output 1042. Also, if circular address is enabled, and ARw0 is above the end address, multiplexers 1006 and 1008 can provide ARw0_cir1 (address 1072) to address output 1042.

Figure 11:
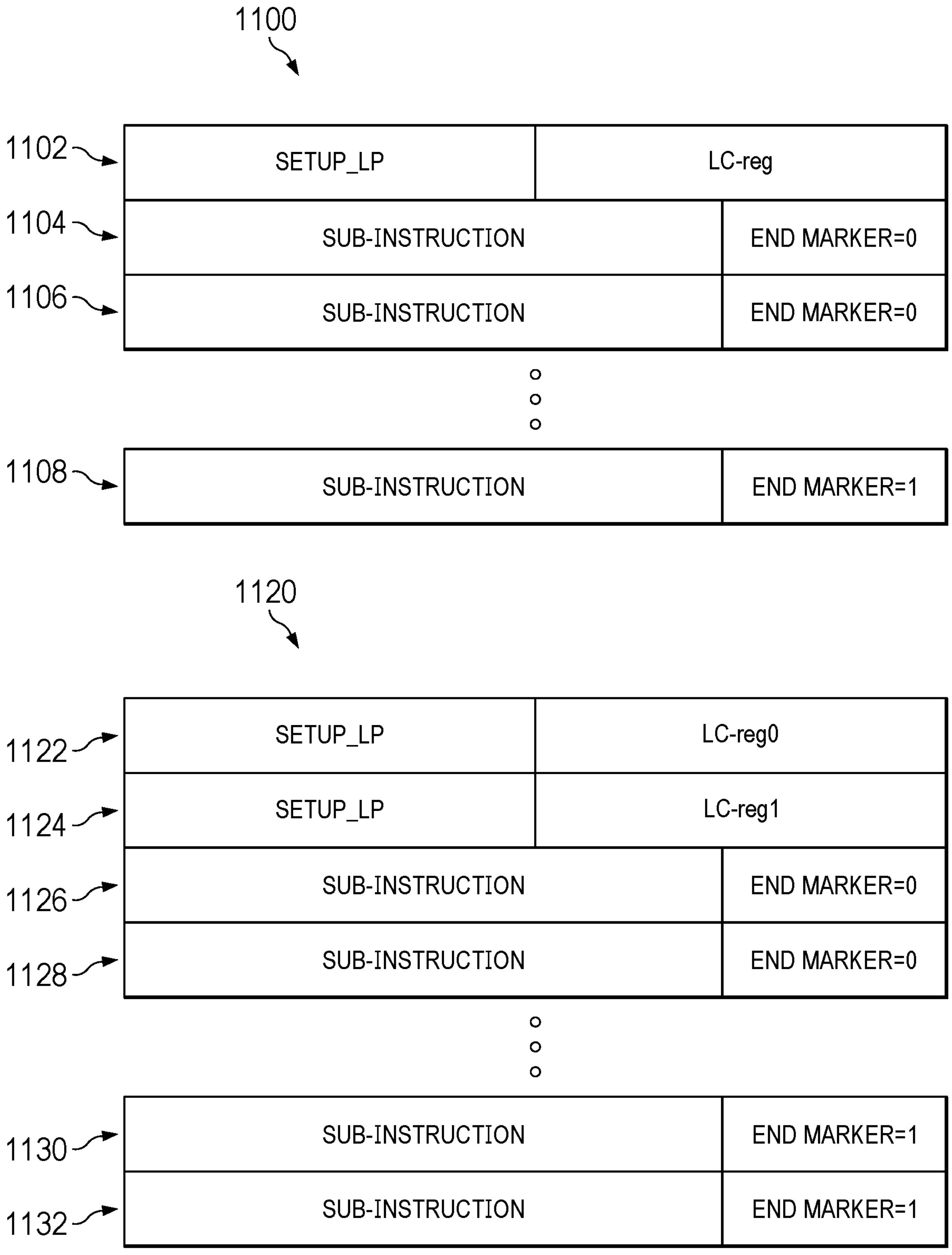
FIG. 11 and FIG. 12 are charts illustrating flow control elements of the instruction syntax of FIGS. 6A and 6B, according to some examples.

As discussed above, neural network processor 502 supports sub-instructions including flow control elements, such as loop elements and macro elements, that allow compact representation of convolutional layer computations, such as those shown in FIG. 4. FIG. 11 illustrates example programs including loop element executable by neural network processor 502. Referring to top of FIG. 11, program 1100 can include instructions 1102, 1104, 1106, and 1108, each including one or more sub-instructions. Instruction 1102 can include a sub-instruction 604 having field 604*a* identifying a setup loop operation (SETUP_LP) and field 604*c* identifying a loop count register (LC-reg). Field 604*a* can include an opcode indicating setup loop operation. Instruction 1102 is followed by instructions 1104 and 1106, each having a sub-instruction 612 indicating a zero/de-asserted end marker. Program 1100 also includes instructions 1108, which has a sub-instruction 612 indicating an asserted end marker. Instructions 1102, 1104, 1106, and 1108 can define a loop operation that starts from instruction 1104 and ends at instruction 1108, and the loop operation is to be repeated by a number of times defined in the loop count register identified by field 604*c* of instruction 1102. To perform the loop operation, computation controller 522 can identify one or more pairs of sub-instructions including opcode SETUP_LP and asserted end marker by tracking the order/sequence by which opcode SETUP_LP and asserted end markers are extracted as computation controller 522 parses the instructions, and store the program counter values of the pairs of sub-instructions. After extracting an asserted end marker, computation controller 522 can reset the program counter back to the count value of the sub-instruction having the paired SETUP_LP opcode and repeat the execution of the instructions between the pair of SETUP_LP sub-instruction and asserted end marker.

FIG. 11 also illustrates program 1120 representing a nest loop operation. Program 1120 includes instructions 1122, 1124, 1126, 1128, 1130, and 1132, each including one or more sub-instructions. Instruction 1122 includes an opcode SETUP_LP and identifies a first loop register LC-reg0 that stores a first loop count. Instruction 1124 includes an opcode SETUP_LP and identifies a second loop register LC-reg1. Instruction 1130 includes an asserted end marker, and sub-instruction 1132 also includes an asserted end marker. Computation controller 522 can pair SETUP_LP of sub-instruction 1122 with asserted end marker of instruction 1132, and pair SETUP_LP of sub-instruction 1124 with asserted end marker of instruction 1130, based on the order by which computation controller 522 extracts the SETUP_LP opcodes and asserted end markers. Computation controller 522 can repeat execution of instructions 1124, 1126, and 1128, for a number of times specified in LC-reg0. Also, upon extracting asserted end marker of sub-instruction 1130, computation controller 522 can reset the program counter to restart execution of sub-instruction 1124 and repeat execution of instructions 1126 and 1128, for a number of times specified in LC-reg1, thereby performing the nested loop operation.

Figure 12:
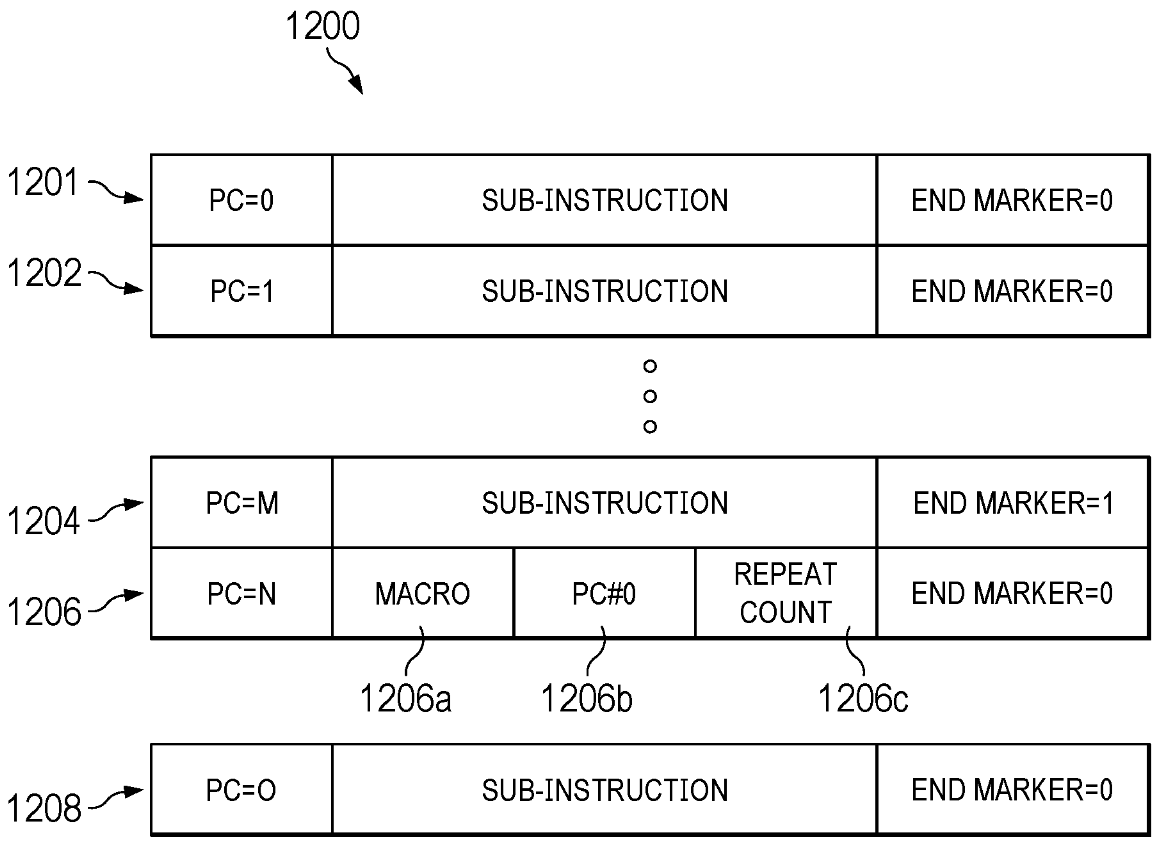

FIG. 12 illustrates an example program 1200 including macro element executable by neural network processor 502. Program 1200 includes instructions 1201, 1202, 1204, 1206, and 1208, each including one or more sub-instructions. Each instruction is also associated with a program counter value, and has an end marker that is either asserted or de-asserted. Instruction 1206 includes fields 1206*a*, 1206*b*, and 1206*c*. Field 1206*a* can include a macro element opcode (MACRO) identifying a macro, which include a set of instructions. Field 1206*b* can identify a program count value (e.g., PC #0) of the first instruction of the macro, and the last instruction of the macro can include an asserted end marker sub-instruction 612. Field 1206*c* can indicate a number of times the macro is to be executed. Upon executing instruction 1206, computation controller 522 can reset the program counter to the count value of field 1206*b*, and execute all subsequent instructions until receiving instruction 1204, which has an asserted end marker. Instruction 1204 may also include other sub-instructions not shown in FIG. 12. Computation controller 522 can repeat the execution of the macro by the number of times specified in field 1206*c*. After repeating the execution of the macro by the number of times, computation controller 522 can stop resetting the program counter upon executing instruction 1206, and proceed to execute the subsequent instruction 1208.

Figure 13:
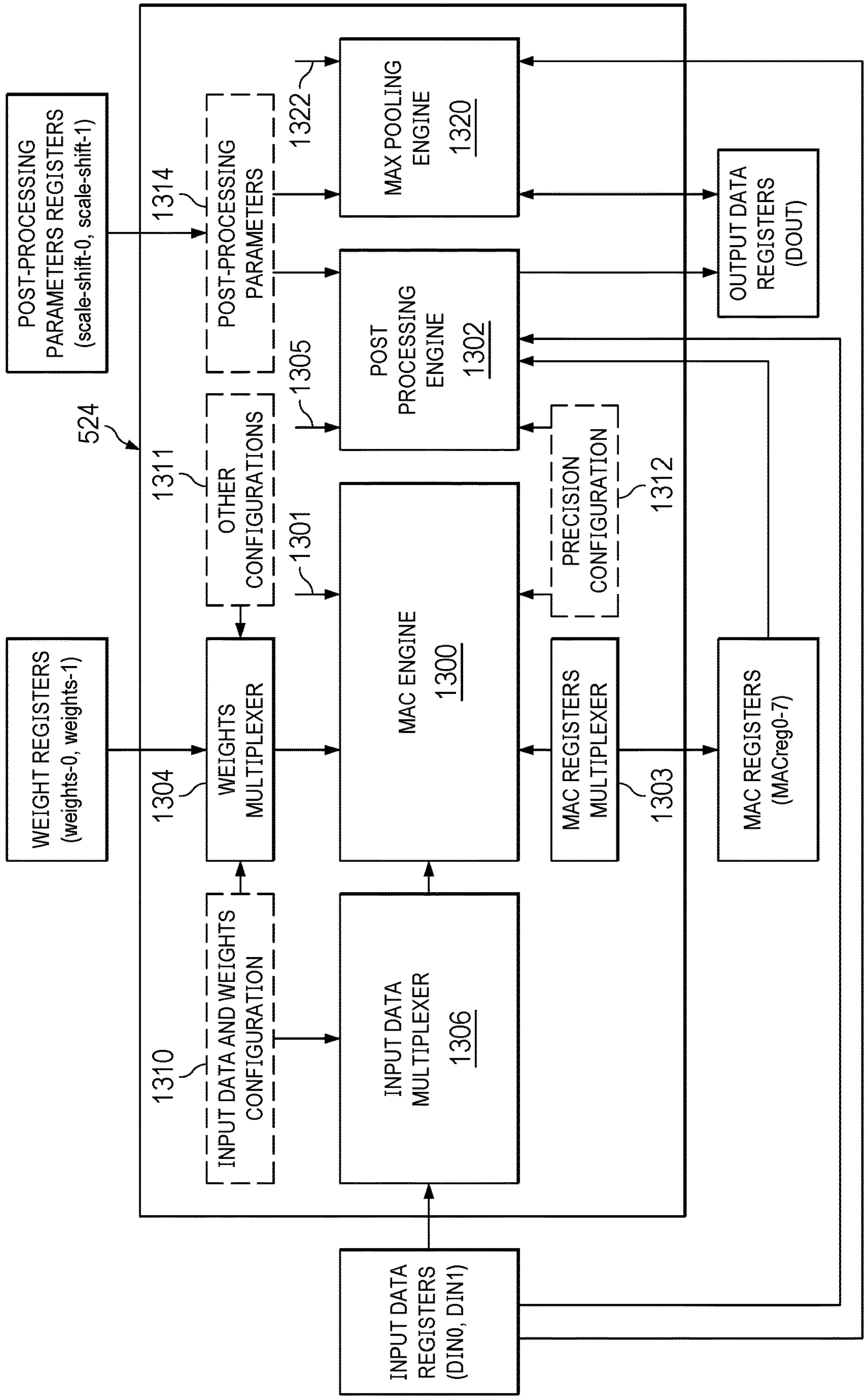
FIG. 13 is a schematic illustrating internal components of a computing engine of the neural network processor of FIG. 5, according to some examples.

FIG. 13 is a schematic illustrating examples of internal components of computing engine 524. Referring to FIG. 13, computing engine 524 includes a MAC engine 1300 and a post processing engine 1302. MAC engine 1300 can receive input data elements and weight elements from, respectively, input data registers (e.g., DIN0, DIN1) of data registers 528*a*, weight registers (e.g., weights-0, weights-1) of weights/params registers 528*b*, and scale-shift registers (e.g. scale-shift-0, scale-shift-1) also of weights/params registers 528*b*. Responsive to a control signal 1301 from computation controller 522, which generates the control signal responsive to sub-instruction 602 indicating a MAC operation, MAC engine 1300 can perform MAC computations on the input data elements and weight elements. MAC engine 1300 include arithmetic circuits to perform MAC computations for a neural network layer, such as a CNN layer, a DNN layer, a fully-connected layer, etc., and store intermediate output data at MAC registers (e.g., MACreg0-7) of data registers 528*a*. MAC engine 1300 can also fetch an old partial sum from a MAC register, update the old partial sum by adding the result of the MAC computation to the old partial sum, and storing the updated partial sum back to MAC register. Computing engine 524 also includes MAC registers multiplexer 1303 to select which MAC register to be accessed by MAC engine 1300 to perform accumulation.

Also, post processing engine 1302 can receive intermediate output data elements from the MAC registers. Responsive to a control signal 1305 from computation controller 522, which generates the control signal responsive to sub-instruction 602 indicating a BNorm operation, post processing engine 1302 can perform post processing operations on the intermediate output data (e.g., BNorm and residual layer processing) to generate output data, and store the output data at output data register (e.g., DOUT) of data registers 528*a*. As to be described below, processing engine 1302 can also perform a data packing operation at the output data register, and transmit a signal to load/store controller 530 to store the output data from the output data register back to memory 512 upon completion of the data packing operation. Such arrangements can reduce neural network process 502's access to memory 512 in writing back output data, which can reduce memory usage and power consumption. In addition, post processing engine 1302 can also receive input data elements from input data registers, and perform residual mode operation based on the input data elements.

As described above, computing engine 524 is configurable to perform MAC and post processing operations for weights and input data across a range of bit precisions (e.g., binary precision, ternary precision, 4-bit precision, 8-bit precision, etc.) based on parameters provided by processor 514. Computing engine 524 includes weight multiplexer 1304 and input data multiplexer 1306 to support the precision configurability. Specifically, depending on an input data and weights configuration 1310, weight multiplexer 1304 can either fetch all of the weight elements stored in a weight register (e.g., one of weights-0 or weights-1 registers), or duplicates of half of the stored weight elements, as packed data having a pre-determined number of bits (e.g., 32 bits). Also, depending on configuration 1311, weight multiplexer 1304 can perform processing on the weight elements to support various operations, such as depthwise convolution operation and average pooling. For depthwise convolution, weight multiplexer 1304 can select one of the 8-bit weights stored in the weight register, split the 8-bit weights into groups (e.g., four groups) of weight elements, and pad each weight elements group with zeros, so that MAC engine 1300 can multiply input data elements of specific channels with zero. Such arrangements can ensure that the intermediate output for a particular channel is based on MAC operations only on input data of that channel. As another example, for average pooling operation, weight multiplexer 1304 can selectively forward zeros and ones as weight elements, where input data elements paired with weight elements of one are represented in the intermediate output data elements, and input data elements paired with zero weight elements are zeroed out and not represented in the intermediate output data elements. Configuration 1311 can indicate a layer type which can also indicate whether a depthwise convolution operation is to be performed. Configuration 1311 can also indicate whether an average pooing operation is to be performed. Configuration 1311 can be based on configuration data stored in configuration registers **528*d* and/or a control signal from the computation controller 522** responsive to an instruction.

Also, input data multiplexer 1306 can either fetch all of the input data elements stored in an input data register (e.g., one of Din0 or Din1), or duplicates of half of the stored input data elements, as packed data having a pre-determined number of bits (e.g., 32 bits). In some examples, input data and weights configuration 1310 can include an 8-bit mode (D8) or a 4-bit mode (D4), which indicates whether computing engine 524 fetches input data in 8-bit form or in 4-bit form. Input data and weights configuration 1310 can be stored in and received from configuration registers 528D. Whether computing engine 524 operates in D8 or D4 mode can depend on the input and weight precisions, which can also determine a number of input data elements and a number of weight elements to be fetched to MAC engine 1300 at a time (e.g., in one clock cycle).

Also, MAC engine 1300 and post processing engine 1302 can receive an input and weight precision configuration 1312. Depending on the input data precision and weight precision, the arithmetic circuits and logic circuits of MAC engine 1300 and post processing engine 1302 can handle the computations differently. Post processing engine 1302 also receives post processing parameters 1314 that can define, for example, the parameters for the post processing operations, some or all of which may also depend on the input and/or weights precisions. Input and weight precision configuration 1312 and some of post processing parameters 1314 can be received from configuration register **528*d*. Some of post processing parameters 1314, such as shift and scale, may vary between different internal components of post processing engine 1302. These parameters may be fetched from weights/parameters buffer 526 to weights/parameters registers 528*b*, and post processing engine 1302 can receive those parameters from weights/parameters registers 528*b***.

In addition, computing engine 524 may also include a max pooling engine 1320 to perform a max pooling operation on the input data elements stored in input data registers (DIN0, DIN1) and output data elements stored in output data register (DOUT), and store the max pooling result back at output data register (DOUT). Specifically, max pooling engine 1320 can overwrite an output data element in DOUT with an input data element at DIN0/DIN1 if the input data element has a higher value than the output data element. Computation controller 522 can provide a control signal 1322 to max pooling engine 1320 responsive to, for example, field **602*c* of sub-instruction 602 indicating a max pooling operation to be performed. Max pooling engine 1320 can then perform the max pooling operation responsive to control signal 1322. Max pooling engine 1320 also receives post processing parameters 1314 and can configure the max pooling operation based on the parameters. In some examples, max pooling engine 1320 can operate independently or in parallel with MAC engine 1300 and post processing engine 1302, which can minimize the disruption of the max pooling operation on the operations by the rest of computing engine 524** and improve efficiency.

Figure 14:
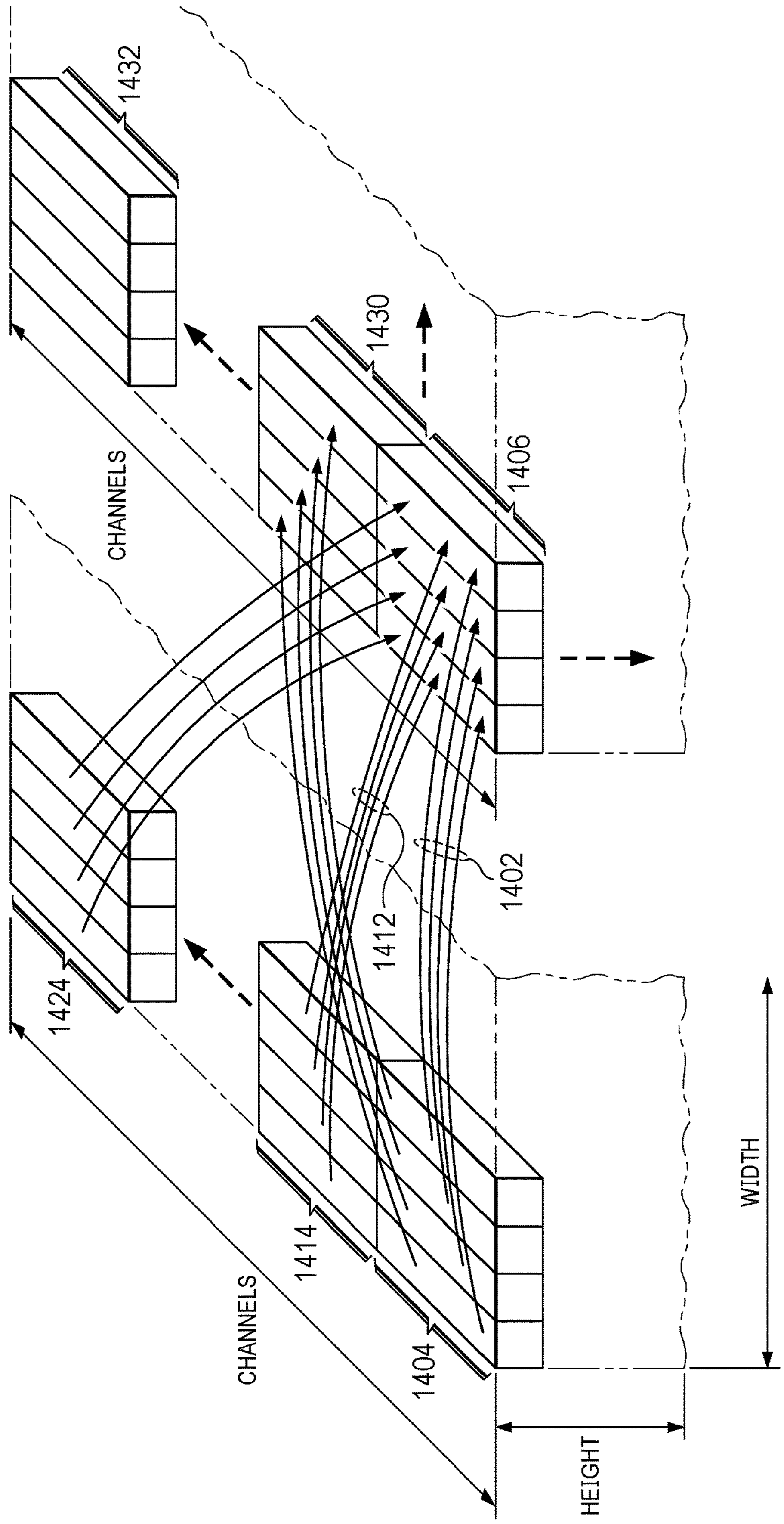
FIG. 14 includes charts illustrating convolution operations performed by the computing engine of FIG. 13, according to some examples.

FIG. 14 illustrates example convolution operations performed by MAC engine 1300. Referring to FIG. 14, MAC engine 1300 can perform the convolution operations in a channel major sequence. MAC engine 1300 can first perform convolution operations 1402 on input data elements 1404 at particular height and width locations and associated with a first set of input channels (using a set of weights associated with a set of output channels) to generate a first partial sum of intermediate output data elements 1406. Input data elements 1404 can be stored in an input data register (e.g., Din0), and intermediate output data elements 1406 can be stored in an intermediate output data register (e.g., MACreg0). MAC engine 1300 can then perform convolution operations 1412 on input data elements 1414 at the same height and width locations as input data elements 1404, but associated with a second set of input channels, to generate a second partial sum of intermediate output data elements 1406, and add the second partial sum to the first partial sum. Input data elements 1414 can be stored in another input data register (e.g., Din1). MAC engine 1300 can perform additional convolutions on input data elements of other input channels and at the same height and width locations, including input data elements 1424, and accumulate the partial sums at the intermediate output data register to generate intermediate output data elements 1406. After the input data elements at the particular height and width locations of all input channels have been processed, MAC engine 1300 can restart the convolution operations on input data elements 1404, 1414, and 1424 using another set of weights associated with a different set of output channels to compute another set of intermediate output data elements, such as intermediate output data elements 1430 and 1432 associated with different output channels.

Figure 15A:
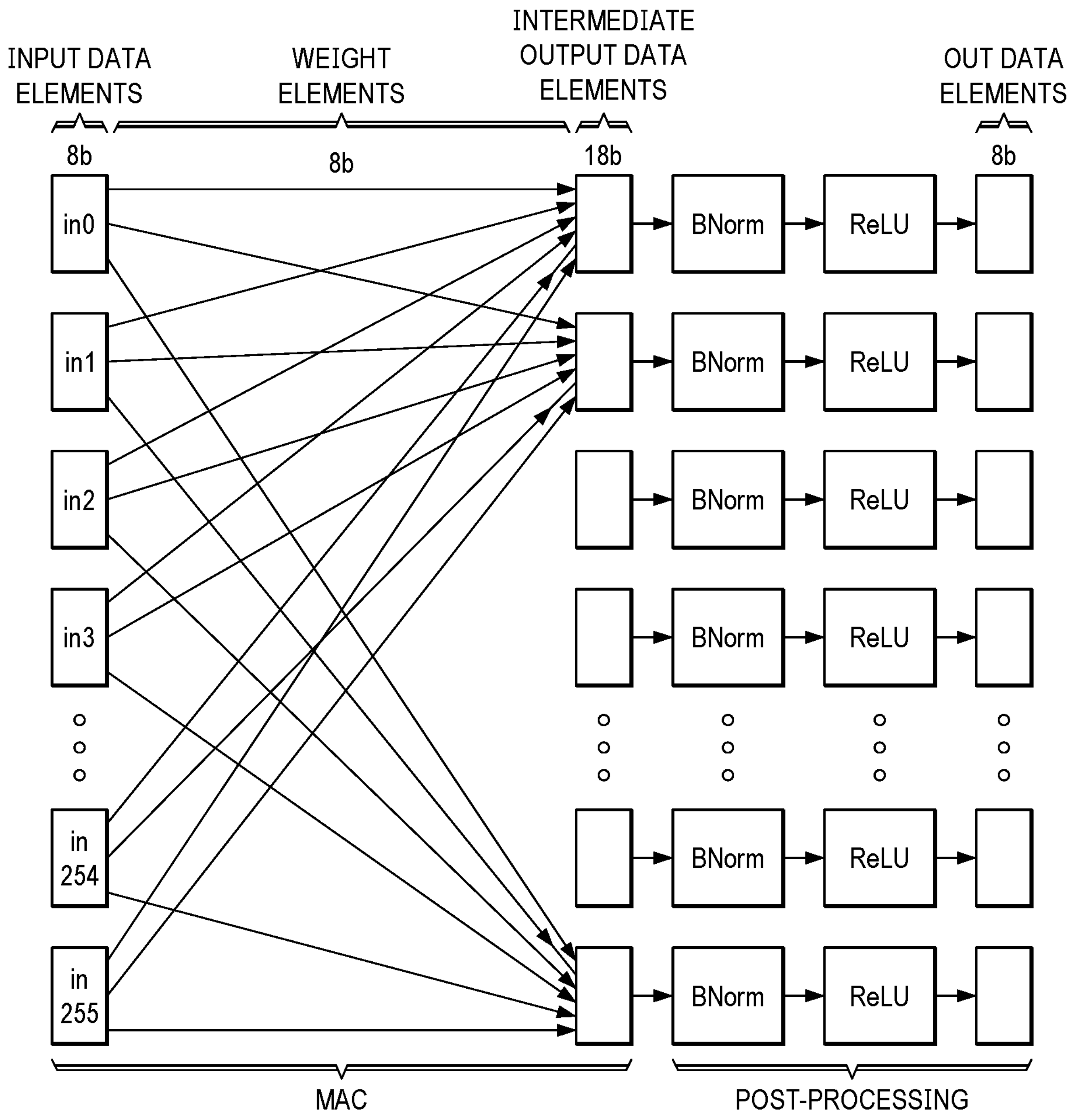
FIGS. 15A, 15B, 15C, and 15D include charts illustrating post-processing operations performed by the computing engine of FIG. 13 for different weight precisions, according to some examples.

FIG. 15A, FIG. 15B, FIG. 15C, and FIG. 15D illustrate example convolution operations and post processing operations performed by MAC engine 1300 and post processing engine 1302 using weight elements and input data elements of different bit precisions. In FIG. 15A, MAC engine 1300 can perform convolution operations between 256 8-bit input data elements (labelled in0, in1, in2, in3, . . . in254, and in255) and 8-bit weight elements to generate 24-bit intermediate output data element, where each intermediate output data element is generated by sum of products of input data elements and weight elements. Post processing engine 1302 performs post processing operations, including BNorm and clamp/activation function operations (e.g., ReLU in FIG. 14) on each intermediate output data element to generate an 8-bit output data element.

Figure 15B:
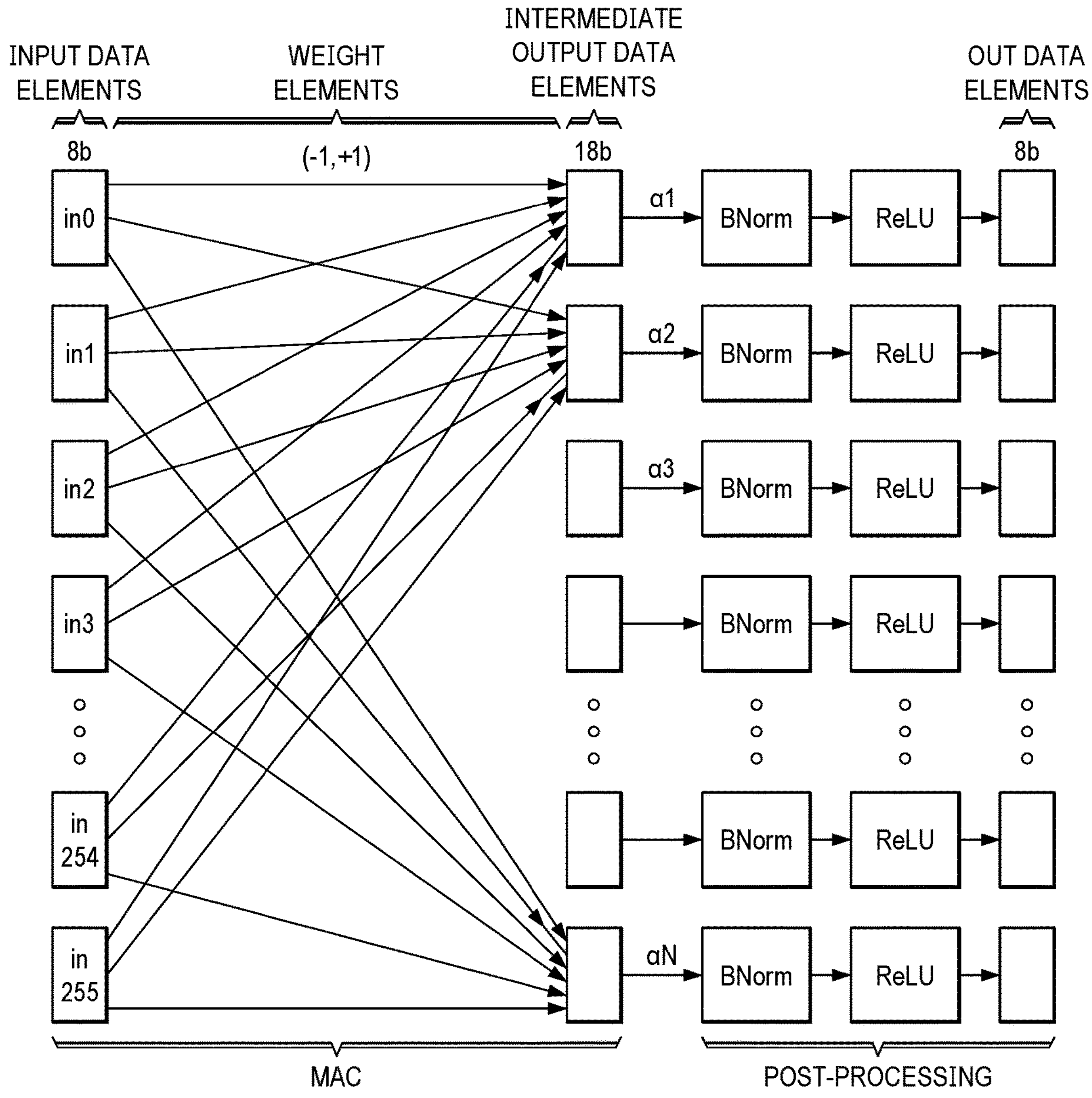

In FIG. 15B, MAC engine 1300 can perform convolution operations between 256 8-bit input data elements (labelled in0, in1, in2, in3, . . . in254, and in255) and 1-bit (binary) weight elements to generate 16-bit intermediate output data element, where each intermediate output data element is generated by sum of multiplication products between input output data elements and weight elements, followed by post processing operations (e.g., BNorm and ReLU) on each intermediate output data element to generate an 8-bit output data element. With binary weights (+1 or −1), MAC engine 1300 can generate a multiplication product between an input data element and a weight element by simply forwarding the input data element if the weight element is a one and forwarding a negative representation of the input data element if the weight element is −1, which can reduce complexity and power and increase the speed of computation. There can also be an 8× reduction in weights storage compared with 8-bit weights. While the precision of intermediate output data element is reduced (from 24-bit to 16-bit), the reduced precision may still be acceptable for certain applications, and the impact of the reduce precision can be further mitigated by having a neural network topology with hybrid precisions between among the neural network layers.

Figure 15C:
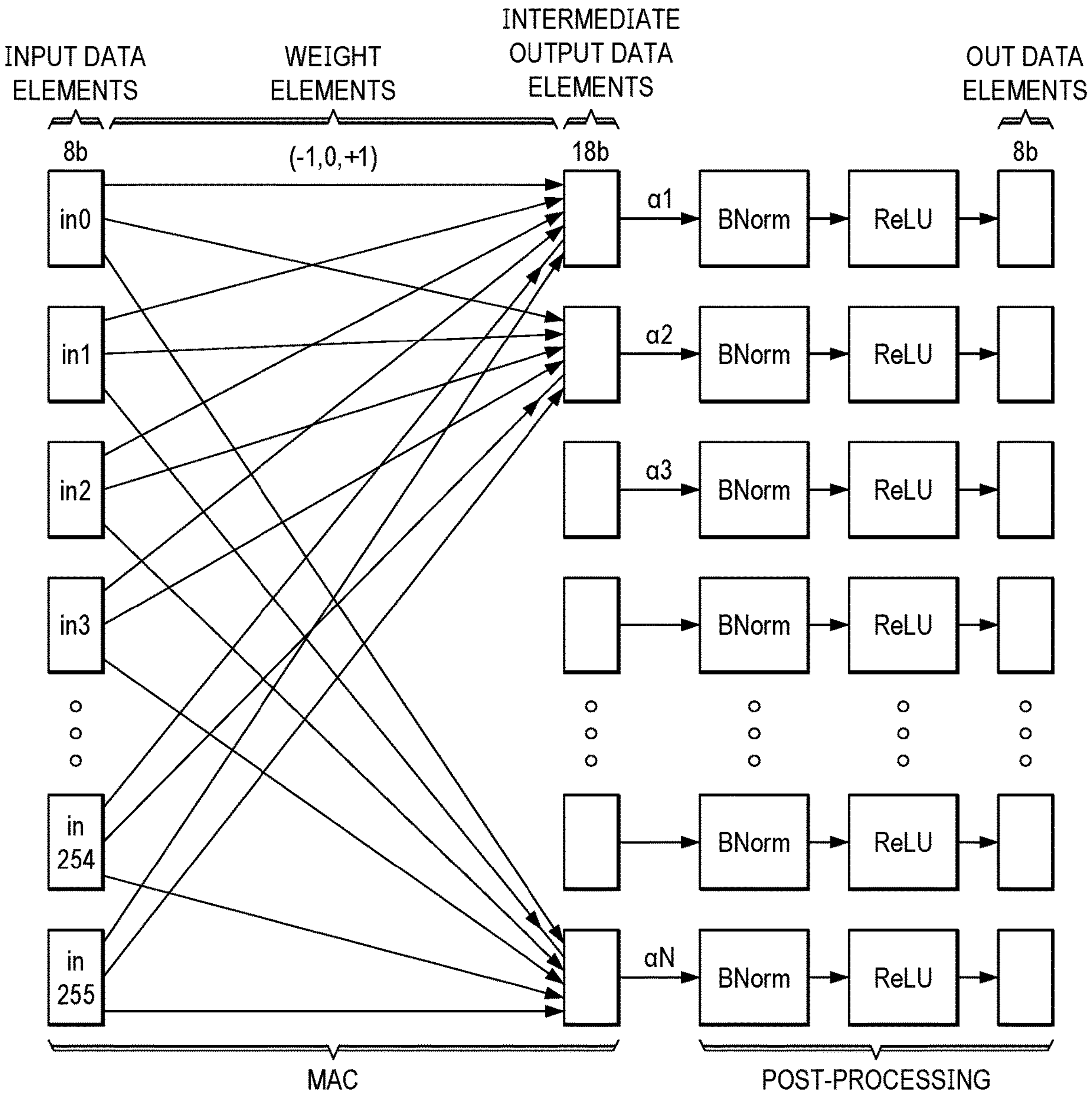

In FIG. 15C, MAC engine 1300 can perform convolution operations between 8-bit input data elements and 2-bit ternary weight elements (−1, 0, +1) to generate 16-bit intermediate output data element, where each intermediate output data element is generated by sum of multiplication products between input output data elements and weight elements, followed by post processing operations (e.g., BNorm and ReLU) on each intermediate output data element to generate an 8-bit output data element. The 2-bit ternary weight elements (providing three alternative levels to represent a weight element) can be more accurate than the binary weights (providing two alternative levels) in representing the weights. Also, MAC engine 1300 can generate a multiplication product between an input data element and a weight element by simply forwarding the input data element if the weight element is a one, forwarding a negative representation of the input data element if the weight element is −1, and forwarding a zero if the weight element is zero, which can reduce complexity and power and increase the speed of computation.

Figure 15D:
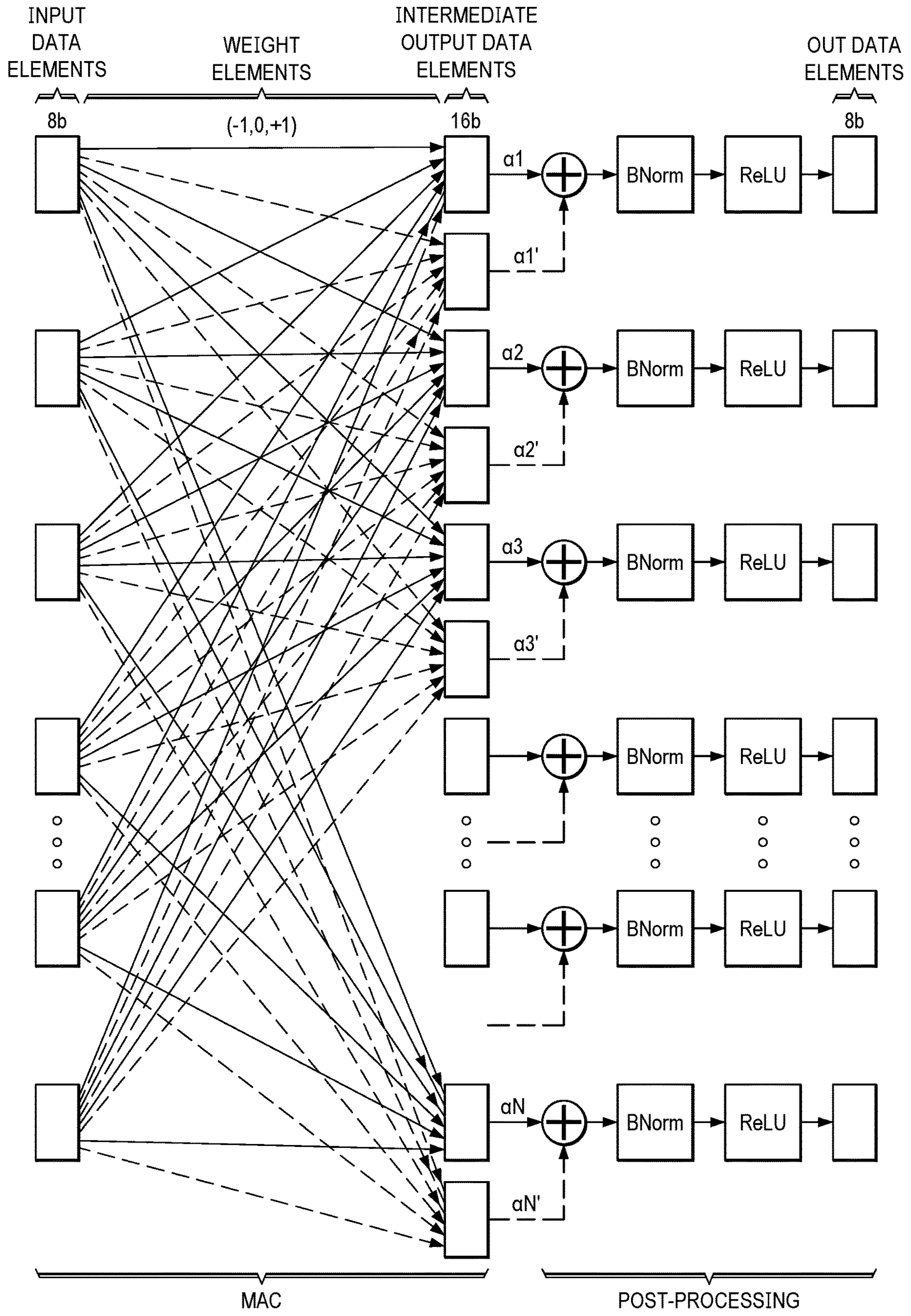

In FIG. 15D, MAC engine 1300 can perform convolution operations between 8-bit input data elements and two sets of 2-bit ternary weight elements (−1, 0, +1) to generate 16-bit intermediate output data element, where each intermediate output data element is generated by sum of multiplication products between input output data elements and two sets of weight elements, and the intermediate output data elements generated from the two sets of weight elements are summed. The summed intermediate output data elements can then be post-processed (e.g., BNorm and ReLU) to generate 8-bit output data elements. Using two sets of 2-bit ternary weight elements (providing nine alternative levels) can be more accurate than using one set of 2-bit ternary weight elements (providing three alternative levels) in representing the weights, yet providing similar benefit of simplified computation in MAC engine 1300 using ternary weight elements.

Figure 16:
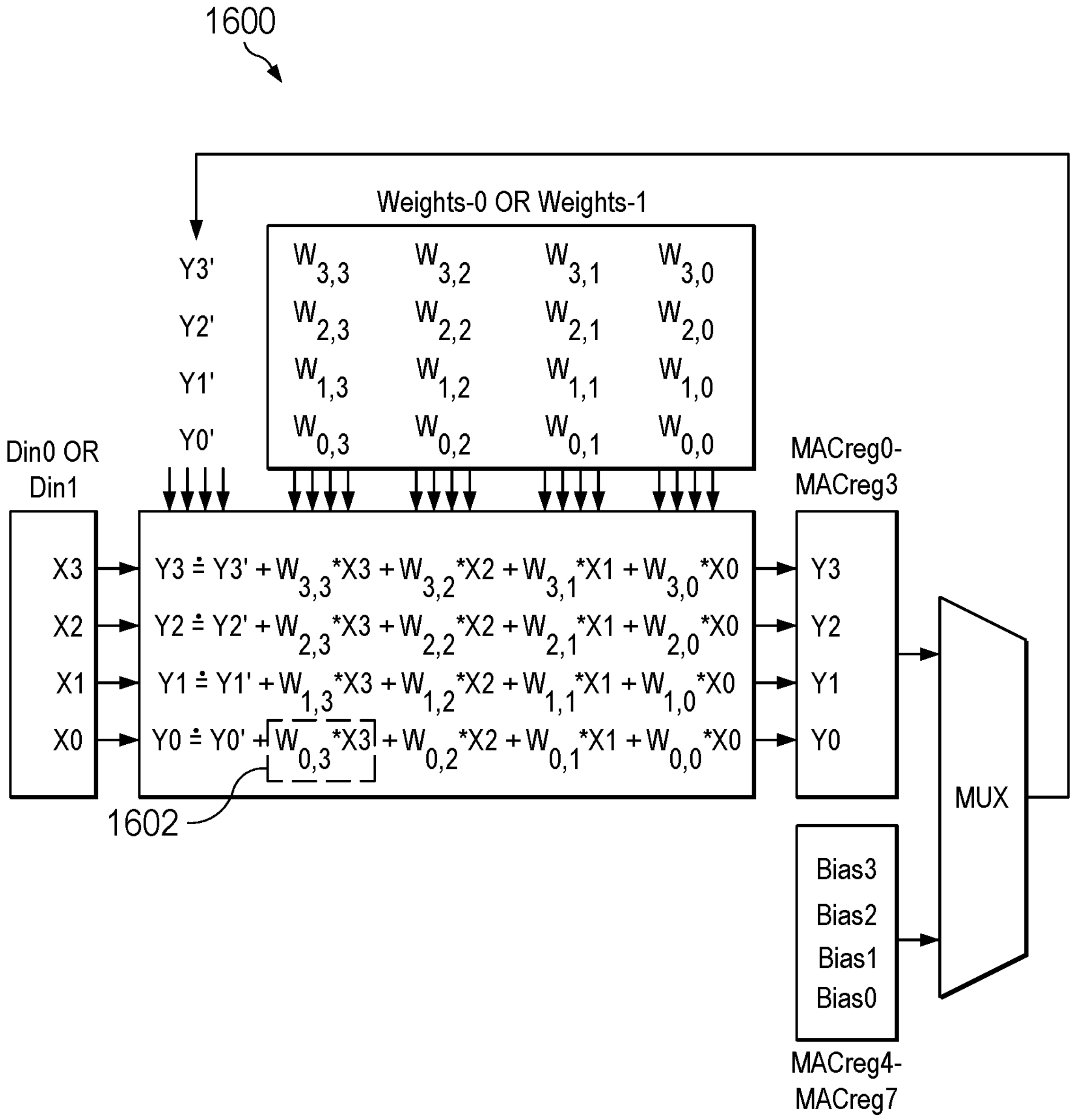
FIG. 16 is a schematic diagram illustrating arithmetic operations performed by the computing engine of FIG. 13, according to some examples.

FIG. 16 illustrates examples of arithmetic operations performed by MAC engine 1300 to support, for example, the example convolution operations in a channel major sequence of FIG. 14. The arithmetic operations illustrated in FIG. 16 can be performed by MAC engine 1300 in one clock cycle. Referring to FIG. 16, in each clock cycle, MAC engine 1300 can receive four input values, X[0], X[1], X[2], and X[3], each associated with a different input channel. MAC engine 1300 can also receive 16 weight values associated with different input and output channels such as, for example, W[0,0] (associated with output channel 0 and input channel 0]), W[1,3] (associated with output channel 1 and input channel 3), etc. The example operation of FIG. 16 can be performed on, 8-bit input data elements and 2-bit weight elements, or 4-bit input data elements and 4-bit weight elements. As to be described below, depending on the input and weight precision, computing engine 524 may receive 8-bit input data elements or 4-bit input data elements. Also, computing engine 524 may also receive 4-bit weight elements, 2-bit weight elements, 8-bit weight elements, etc. Computing engine 524 can be configured by input data and weights configuration 1310 and precision configuration 1312 to split the weights/data to perform the example operation of FIG. 16. For example, computing engine 524 may split the 4-bit weights into two 2-bit weights, and perform 8-bit data and 2-bit weights computations on the two sets of weights. each weight value can include a single 4-bit weight element, two 2-bit weight elements, or can be half of an 8-bit weight element.

MAC engine 1300 can generate a partial sum for each of intermediate output data elements Y[0], Y[1], Y[2], and Y[3] each associated with a different output channel based on multiplication of input data X[0]-X[3] and weights associated with a particular output channel and the input channels of X[0]-X[3]. For example, for an intermediate output data element Y[0], MAC engine 1300 can compute a multiplication product between W[0,3] and X[3], a multiplication product between W[0,2] and X[2], a multiplication product between W[0,1] and X[1], and a multiplication product between W[0,0] and X[0], and perform an accumulation operation by summing the multiplication products to a prior partial sum Y0' from one of intermediate output data registers MACreg0-MACreg3 to generate a new partial sum Y0, and the new partial sum Y0 can be stored in MACreg0-MACreg3 in place of the prior partial sum Y0'. The summation can be saturating summation. In a case of a first instruction for a convolution operation, a bias value (e.g., Bias0) can be fetched from another set of intermediate output data registers MACreg4-MACreg7 via a multiplexer (labelled MUX in FIG. 16) to MAC engine 1300, and the multiplication products can be added to the bias value to generate a partial sum. Such arrangements can avoid performing the addition in subsequent post-processing operation, which can speed up the post-processing operation. After the first instruction is executed, for subsequent instructions of the convolution operation, the multiplexer can route the outputs of MACreg0-MACreg3 to MAC engine 1300 to add the multiplication products to the prior partial sum.

MAC engine 1330 can perform 16 multiplication operations, such as multiplication operation 1602, to generate the multiplication products in one clock cycle. In some examples, MAC engine 1330 can include 16 multiplier circuits to perform the 16 multiplication operations in parallel. MAC engine 1330 can also update the prior partial sum Y'[0] stored in the MAC register by adding the new partial sum to Y'[0].

Table 1 below illustrates a set of input precisions and weight precisions supported by computing engine 524. Each row also indicate, for a given input precision and weight precision, a number of input data elements processed by computing engine 524 per clock cycle, a number of output data elements provided by computing engine 524 per clock cycle, and a number of multiplication and accumulation (MAC) operations performed by computing engine 524 per clock cycle. The number of MACs per cycle may be equal to a product between a number of input data elements processed and a number of output data elements generated per clock cycle.

In some examples, as to be described below, MAC engine 1330 can include an array of 32 4-bit 2-bit multiplier circuits, where each multiplier circuit can perform a multiplication operation (or bitwise operation) between a 4-bit number and a 2-bit number per clock cycle, and 32 multiplier circuits can perform 32 multiplications between 4-bit number and 2-bit number.

For 8-bit input data elements and 2-bit weight elements (binary or ternary), each input data element can be split into two 4-bit data values, where two multiplier circuits perform operations for one 8-bit data element and one 2-bit weight element. Accordingly, the array of 32 multiplier circuits can perform 32/2 computation operations of 8-bit input data and 2-bit weights per clock cycle.

For 8-bit input data elements and 4-bit weight elements, each input data element can be split into two 4-bit data values, and each 4-bit weight element can be split into two 2-bit weight values, where four multiplier circuits perform operations for one 8-bit data element and one 4-bit weight element. Accordingly, the array of 32 multiplier circuits can perform 32/(2*2) computation operations of 8-bit input data and 4-bit weights per clock cycle.

For 8-bit input data elements and 8-bit weight elements, each input data element can be split into two 4-bit data values, and each weight element can be split into four 2-bit weight values, where eight multiplier circuits perform operations for one 8-bit data element and one 8-bit weight element. Accordingly, the array of 32 multiplier circuits can perform 32/(2*4) computation operations of 8-bit input data and 4-bit weights per clock cycle.

For 4-bit input data elements and 4-bit weight elements, each weight element can be split into two 2-bit weight values, where two multiplier circuits perform operations for one 4-bit data element and one 2-bit weight element. Accordingly, the array of 32 multiplier circuits can perform 32/2 computation operations of 4-bit input data and 2-bit weights per clock cycle.

For binary weights and data, MAC engine 1330 (or computing engine 524) can internally convert a binary weight to a 2-bit weight. As to be described below, each multiplier circuit can perform four bit-wise computation operations (e.g., XNOR) between the binary weights and data, and the array of 32 multiplier circuits can perform 128 computation operations of the binary weights and data per clock cycle.

TABLE 1

| Input Precision | Weights Precision | #inputs | #outputs | #MACs/cycle |
|---|---|---|---|---|
| Signed/Unsigned 8 bit | Binary (−1, 1) | 4 | 4 | 16 |
| Signed/Unsigned 8 bit | Ternary (−1, 0, 1) | 4 | 4 | 16 |
| Signed/Unsigned 8 bit | Signed 4 bit | 4 | 2 | 8 |
| Signed/Unsigned 8 bit | Signed 8 bit | 4 | 1 | 4 |
| Signed/Unsigned 4 bit | Signed 4 bit | 4 | 4 | 16 |
| Signed/Unsigned 4 bit | Ternary (−1, 0, 1) | 8 | 4 | 32 |
| Binary (−1, 1) | Binary (−1, 1) | 16 | 8 | 128 |

Figure 17:
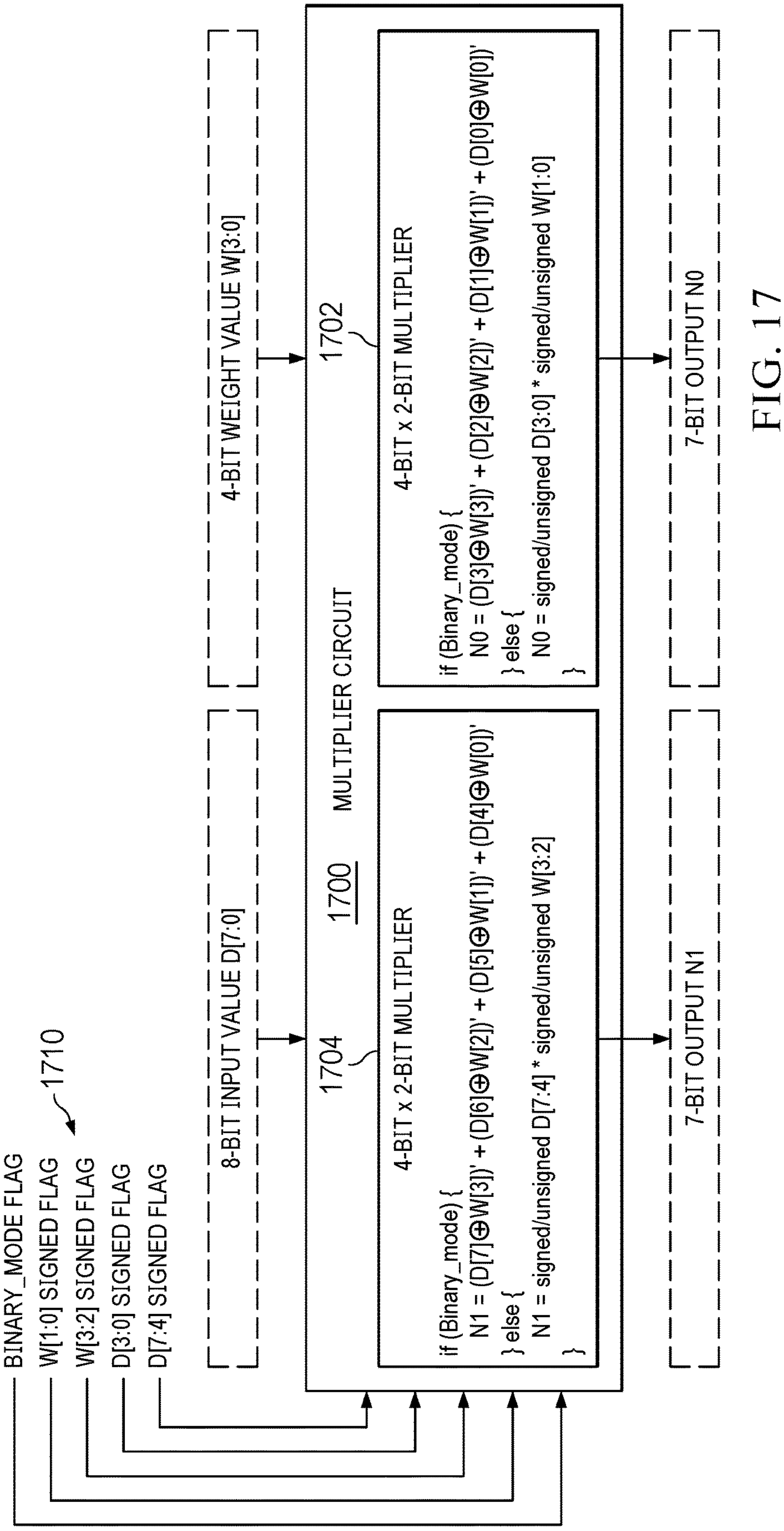
FIG. 17 is a schematic diagram illustrating a multiplier circuit of the computing engine of FIG. 13, according to some examples.

FIG. 17 illustrates operations of an example multiplier circuit 1700 that can be part of MAC engine 1300. The example multiplier circuit 1700 can perform a multiplication operation illustrated in FIG. 16, such as multiplication operation 1602. Multiplication circuit 1700 can receive an 8-bit input value D[7:0], which can be one of X[0]-X[3] of FIG. 16, and a 4-bit weight value W[3:0], which can be one of weight values (e.g., W[0,0]) of FIG. 16. Each of input value D and weight value W can be signed or unsigned. Multiplier circuit 1700 can include two 4-bit×2-bit multiplier circuits 1702 and 1704. In FIG. 17, the logic operations of multiplier circuits 1702 and 1704 are represented in the form of instructions, which can be synthesized into (and represent) logic circuits representing multiplier circuits 1702 and 1704.

Multiplier circuit 1700 can receive multiplier configuration 1710 to configure each of multiplier circuits 1702 and 1704 to perform multiplication operations in various modes. Multiplier configuration 1710 can be part of precision configuration 1312 and can include a first flag that indicates whether D[7:4] is signed (e.g., D[7:4] is signed if the flag is asserted or represents a logical, unsigned if the flag is deasserted or represents a logical zero), a second flag that indicates whether D[3:0] is signed (both based on input precision), a third flag that indicates whether W[3:2] is signed, a fourth flag that indicates whether W[1:0] is signed (both based on weight precision), and a fifth flag that indicates whether to operate in binary mode. Multiplier circuits 1702 and 1704 can operate in binary mode if precision configuration 1312 indicates that both input data and weights have one-bit (binary) precisions.

If multiplier configuration 1710 indicates that binary mode is disabled, multiplier circuit 1702 can generate output N0 as 7-bit signed number by performing a multiplication operation between four-bit LSBs D[3:0] and two-bit LSBs W[1:0], and multiplier circuit 1704 can generate an output N1 as 7-bit signed number by performing a multiplication operation between four-bit MSBs D[7:4] and two-bit MSBs W[3:2]. The multiplication operation for NO can be a signed multiplication operation if at least one of D[3:0] or W[1:0] is signed, and the multiplication operation for N1 can be a signed multiplication operation if at least one of D[7:4] or W[3:2] is signed, based on multiplier configuration 1710.

On the other hand, if multiplier configuration 1710 indicates that binary mode enabled, multiplier circuit 1702 can generate an 8-bit output N0 by performing bitwise XNOR operation between D[3:0] and W[3:0] (e.g., (D[3](W[3])' in FIG. 17), and summing the bitwise XNOR outputs. Also, multiplier circuit 1704 can generate an 8-bit output N1 by performing bitwise XNOR operation between D[7:4] and W[3:0], and summing the bitwise XNOR outputs. A truth table for XNOR operation is provided below, where −1 is represented by a logical zero and +1 is represented by a logical one. As can be seen from the able, multiplication of two binary numbers thus represented can be computed using XNOR operation.

TABLE 2

| XNOR input0 | XNOR input1 | XNOR output |
|---|---|---|
| +1 | +1 | +1 |
| +1 | −1 | −1 |
| −1 | +1 | −1 |
| −1 | −1 | +1 |

Figure 18:
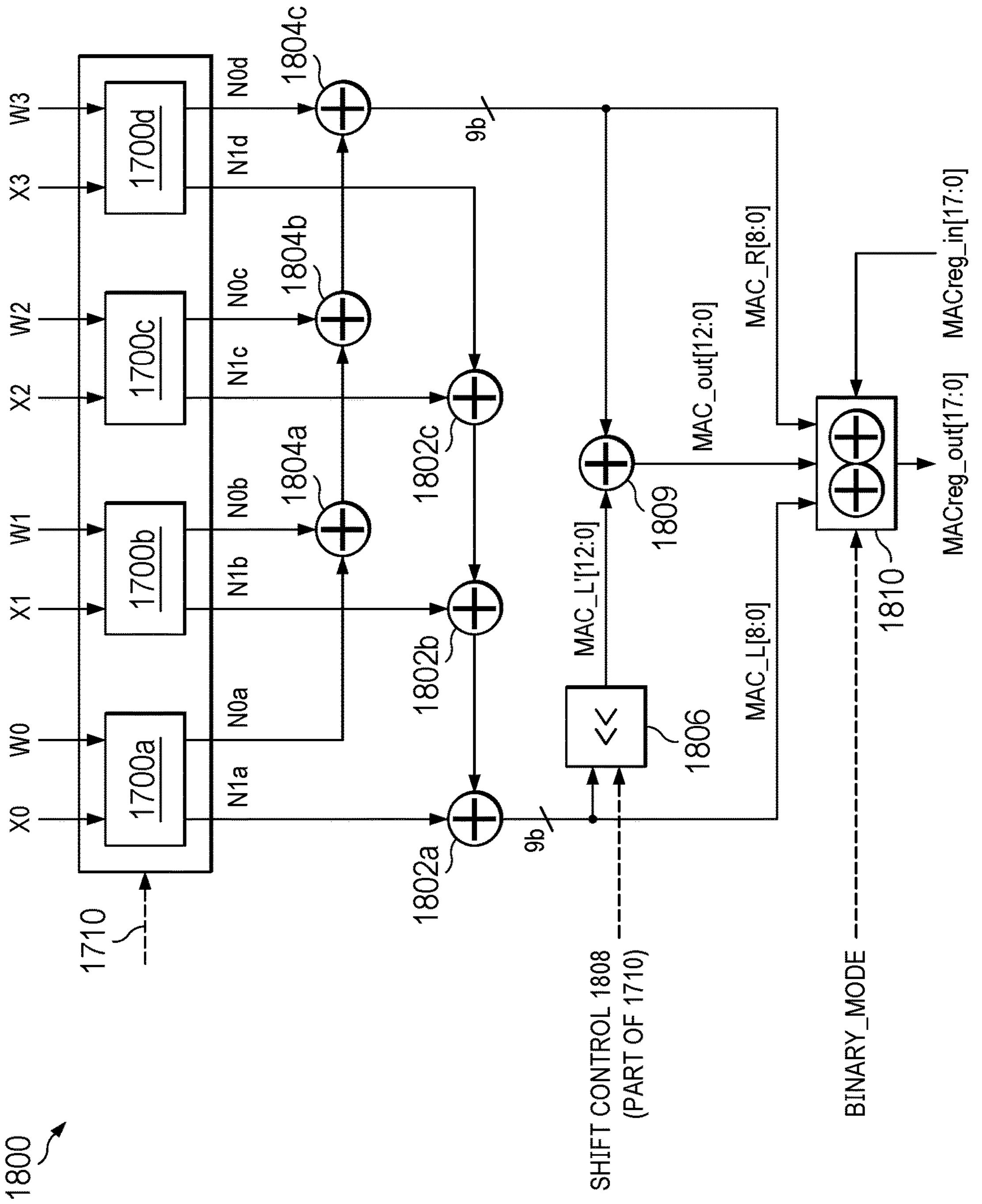
FIG. 18 is a schematic diagram illustrating a computation unit of the computing engine of FIG. 13, according to some examples.

MAC engine 1300 can include multiple computation units, each including a set of multiplier circuits 1700 and other logic circuits, to perform MAC operations to generate an intermediate output data element for a range of input precisions and weight precisions described in Table 1. FIG. 18 illustrates an example of computation unit 1800. Referring to FIG. 18, computation unit 1800 can have four computation data inputs to receive, respectively, X0, X1, X2, and X3 shown in FIG. 18. Computation unit 1800 also has four computation weights inputs to receive, respectively, W0, W1, W2, and W3 shown in FIG. 18. Computation unit 1800 also includes four multiplier circuits 1700, including 1700*a*, 1700*b*, 1700*c*, and 1700*d*. The inputs of multiplier circuit 1700*a* are coupled to the first computation data input and the first computation weights input. The inputs of multiplier circuit 1700*b* are coupled to the second computation data input and the second computation weights input. The inputs of multiplier circuit 1700*c* are coupled to the third computation data input and the third computation weights input. The inputs of multiplier circuit 1700*d* are coupled to the fourth computation data input and the fourth computation weights input. Each multiplier circuit 1700 generates two 7-bit outputs N0 and N1, as described above. Multiplier circuit 1700*a* generates 7-bit outputs N0*a* and N1*a*, multiplier circuit 1700*b* generates 7-bit outputs N0*b* and N1*b*, multiplier circuit 1700*c* generates 7-bit outputs N0*c* and N1*c*, and multiplier circuit 1700*d* generates 7-bit outputs N0*d* and N1*d*. Each multiplier circuits 1700*a-d* also receives multiplier configuration 1710, as described above.

Computation unit 1800 also includes adders 1802*a*, 1802*b*, and 1802*c*, and adders 1804*a*, 1804*b*, and 1804*c*. Adders 1802*a*, 1802*b* and 1802*c* generate a sum of N1*a*, N1*b*, N10*c*, and N1*d* as MAC_L, which has 9 bits and are represented as signed numbers when operating in non-binary mode. Also, adders 1804*a*, 1804*b* and 1804*c* generate a sum of N0*a*, N0*b*, N0*c*, and N0*d* as MAC_R, which also has 9 bits and are represented as signed numbers in non-binary mode. Computation unit 1800 also includes a bit shifter circuit 1806 can perform a left shift of MAC_L by a number of bits specified in shift control 1808 to generate MAC_L'. Computation unit 1800 can receive shift control 1808 from configuration registers 528*c*. As to be described below, the amount of left bit shift is based on the input and weight precision. Further, computation unit 1800 includes an adder 1809 that generates a sum of MAC_R and MAC_L' as MAC_out, which has 13 bits and can be represented as a signed number in non-binary mode, as a MAC output. MAC_L and MAC_R can also be the MAC outputs.

Figure 19:
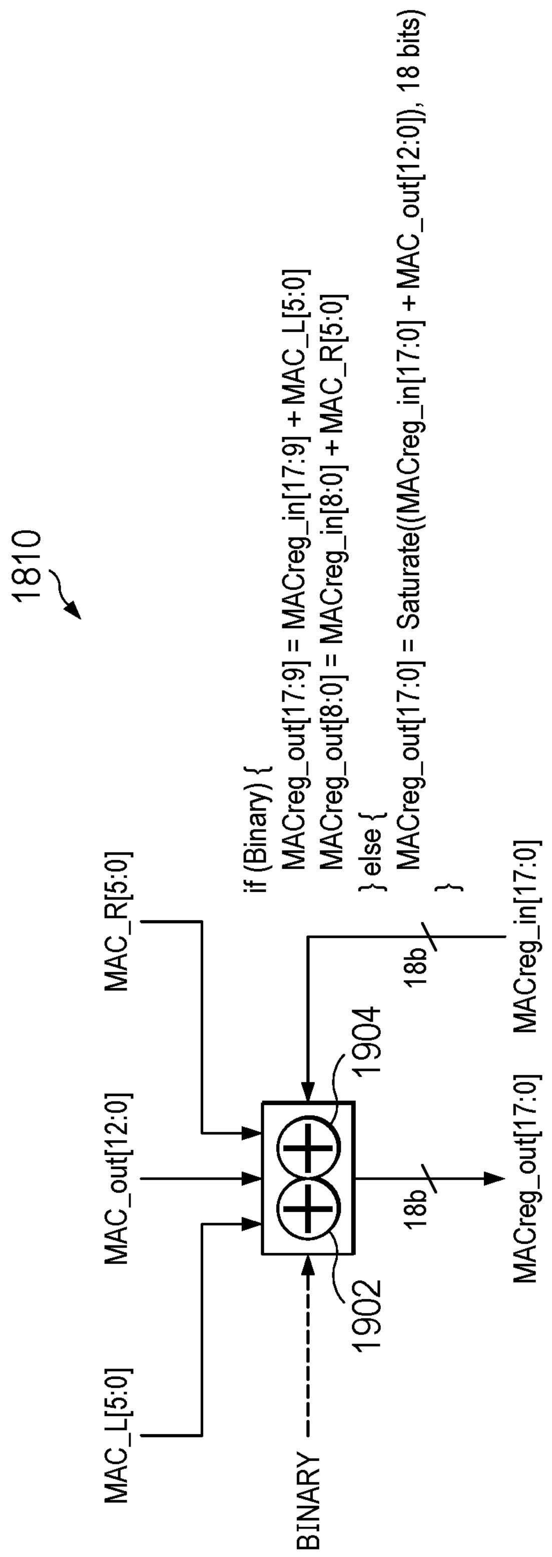
FIG. 19 is a schematic diagram illustrating an accumulator of the computation unit of FIG. 18, according to some examples.

Computation unit 1800 also includes an accumulator 1810 that can receive MACreg_in (18 bits) as the old partial sum, update the old partial sum by adding to it the MAC output to generate the new partial sum MACreg_out. FIG. 19 illustrates example internal components of accumulator 1810 and their operations. In FIG. 19, the logic operations of accumulator 1810 are represented in the form of instructions, which can be synthesized into (and represent) a logic circuit representing accumulator 1810.

Referring to FIG. 19, accumulator 1810 may include two adders 1902 and 1904, each can be a 9-bit adder. If MAC engine 1300 does not operate in the binary mode, adder 1902 and 1904 can form an 18-bit adder, and the 18-bit adder updates the old partial sum (MACreg_in) by adding to the 13-bit MAC_out to the 18-bit old partial sum. Adder 1904 can perform the 9-bit addition between the 9-bit LSBs of MAC_out and MACreg_in first, and then propagate the carry over (if any) to adder 1902 for the addition between the MSB of MAC_out and the MSBs of MACreg_in, to generate the 18-bit MACreg_out. The addition/summation can be a saturating addition and can be represented by:

$$\text{MACreg\_out}[17:0]=\text{Saturate}((\text{MACreg\_in}[17:0]+\text{MAC\_out}[12:0]),18\text{ bits}) \quad \text{(Equation 2)}$$

On the other hand, if MAC engine 1300 operates in the binary mode, each of N0*a*, N0*b*, N0*c*, and N0*d*, and each of N1*a*, N1*b*, N1*c*, and N1*d*, can take maximum value of 4, and MAC_L and MAC_R can each take a maximum value of 16. Adder 1902 and 1904 can be two separate 9-bit adders. Adder 1902 can generate the 9-bit MSBs of MACreg_out by summing the 9-bit MSBs of MACreg_in and 6-bit LSBs of MAC_L. Adder 1904 can generate the 9-bit LSBs of MACreg_out by summing the 9-bit LSBs of MACreg_in and 6-bit LSBs of MAC_R. Because there is no carry over from adder 1904 to adder 1902, adders 1902 and 1904 can perform the addition in parallel and speed up the updating of the partial sum.

Figure 20A:
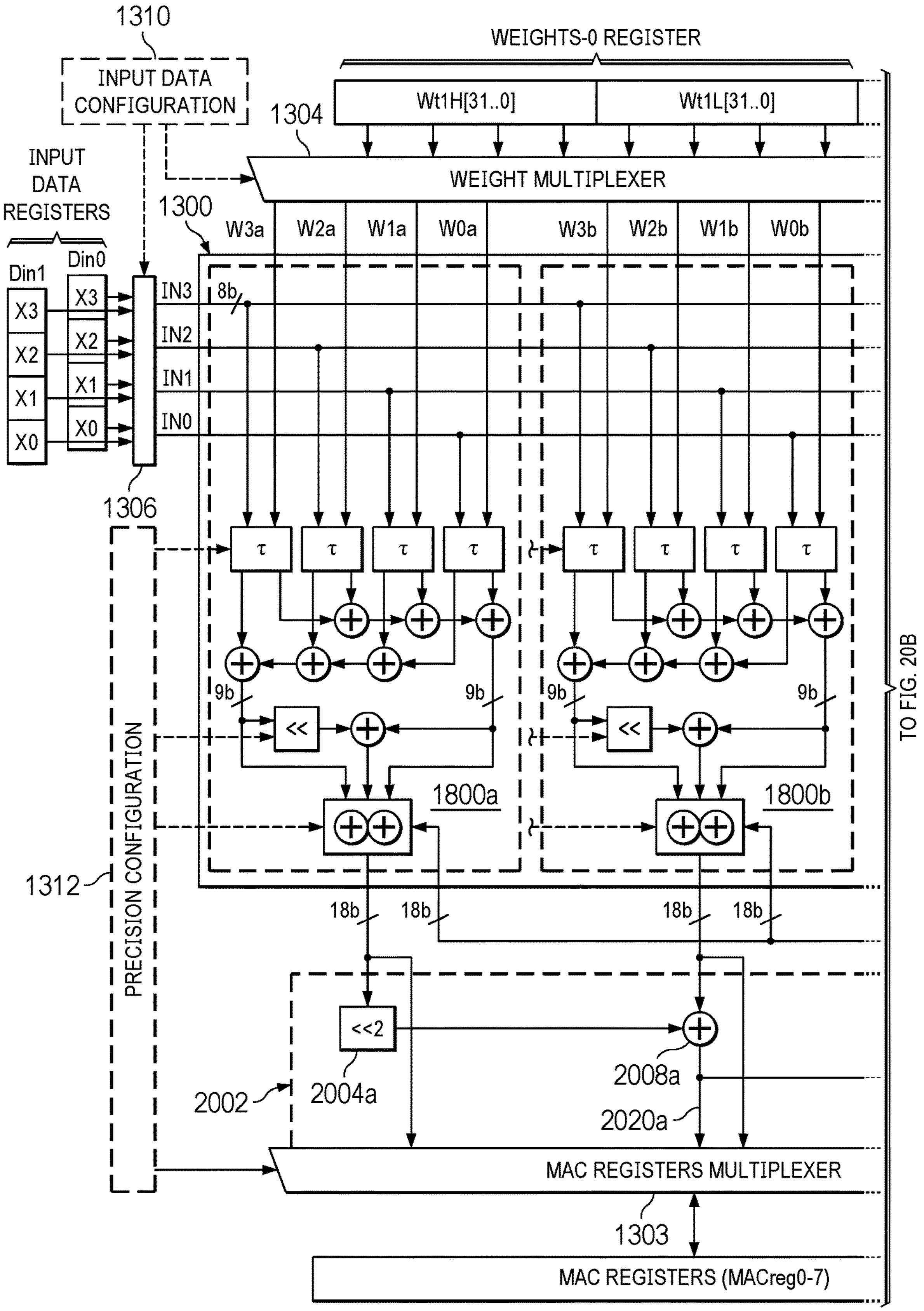
FIGS. 20A and 20B are schematics illustrating internal components of the computing engine of FIG. 13 including the computation units of FIG. 18, according to some examples.
Figure 20B:
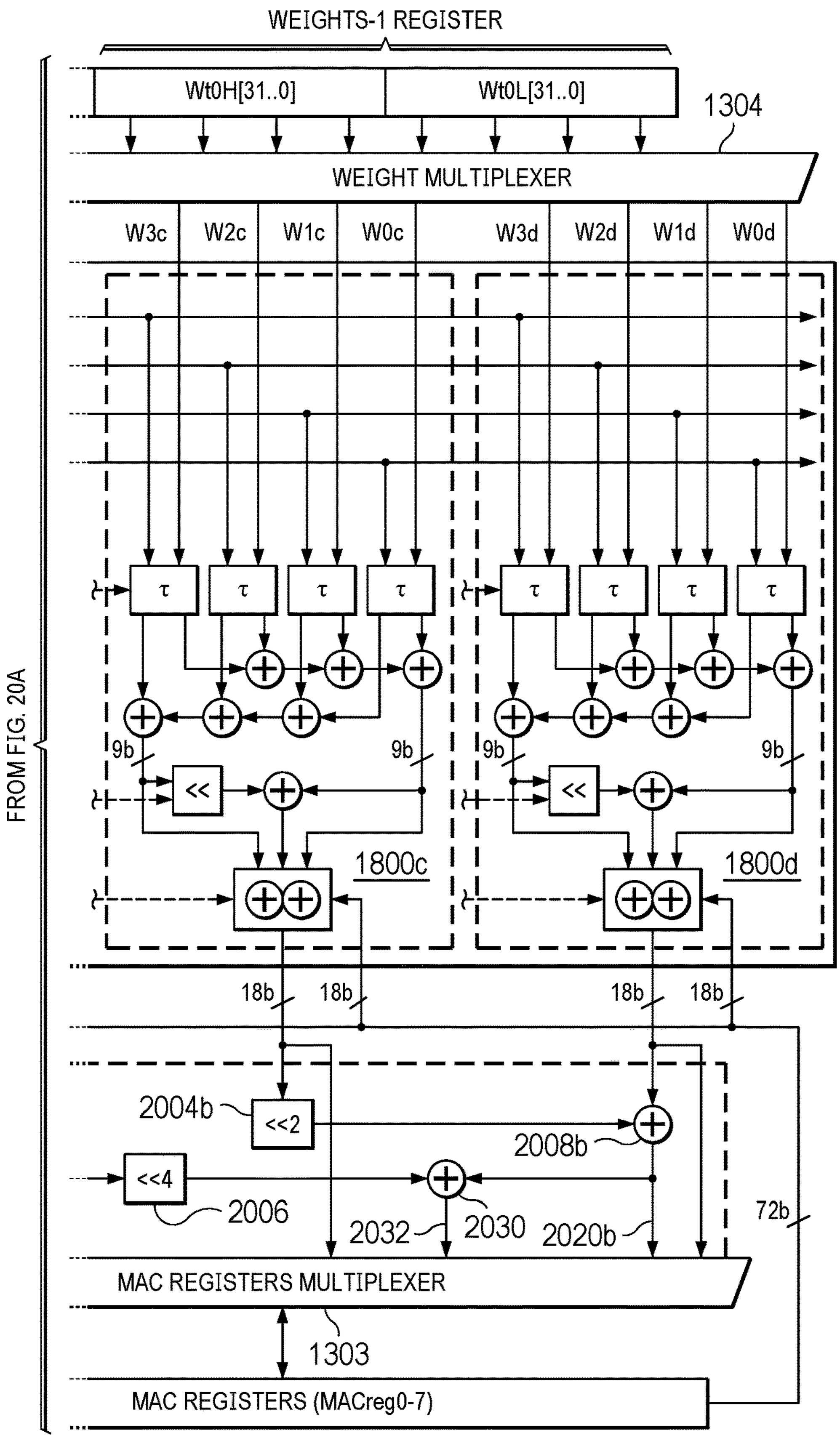

FIGS. 20A and 20B are schematics illustrating MAC engine 1300 including computation units 1800 of FIG. 18. Referring to FIGS. 20A and 20B, MAC engine 1300 includes computation units 1800*a*, 1800*b*, 1800*c*, and 1800*d*. MAC engine 1300 has first, second, third, and fourth MAC data inputs to receive, respectively, 8-bit input data IN0, IN1, IN2, and IN3, from input data multiplexer 1306. The first computation data input of each computation unit is coupled to the first MAC data input (to receive IN0). The second computation data input of each computation unit is coupled to the second MAC data input (to receive IN1). The third computation data input of each computation unit is coupled to the third MAC data input (to receive IN2). The fourth computation data input of each computation unit is coupled to the fourth MAC data input (to receive IN3). Input data multiplexer 1306 selectively forwards input data from one of Din0 or Din1 input data registers and, depending on D4 or D8 mode, can forward all the bits stored in the input data register (e.g., 32 bits, including four 8-bit input data) or duplicates of half of the bits (16 bits). For example, in D8 mode, input data multiplexer 1306 can forward X0 (associated with input channel 0) as IN0, X1 (associated with input channel 1) as IN1, X2 (associated with input channel 2) as IN2, and X3 (associated with input channel 3) as IN3. In D4 mode, input data multiplexer 1306 can forward duplicates of bottom half (LSBs) of X2 bits as IN0, duplicates of top half (MSBs) of X2 bits as IN1, duplicates of bottom half of X3 bits as IN2, and duplicates of top half of X3 bits as IN3. It can also forward duplicates of bottom half of X0 bits as IN0, duplicates of top half of X0 bits as IN1, duplicates of bottom half of X1 bits as IN2 and duplicates of top half of X1 as IN3

Also, MAC engine 1300 includes groups of first, second, third, and fourth MAC weights inputs. Each computation unit is coupled a respective group of first, second, third, and fourth MAC weights inputs, where the first computation weights input is coupled to the first MAC weights input of the group, the second computation weights input is coupled to the second MAC weights input of the group, the third computation weights input is coupled to the third MAC weights input of the group, and the fourth computation weights input is coupled to the fourth MAC weights input of the group. Each computation unit can receive four 4-bit weights from weight multiplexer 1304. For example, computation unit 1800*a* receives 4-bit weights W0*a*, W1*a*, W2*a*, and W3*a* at, respective, the first, second, third, and fourth computation weights inputs of computation unit 1800*a*. Computation unit 1800*b* receives 4-bit weights W0*b*, W1*b*, W2*b*, and W3*b* at, respective, the first, second, third, and fourth computation weights inputs of computation unit 1800*b*. Computation unit 1800*c* receives 4-bit weights W0*c*, W1*c*, W2*c*, and W3*c* at, respective, the first, second, third, and fourth computation weights inputs of computation unit 1800*c*. Also, computation unit 1800*d* receives 4-bit weights W0*d*, W1*d*, W2*d*, and W3*d* at, respective, the first, second, third, and fourth computation weights inputs of computation unit 1800*d*. In FIG. 20, a first group of first, second, third, and fourth MAC weights inputs can receive, respectively, W0*a*, W1*a*, W2*a*, and W3*a*. A second group of first, second, third, and fourth MAC weights inputs can receive, respectively, W0*b*, W1*b*, W2*b*, and W3*b*. A third group of first, second, third, and fourth MAC weights inputs can receive, respectively, W0*c*, W1*c*, W2*c*, and W3*c*. A fourth group of first, second, third, and fourth MAC weights inputs can receive, respectively, W0*d*, W1*d*, W2*d*, and W3*d*.

Weight multiplexer 1304 can selectively forward weights from one of weight-0 register or weight-1 register. In D4 mode, computation units 1800*a* and 1800*b* can receive 32 top half bits of the selected weight register, and computation units 1800*c* and 1800*d* can receive 32 bottom half bits of the selected register. In D8 mode, computation units 1800*a* and 1800*b* can receive duplicates of half of top half bits (16 bits) of selected weight register, and computation units 1800*c* and 1800*d* can receive duplicates of half of bottom half bits (16 bits) of selected weight register. The computation units 1800*a-d* can store intermediate output data elements in one MAC register, where each intermediate output data element can have 18 bits.

FIGS. 20A and 20B also illustrate a data merge circuit 2002, which can be part of MAC engine 1300 or post processing engine 1302. As to be described below, for certain input and weight precisions, the outputs of some or all of computation units 1800*a-d* can be merged to generate a particular intermediate output data element. Data merge circuit 2002 includes bit shifters 2004*a*, 2004*b*, and 2006. Bit shifter 2004*a* is configured to perform a left shift of two bits on the 18-bit output of computation unit 1800*a*, and bit shifter 2004*b* is configured to perform a left shift of two bits on the 18-bit output of computation unit 1800*c*. Data merge circuit 2002 also includes adders 2008*a*, 2008*b*, and 2030. Adder 2008*a* can add the left shifted version of the output of computation unit 1800*a* to the output of computation unit 1800*b* to generate a partial sum 2020*a*. Adder 2008*b* can add the left shifted version of the output of computation unit 1800*c* to the output of computation unit 1800*d* to generate a partial sum 2020*b*. Bit shifter 2006 is configured to perform a left shift of four bits on partial sum 2020*a*. Data merge circuit 2002 also includes adder 2030 to generate partial sum 2032 by adding the left shifted version of partial sum 2020*a* to partial sum 2020*b*. MAC registers multiplexer 1303 can receive the 18-bit outputs of computation units 1800*a*-1800*d*, partial sums 2020*a*, 2020*b*, and 2032, and select one of them to store into a MAC register based on the input and weight precision, as to be described below.

FIGS. 21A-21F also illustrates the different configurations of computation engines 1800*a-d*, data merge circuit 2002, weight multiplexer 1304, input data multiplexer 1303, and MAC registers multiplexer 1303 to support MAC operations involving different input and weight precisions.

Figures 1, 21A:
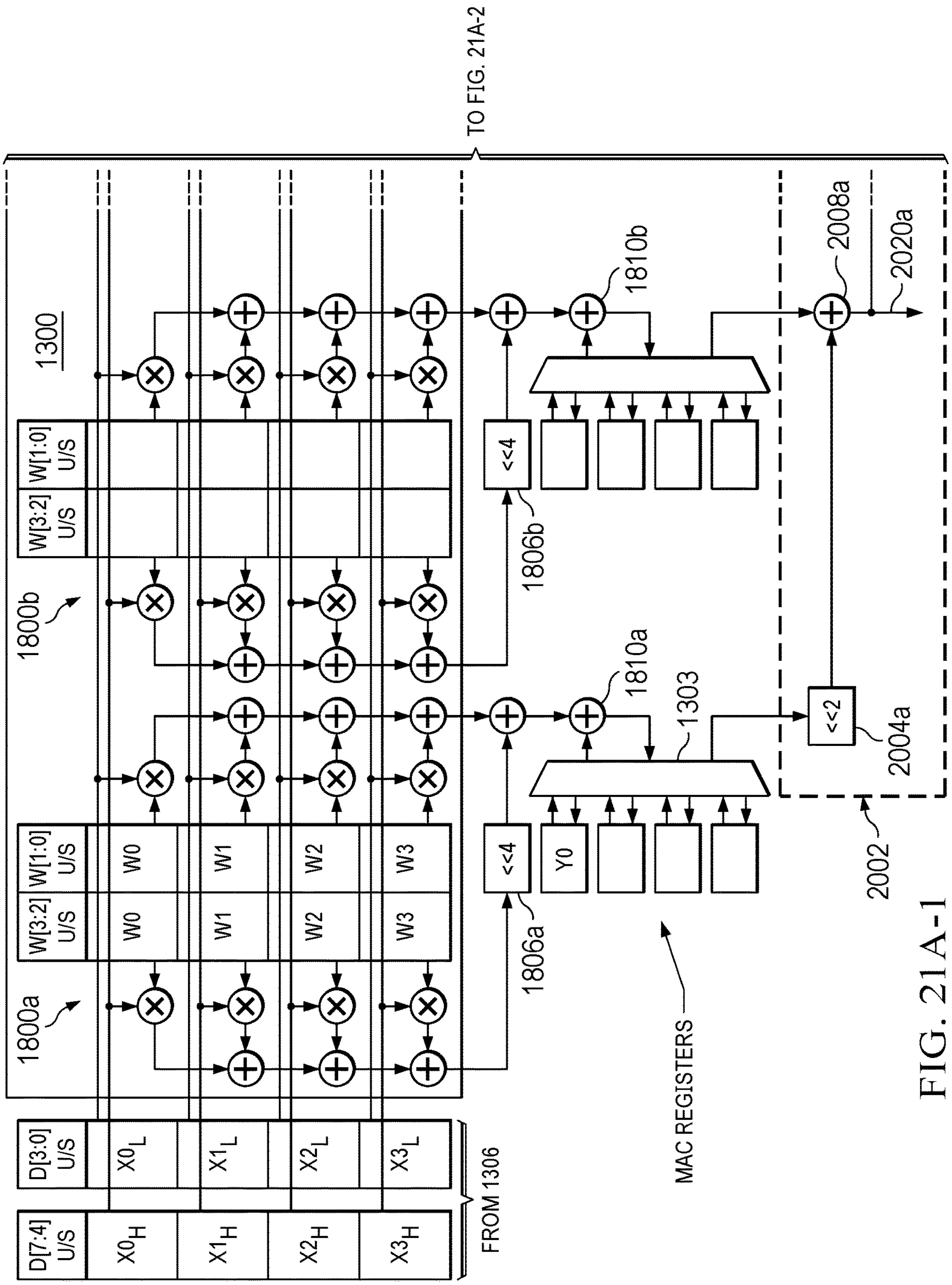
Figures 2, 21A:
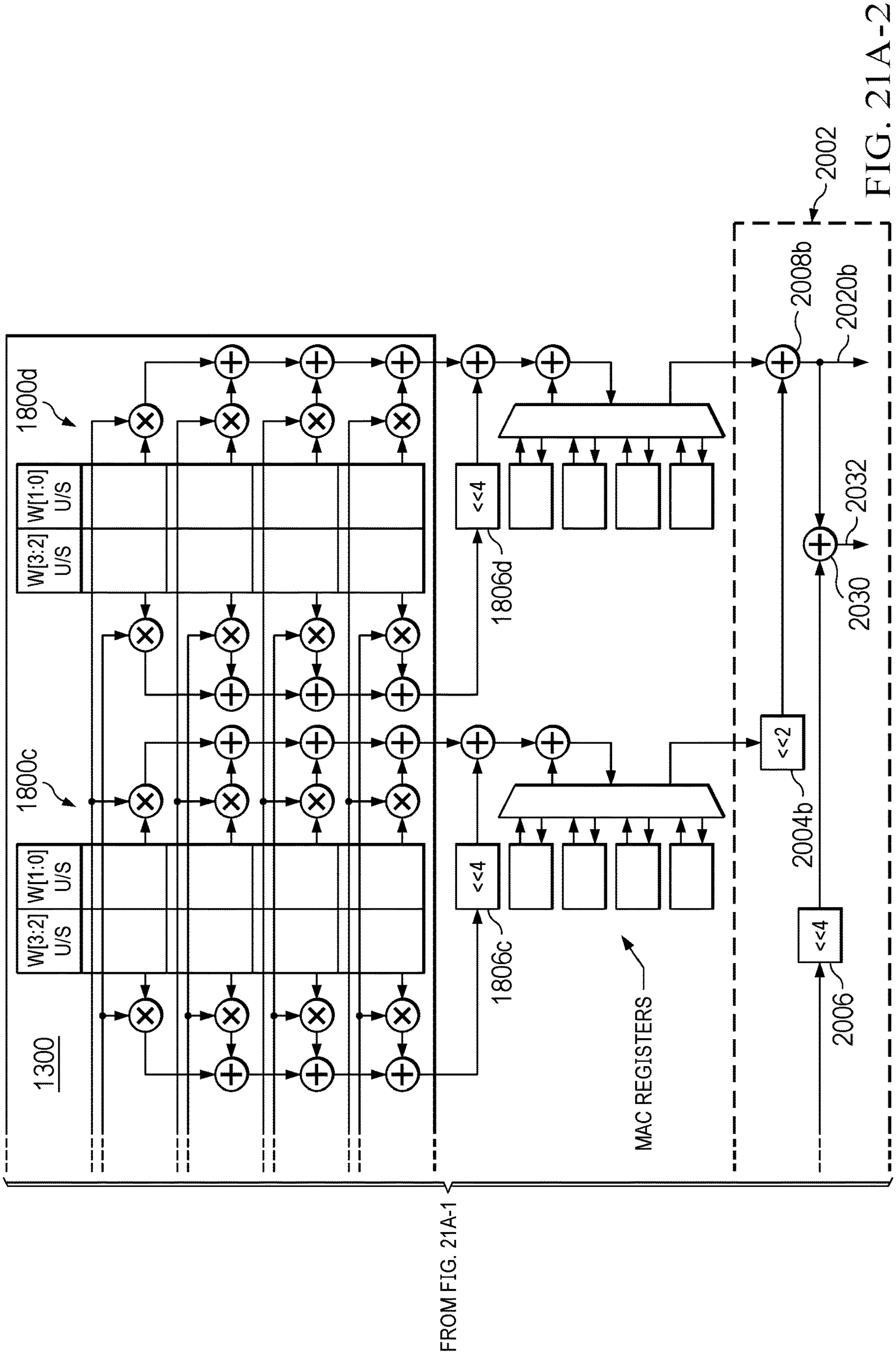

FIGS. 21A-1 and 21A-2 illustrate an example configuration where each input data element is an 8-bit number and each weight element is a 2-bit number. Input data multiplexer 1306 can operate in D8 mode and provide 32 bits of input data including four 8-bit input data elements in each cycle. The 2-bit weight element can be a ternary weight (−1, 0, 1), or expanded from a 1-bit binary weight (e.g., +1 mapped to bits 01, and −1 mapped to bits 11). Also, weight multiplexer 1304 can operate in D8 mode, where it duplicates of half of the stored weight elements in a weight register to provide 32 bits of weight (including 16×2-bit weight elements). Computation unit 1800*a* can receive four 8-bit input data elements at the first, second, third, and fourth computation data inputs, and four duplicates of 2-bit weight elements at the first, second, third, and fourth weights inputs. Computation unit 1800*a* can compute a partial sum for one of the intermediate output data elements, such as Y0, as follows:

$$Y0=(W0*X0_H+W1*X1_H+W2*X2_H+W3*X3_H)<<4+(W0*X0_L+W1*X1_L+W2*X2_L+W3*X3_L) \quad \text{(Equation 3)}$$

In Equation 3, each of W0, W1, W2, and W3 is a 2-bit weight element. X0, X1, X2, and X3 each is an 8-bit input data element. $X0_H$, $X1_H$, $X2_H$, and $X3_H$ are, respectively, the 4-bit MSBs (also represented as D[7:4] bits) of X0, X1, X2, and X3, whereas $X0_L$, $X1_L$, $X2_L$, and $X3_L$ are, respectively, the 4-bit LSBs (also represented as D[3:0] bits) of X0, X1, X2, and X3. Multiplier circuit 1700*a* (of computation unit 1800*a*) generates $W0*X0_H$ as N0*a* and $W0*X0_L$ as N0*b*, multiplier circuit 1700*b* generates $W1*X1_H$ as N1*a* and $W1*X1_L$ as N1*b*, multiplier circuit 1700*c* generates $W2*X2_H$ as N2*a* and $W2*X2_L$ as N2*b*, and multiplier circuit 1700*d* generates $W3*X3_H$ as N3*a* and $W3*X3_L$ as N3*b*. Shift control 1808 can control bit shifter circuit 1806*a* to left shift MAC_L by 4 bits. MAC registers multiplexer 1303 can selectively connect the output of accumulator 1810*a* to MAC registers and bypass data merge circuit 2002.

Figures 1, 21B:
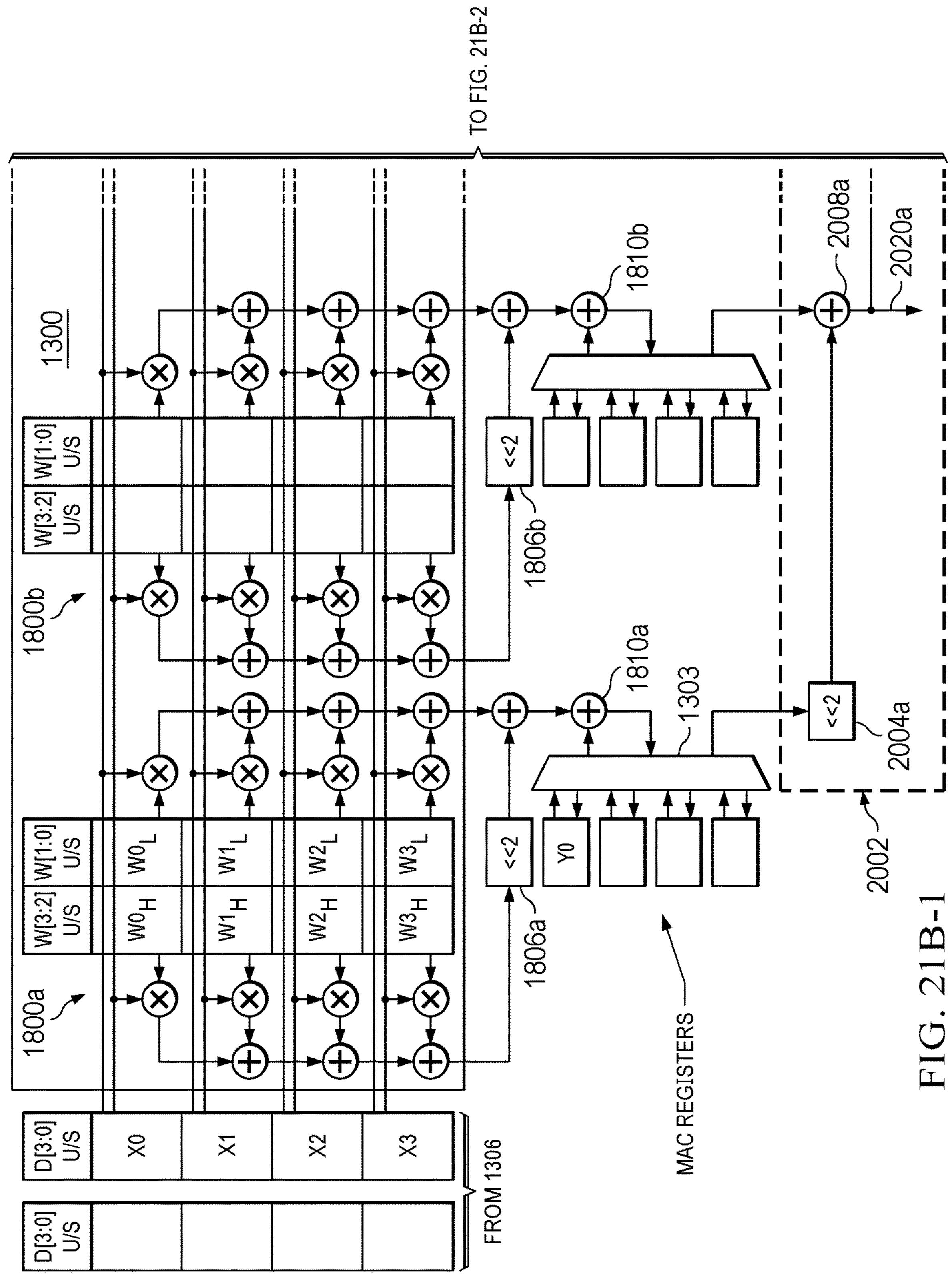
Figures 2, 21B:
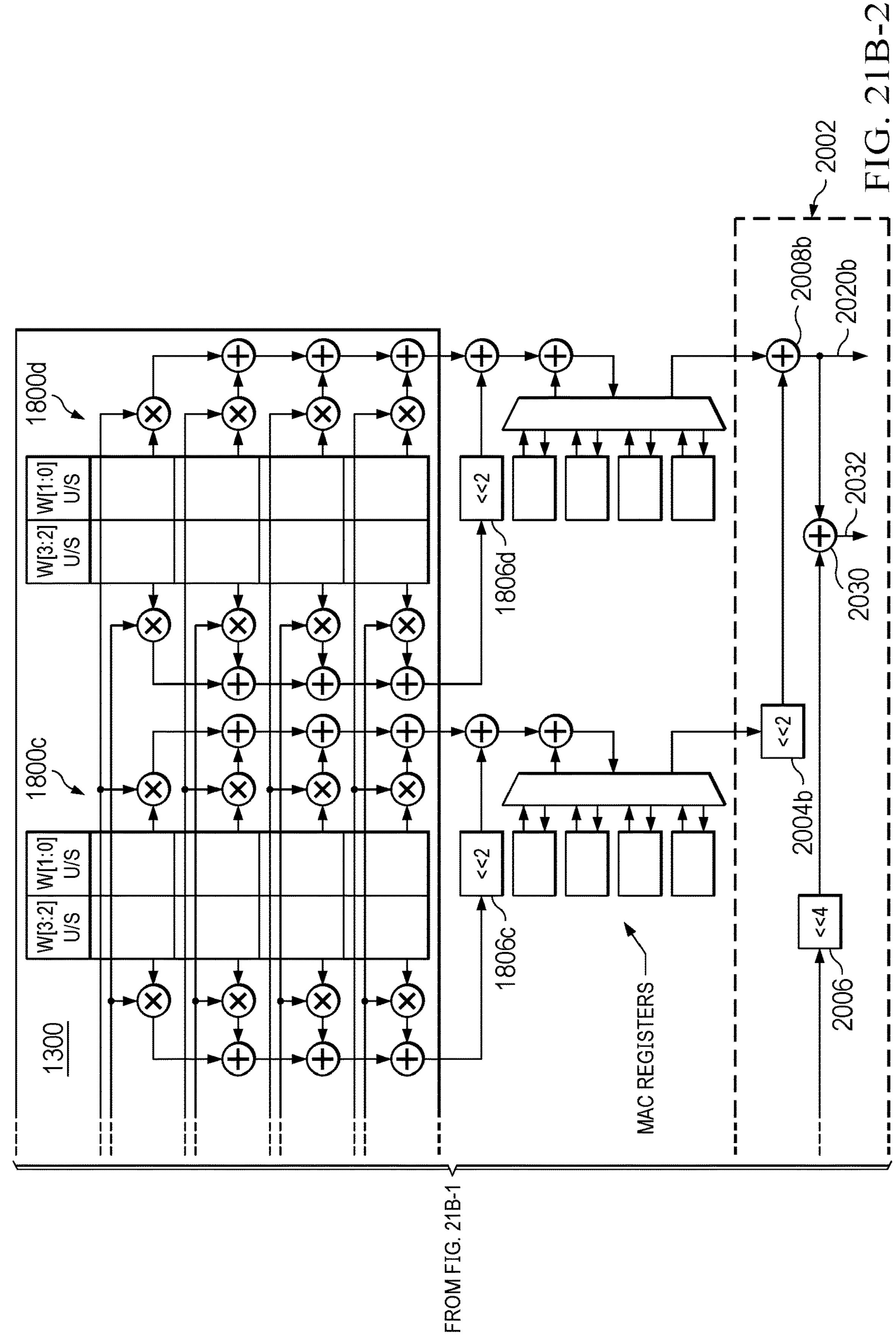

FIGS. 21B-1 and 21B-2 illustrate an example configuration where each input data element is a 4-bit number and each weight element is a 4-bit number. Input data multiplexer 1306 can operate in D4 mode and provide 16 bits of input data including four 4-bit input data elements (e.g., by duplicating half of bits in Din0/Din1 register) in each cycle. Also, weight multiplexer 1304 can also operate in D4 mode, where it provides all of the stored weight elements in a weight register to provide 64 bits of weight (including 16×4-bit weight elements). Computation unit 1800*a* can receive duplicates of 4-bit X0, X1, X2, X3, (each represented as D[3:0] bits)d at the first, second, third, and fourth computation data inputs, and four 4-bit weight elements at the first, second, third, and fourth computation weights inputs. Computation unit 1800*a* can compute a partial sum for Y0, as follows:

$$Y0=(W0_H*X0+W1_H*X1+W2_H*X2+W3_H*X3)<<2+(W0_L*X0+W1_L*X1+W2_L*X2+W3_L*X3) \quad \text{(Equation 4)}$$

In Equation 4, each of W0, W1, W2, and W3 is a 4-bit weight element. X0, X1, X2, and X3 each is a 4-bit input data element. $W0_H$, $W1_H$, $W2_H$, and $W3_H$ are, respectively, the 2-bit MSBs of W0, W1, W2, and W3, whereas $W0_L$, $W1_L$, $W2_L$, and $W3_L$ are, respectively, the 2-bit LSBs of W0, W1, W2, and W3. Multiplier circuit 1700*a* receives X0 and X4 (from input data multiplexer 1306 operating in D4 mode) as an 8-bit input and W0 as a 4-bit input and generates X0*W$0_H$ as N0*a* and X4*W$0_L$ as N0*b*. Also, multiplier circuit 1700*b* generates X1*W$1_H$ as N1*a* and X5*W$1_L$ as N1*b*, multiplier circuit 1700*c* generates X2*W$2_H$ as N2*a* and X6*W$2_L$ as N2*b*, and multiplier circuit 1700*d* generates X3*W$3_H$ as N3*a* and X7*W$3_L$ as N3*b*. Shift control 1808 can control bit shifter circuit 1806*a* to left shift MAC_L by 2 bits. MAC registers multiplexer 1303 can selectively connect the output of accumulator 1810*a* to MAC registers and bypass data merge circuit 2002.

In a subsequent cycle (not shown in FIGS. 21B-1 and 21B-2), computation unit 1800*a* can receive duplicates of 4-bit X4, X5, X6, X7, and four 4-bit weight elements W4, W5, W6, and W7 at the first, second, third, and fourth computation weights inputs, compute the partial sum based on Equation 2, and add the partial sum to Y0.

Figures 1, 21C:
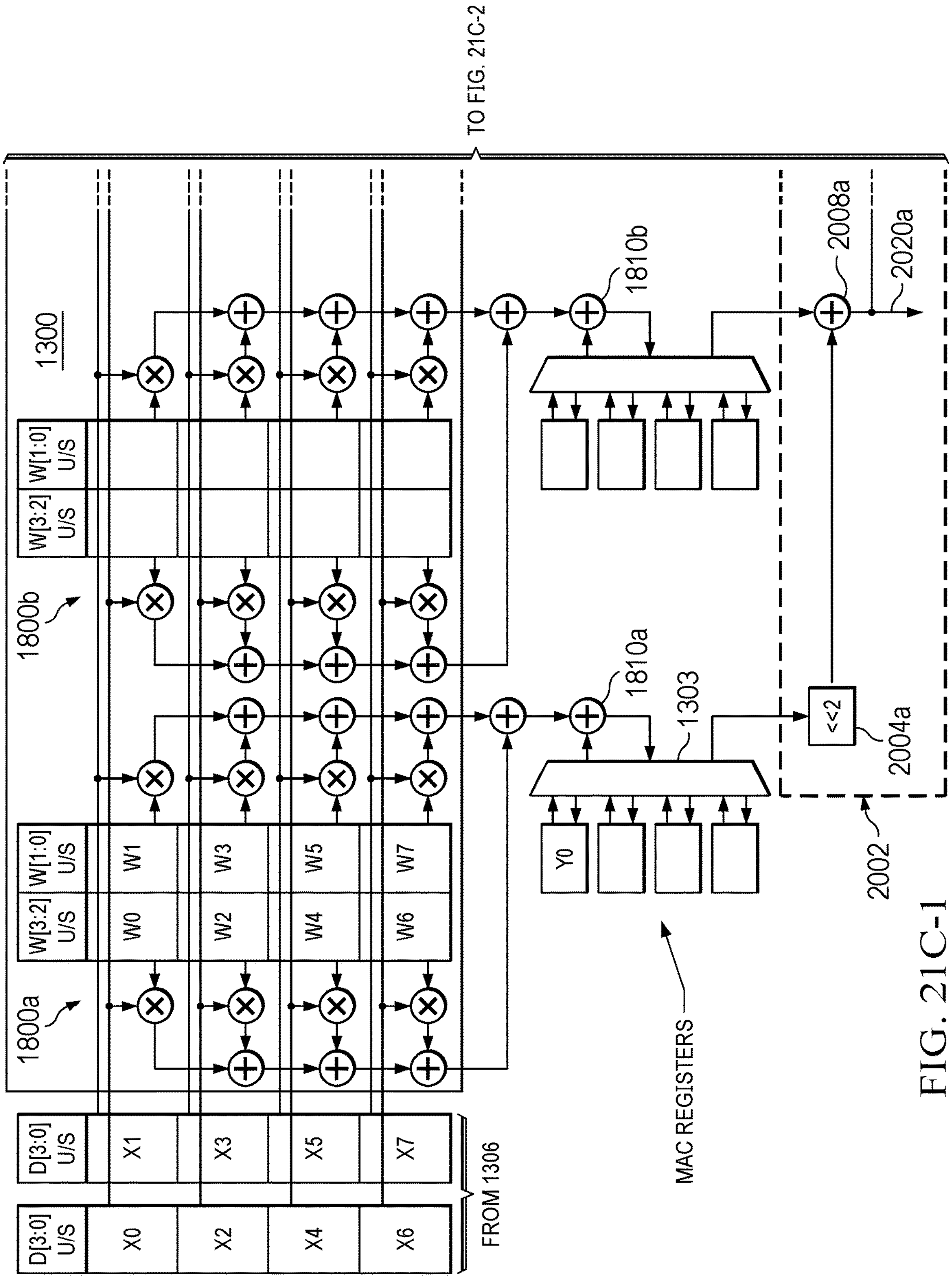
Figures 2, 21C:
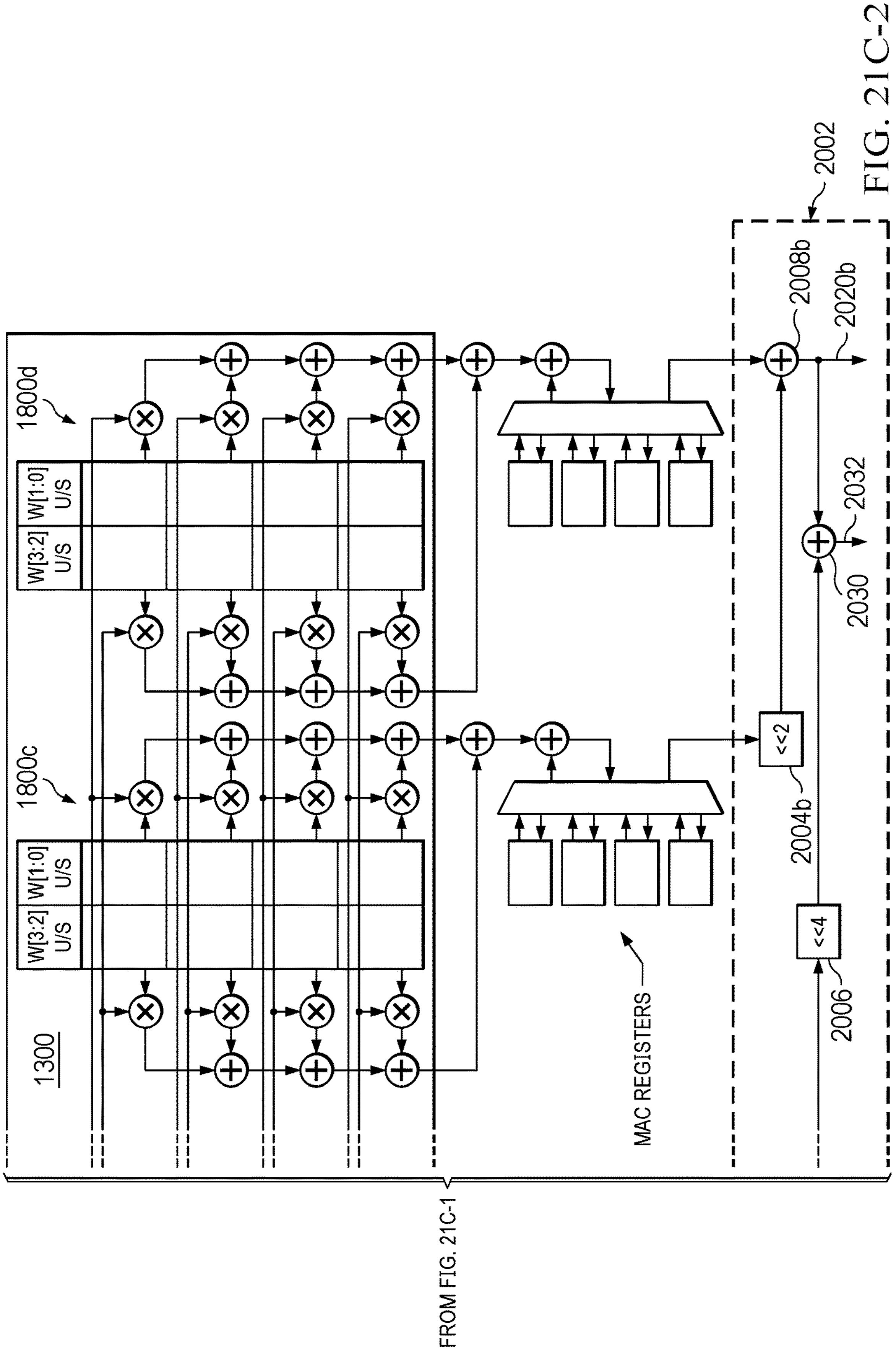

FIGS. 21C-1 and 21C-2 illustrate an example configuration where each input data element is a 4-bit number, each weight element is a 2-bit number. Input data multiplexer 1306 can operate in D8 mode and provide 32 bits of input data including eight 4-bit input data elements in each cycle. Also, weight multiplexer 1304 can also operate in D4 mode, where it provides all of the stored weight elements in a weight register to provide 64 bits of weight (including 32×2-bit weight elements). Computation unit 1800*a* can receive eight 2-bit weight elements, with two 2-bit weight elements at respective first, second, third, and fourth weights input. Computation unit 1800*a* can also receive eight 4-bit input data elements, with two 4-bit input data elements at respective first, second, third, and fourth input data input. Computation unit 1800*a* can compute a partial sum for Y0, as follows:

$$Y0=(W0*X0+W2*X2+W4*X4+W6*X6)+(W1*X1+W3*X3+W5*X5+W7*X7) \quad \text{(Equation 5)}$$

In Equation 5, each of W0, W1, W2, and W3 is a 2-bit weight element. X0, X1, X2, X3, X4, X5, X6, and X7 each is a 4-bit input data element (and represented as D[3:0] bits). Multiplier circuit 1700*a* receives X0 and X1 as an 8-bit input and A0 and A1 as a 4-bit input and generates A0*X0 as N0*a* and A1*X1 as N0*b*. Also, multiplier circuit 1700*b* generates A2*X2 as N1*a* and A3*X3 as N1*b*, multiplier circuit 1700*c* generates A4*X4 as N2*a* and A5*X5 as N2*b*, and multiplier circuit 1700*d* generates A6*X6 as N3*a* and A7*X7 as N3*b*. Shift control 1808 can control bit shifter circuit 1806*a* not to left shift MAC_L. Accordingly, bit shifter circuit 1806*a* is omitted in FIGS. 21C-1 and 21C-2. MAC registers multiplexer 1303 can selectively connect the output of accumulator 1810*a* to MAC registers and bypass data merge circuit 2002.

Figures 1, 21D:
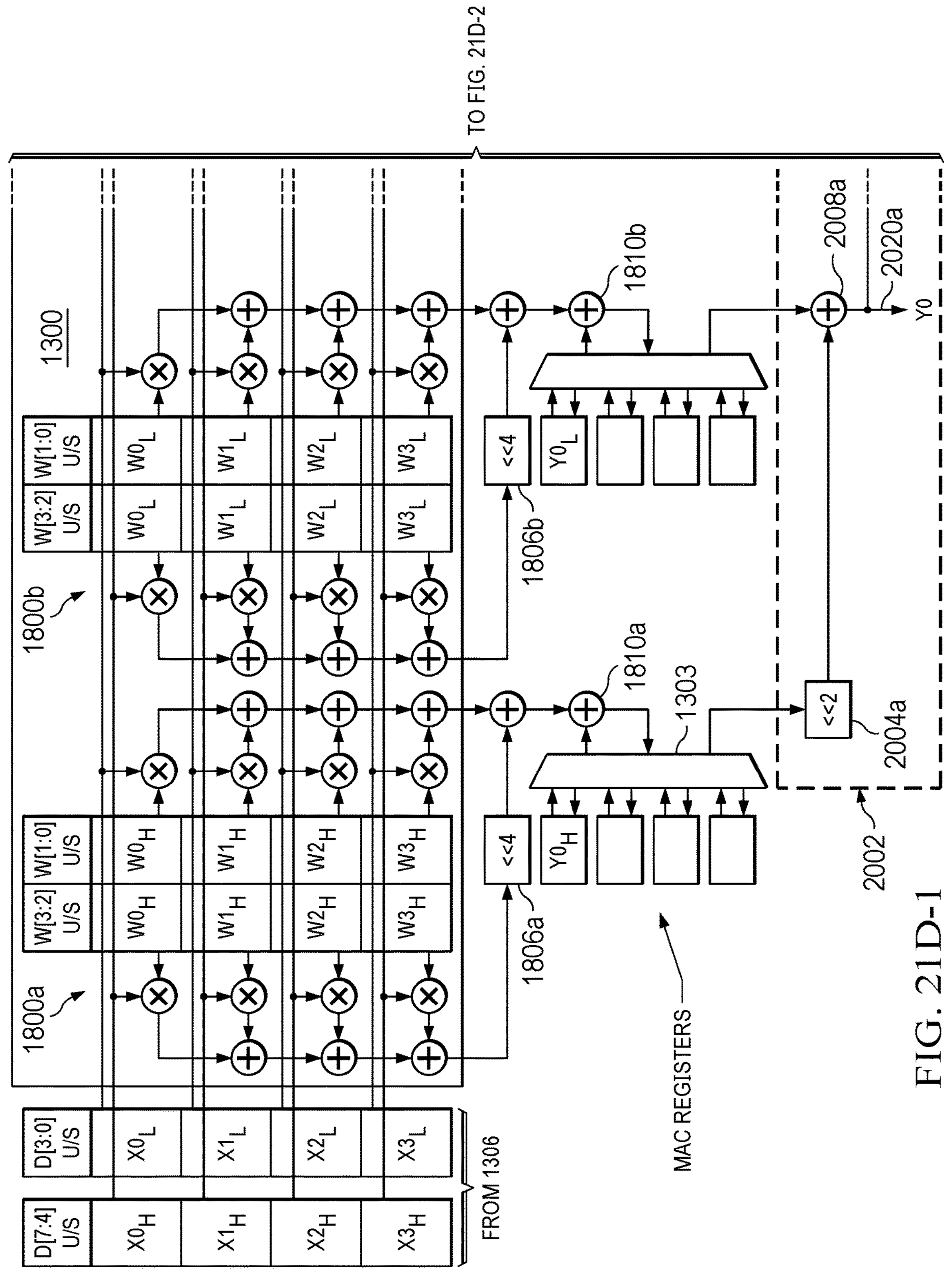
Figures 2, 21D:
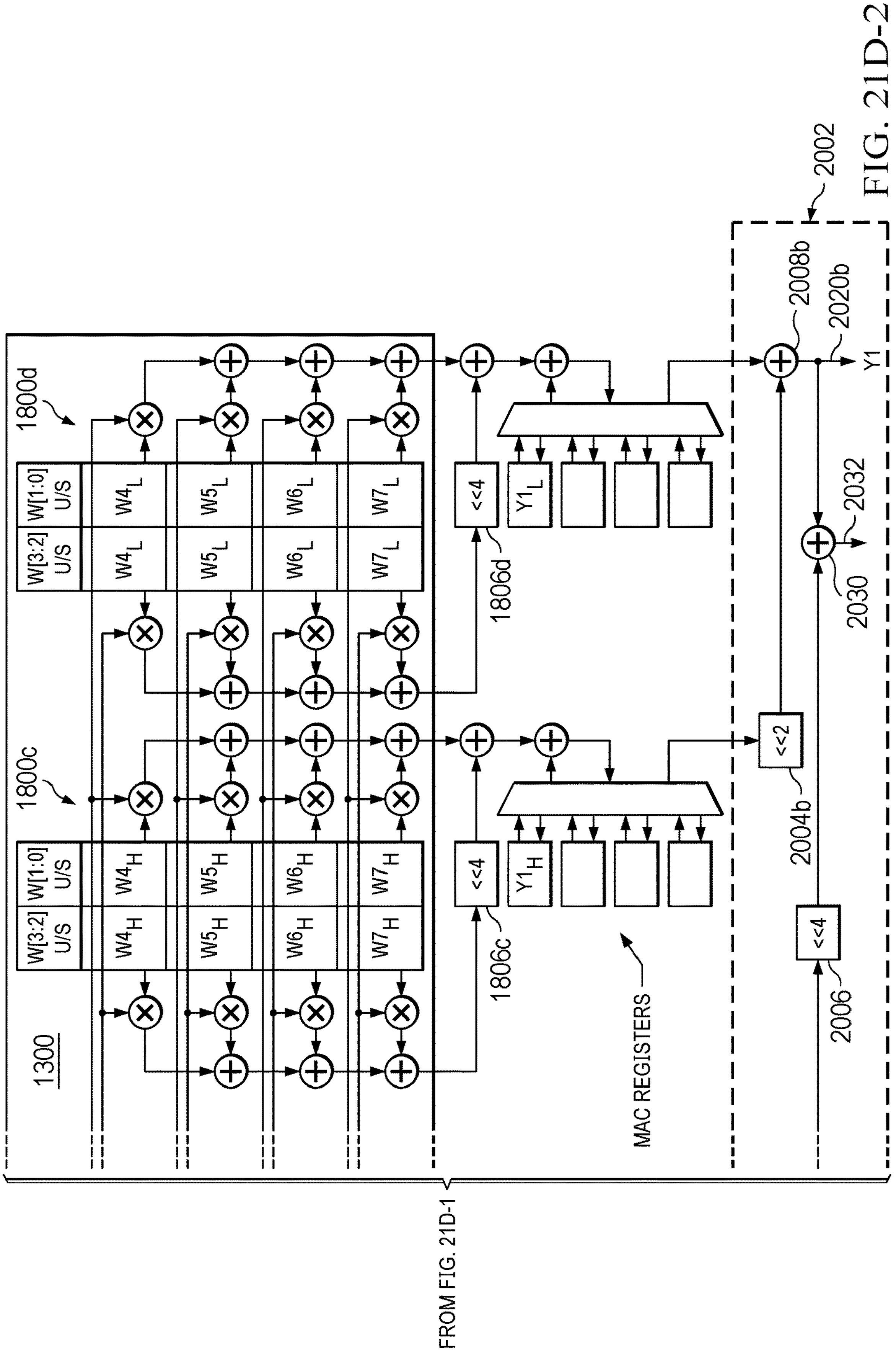

FIGS. 21D-land 21D-2 illustrates an example configuration where each input data element is an 8-bit number and each weight element is a 4-bit number. Input data multiplexer 1306 can operate in D8 mode and provide 32 bits of input data including four 8-bit input data elements in each cycle. Also, weight multiplexer 1304 can also operate in D8 mode, where it duplicates of half of the stored weight elements in a weight register to provide 64 bits of weight (including duplicates of 8×4-bit weight elements). Each of computation units 1800 can receive four sets of duplicates of 2 bits of 4-bit weight elements and four 8-bit input data elements. Computation units 1800*a*, 1800*b*, 1800*c*, and 1800*d* can compute a partial sum for Y0 and Y1, as follows:

$$Y0_H=(W0_H*X0_H+W1_H*X1_H+W2_H*X2_H+W3_H*X3_H)<<4+(W0_H*X0_L+W1_H*X1_L+W2_H*X2_L+W3_H*X3_L) \quad \text{(Equation 6)}$$

$$Y0_L=(W0_L*X0_H+W1_L*X1_H+W2_L*X2_H+W3_L*X3_H)<<4+(W0_L*X0_L+W1_L*X1_L+W2_L*X2_L+W3_L*X3_L) \quad \text{(Equation 7)}$$

$$Y0=Y0_H<<2+Y0_L \quad \text{(Equation 8)}$$

$$Y1_H=(W4_H*X0_H+W5_H*X1_H+W6_H*X2_H+W7_H*X3_H)<<4+(W4_H*X0_L+W5_H*X1_L+W6_H*X2_L+W7_H*X3_L) \quad \text{(Equation 9)}$$

$$Y1L=(W4_L*X0_H+W5_L*X1_H+W6_L*X2_H+W7_L*X3_H)<<4+(W4_L*X0_L+W5_L*X1_L+W6_L*X2_L+W7_L*X3_L) \quad \text{(Equation 10)}$$

$$Y1=Y1_H<<2+Y1_L \quad \text{(Equation 11)}$$

In Equations 6-11, each of W0, W1, W2, W3, W4, W5, W6, and W7 is a 4-bit weight element. X0, X1, X2, and X3 each is an 8-bit input data element. W$0_H$, W$1_H$, W$2_H$, W$3_H$, W$4_H$, W$5_H$, W$6_H$, W$7_H$ are, respectively, the 2-bit MSBs of W0, W1, W2, W3, W4, W5, W6, and W7, whereas W$0_L$, W$1_L$, W$2_L$, W$3_L$, W$4_L$, W$5_L$, W$6_L$, W$7_L$ are, respectively, the 2-bit LSBs of W0, W1, W2, W3, W4, W5, W6, and W7. Also, X$0_H$, X$1_H$, X$2_H$, and X$3_H$ are, respectively, the 4-bit MSBs of X0, X1, X2, and X3 (also represented as D[7:4] bits), whereas X$0_L$, X$1_L$, X$2_L$, and X$3_L$ are, respectively, the 4-bit LSBs (also represented as D[3:0] bits) of X0, X1, X2, and X3.

Multiple computation units 1800 can be involved in computing Y$0_H$ and Y$0_L$. For example, the first computation weights input of computation unit 1800*a* can receive duplicates of W$0_H$, the second computation weights input of computation unit 1800*a* can receive duplicates of W$1_H$, the third computation weights input of computation unit 1800*a* can receive duplicates of W$2_H$, and the fourth computation weights input of computation unit 1800*a* can receive duplicates of W$3_H$. Also, the first computation weights input of computation unit 1800*b* can receive duplicates of W$0_L$, the second computation weights input of computation unit 1800*b* can receive duplicates of W$1_L$, the third computation weights input of computation unit 1800*b* can receive duplicates of W$2_L$, and the fourth computation weights input of computation unit 1800*b* can receive duplicates of W$3_L$.

Further, the first computation weights input of computation unit 1800*c* can receive duplicates of W$4_H$, the second computation weights input of computation unit 1800*c* can receive duplicates of W$5_H$, the third computation weights input of computation unit 1800*c* can receive duplicates of W$6_H$, and the fourth computation weights input of computation unit 1800*c* can receive duplicates of W$7_H$. The first computation weights input of computation unit 1800*d* can receive duplicates of W$0_L$, the second computation weights input of computation unit 1800*d* can receive duplicates of W$1_L$, the third computation weights input of computation unit 1800*d* can receive duplicates of W$2_L$, and the fourth computation weights input of computation unit 1800*d* can receive duplicates of W$3_L$. The first computation data input of each of computation units 1800*a*-1800*d* can receive X0, the second computation data input of each of computation units 1800*a*-1800*d* can receive X1, the third computation data input of each of computation units 1800*a*-1800*d* can receive X2, and the fourth computation data input of each of computation units 1800*a*-1800*d* can receive X3.

Computation unit 1800*a* can compute W$0_H$*X$0_H$+W$1_H$*X$1_H$+W$2_H$*X$2_H$+W$3_H$*X$3_H$ and W$0_H$*X$0_L$+W$1_H$*X$1_L$, and computation unit 1800*b* can compute W$0_L$*X$0_H$+W$1_L$*X$1_H$ and W$0_L$*X$0_L$+W$1_L$*X$1_L$+W$2_H$*X$2_L$+W$3_H$*X$3_L$. Bit shifter 1806*a* and 1806*b* of each computation unit can perform left shift of four bits. The partial sum of Y$0_H$ is stored in a first MAC register (e.g., MACreg0), and the partial sum of Y$0_L$ can be stored in a second MAC register (e.g., MACreg1). Also, in the same cycle, computation unit 1800*c* can compute $W4_H*X0_H+W5_H*X1_H+W6_H*X2_H+W7_H*X3_H$ and $W4_H*X0_L+W5_H*X1_L+W6_H*X2_L+W7_H*X3_L$, and computation unit 1800*d* can compute $W4_L*X0_H+W5_L*X1_H+W6_L*X2_H+W7_L*X3_H$ and $W4_L*X0_L+W5_L*X1_L+W6_L*X2_L+W7_L*X3_L$, to generate the partial sums of $Y1_H$ and $Y1_L$. The partial sums of $Y1_H$ and $Y1_L$ can be stored in a third MAC register (e.g., MACreg2) and a fourth MAC register (e.g., MACreg3). Accordingly, partial sums of two outputs (Y0 and Y1) can be generated per cycle.

Figures 1, 21E:
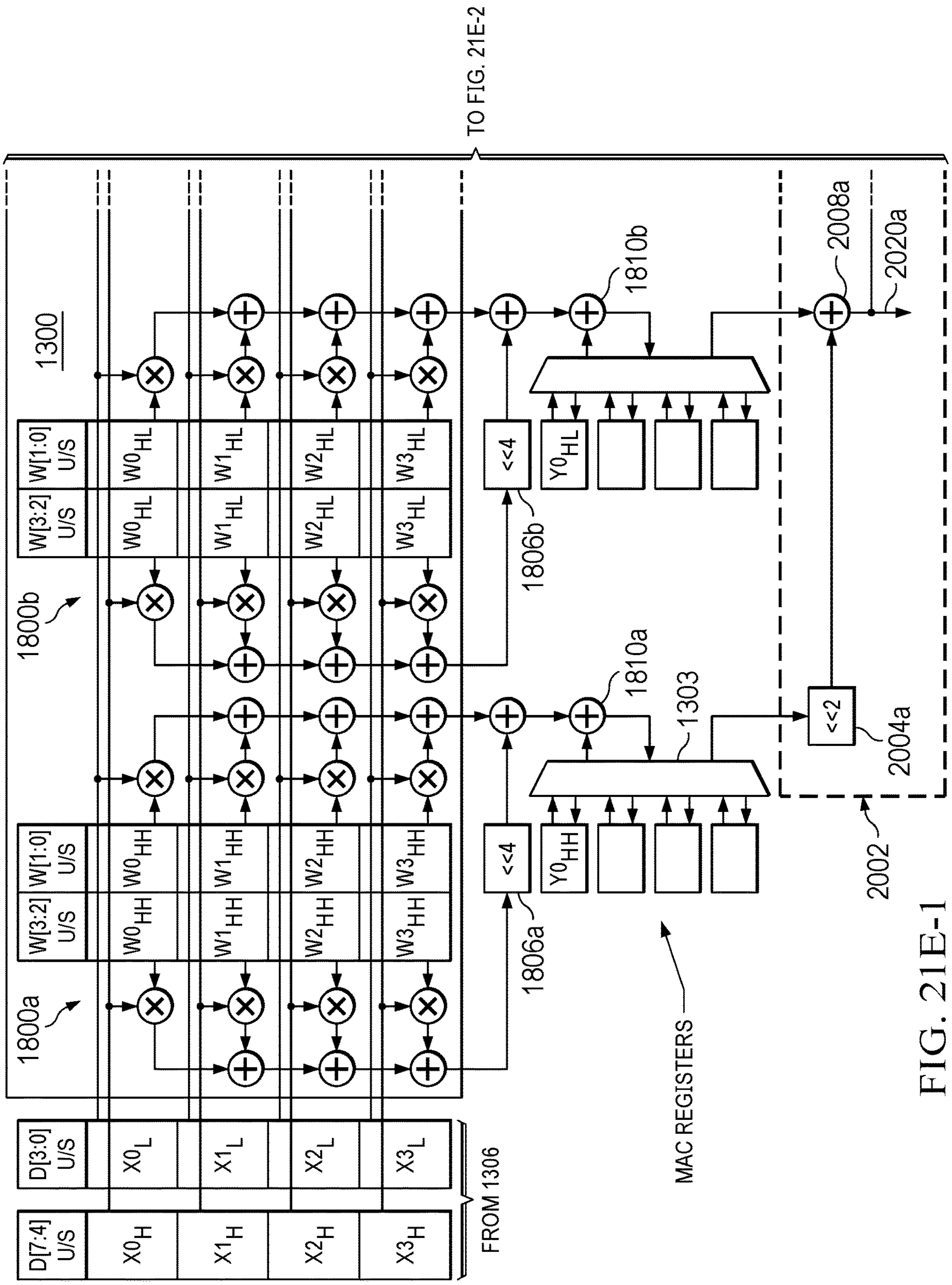
Figures 2, 21E:
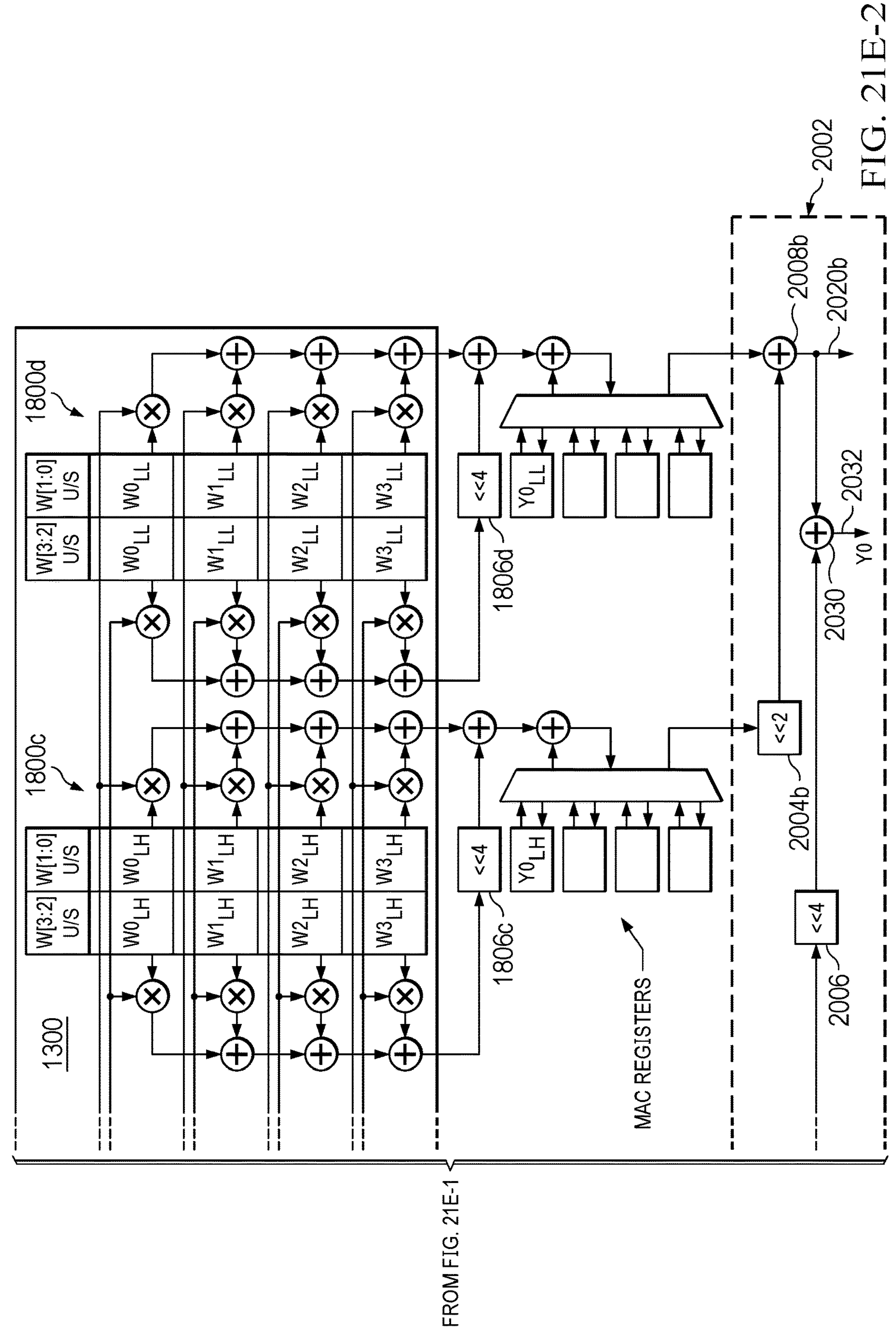

FIGS. 21E-1 and 21E-2 illustrate an example configuration where each input data element is 8-bit and each weight element is 8-bit. Input data multiplexer 1306 can operate in D8 mode and provide 32 bits of input data including four 8-bit input data elements in each cycle. Also, weight multiplexer 1304 can also operate in D8 mode, where it duplicates of half of the stored weight elements in a weight register to provide 64 bits of weight (including duplicates of 4×8-bit weight elements). Each computation unit 1800 can receive four sets of duplicates of 2 bits of 8-bit weight elements and four 8-bit input data elements. Computation units 1800*a*-1800*d* can compute a partial sum for Y0, as follows:

$$Y0_{HH}=(W0_{HH}*X0_H+W1_{HH}*X1_H+W2_{HH}*X2_H+W3_{HH}*X3_H)<<4+(W0_{HH}*X0_L+W1_{HH}*X1_L+W2_{HH}*X2_L+W3_{HH}*X3_L) \quad \text{(Equation 12)}$$

$$Y0_{HL}=(W0_{HL}*X0_H+W1_{HL}*X1_H+W2_{HL}*X2_H+W3_{HL}*X3_H)<<4+(W0_{HL}*X0_L+W1_{HL}*X1_L+W2_{HL}*X2_L+W3_{HL}*X3_L) \quad \text{(Equation 13)}$$

$$Y0_{LH}=(W0_{LH}*X0_H+W1_{LH}*X1_H+W2_{LH}*X2_H+W3_{LH}*X3_H)<<4+(W0_{LH}*X0_L+W1_{LH}*X1_L+W2_{LH}*X2_L+W3_{LH}*X3_L) \quad \text{(Equation 14)}$$

$$Y0_{LL}=(W0_{LL}*X0_H+W1_{LL}*X1_H+W2_{LL}*X2_H+W3_{LL}*X3_H)<<4+(W0_{LL}*X0_L+W1_{LL}*X1_L+W2_{LL}*X2_L+W3_{LL}*X3_L) \quad \text{(Equation 15)}$$

$$Y0=Y0_{HH}<<6+Y0_{HL}<<4+Y0_{LH}<<2+Y0_{LL} \quad \text{(Equation 16)}$$

In Equations 12-16, $W0_{HH}$, $W1_{HH}$, $W2_{HH}$, and $W3_{HH}$ are, respectively, bits [7:6] of W0, W1, W2, and W3, $W0_{HL}$, $W1_{HL}$, $W2_{HL}$, and $W3_{HL}$ are, respectively, bits [5:4] of W0, W1, W2, and W3, $W0_{LH}$, $W1_{LH}$, $W2_{LH}$, and $W3_{LH}$ are, respectively, bits [3:2] of W0, W1, W2, and W3, and $W0_{LL}$, $W1_{L}$, $W2_{LL}$, and $W3_{LL}$ are, respectively, bits [1:0] of W0, W1, W2, and W3. Also, $X0_H$, $X1_H$, $X2_H$, and $X3_H$ are, respectively, the 4-bit MSBs of X0, X1, X2, and X3 (also represented as D[7:4] bits), whereas $X0_L$, $X1_L$, $X2_L$, and $X3_L$ are, respectively, the 4-bit LSBs of X0, X1, X2, and X3 (also represented as D[3:0] bits). Further, $Y0_{HH}$, $Y0_{HL}$, $Y0_{LH}$, and $Y0_{LL}$ are, respectively, bits[7:6], bits[5:4], bits[3:2], and bits[1:0] of Y0.

Multiple computation units 1800 can be involved in computing $Y0_{HH}$, $Y0_{HL}$, $Y0_{LH}$, and $Y0_L$. For example, the first computation weights input of computation unit 1800*a* can receive duplicates of $W0_{HH}$, the second computation weights input of computation unit 1800*a* can receive duplicates of $W1_{HH}$, the third computation weights input of computation unit 1800*a* can receive duplicates of $W2_{HH}$, and the fourth computation weights input of computation unit 1800*a* can receive duplicates of $W3_{HH}$. Also, the first computation weights input of computation unit 1800*b* can receive duplicates of $W0_{HL}$, the second computation weights input of computation unit 1800*b* can receive duplicates of $W1_{HL}$, the third computation weights input of computation unit 1800*b* can receive duplicates of $W2_{HL}$, and the fourth computation weights input of computation unit 1800*b* can receive duplicates of $W3_{HL}$.

Further, the first computation weights input of computation unit 1800*c* can receive duplicates of $W0_{LH}$, the second computation weights input of computation unit 1800*c* can receive duplicates of $W1_{LH}$, the third computation weights input of computation unit 1800*c* can receive duplicates of $W2_{LH}$, and the fourth computation weights input of computation unit 1800*c* can receive duplicates of $W3_{LH}$. The first computation weights input of computation unit 1800*d* can receive duplicates of $W0_{LL}$, the second computation weights input of computation unit 1800*d* can receive duplicates of $W1_{LL}$, the third computation weights input of computation unit 1800*d* can receive duplicates of $W2_{LL}$, and the fourth computation weights input of computation unit 1800*d* can receive duplicates of $W3_{LL}$. The first computation data input of each of computation units 1800*a*-1800*d* can receive X0, the second computation data input of each of computation units 1800*a*-1800*d* can receive X1, the third computation data input of each of computation units 1800*a*-1800*d* can receive X2, and the fourth computation data input of each of computation units 1800*a*-1800*d* can receive X3.

Computation unit 1800*a* can compute $W0_{HH}*X0_H+W1_{HH}*X1_H+W2_{HH}*X2_H+W3_{HH}*X3_H$ and $W0_{HH}*X0_L+W1_{HH}*X1_L+W2_{HH}*X2_L+W3_{HH}*X3_L$, computation unit 1800*b* can compute $W0_{HL}*X0_H+W1_{HL}*X1_H+W2_{HL}*X2_H+W3_{HL}*X3_H$ and $W0_{HL}*X0_L+W1_{HL}*X1_L+W2_{HL}*X2_L+W3_{HL}*X3_L$, computation unit 1800*c* can compute $W0_{LH}*X0_H+W1_{LH}*X1_H+W2_{LH}*X2_H+W3_{LH}*X3_H$ and $W0_{LH}*X0_L+W1_{LH}*X1_L+W2_{LH}*X2_L+W3_{LH}*X3_L$, and computation unit 1800*d* can compute $W0_{LL}*X0_H+W1_{LL}*X1_H+W2_{LL}*X2_H+W3_{LL}*X3_H$ and $W0_{LL}*X0_L+W1_{LL}*X1_L+W2_{LL}*X2_L+W3_{LL}*X3_L$. Bit shifter 1806*a-d* of each computation unit can perform left shift of four bits. The first partial sum of $Y0_{HH}$ can be stored in a first MAC register (e.g., MACreg0), the partial sum of $Y0_{HL}$ can be stored in a second MAC register (e.g., MACreg1), the partial sum of $Y0_{LH}$ can be stored in a third MAC register (e.g., MACreg2), and the partial sum of $Y0_{LL}$ can be stored in a fourth MAC register (e.g., MACreg3). Computation units 1800 can compute $Y0_{HH}$ as a signed number and $Y0_{HL}$, $Y0_{LH}$, and $Y0_{LL}$ as unsigned numbers.

Figures 1, 21F:
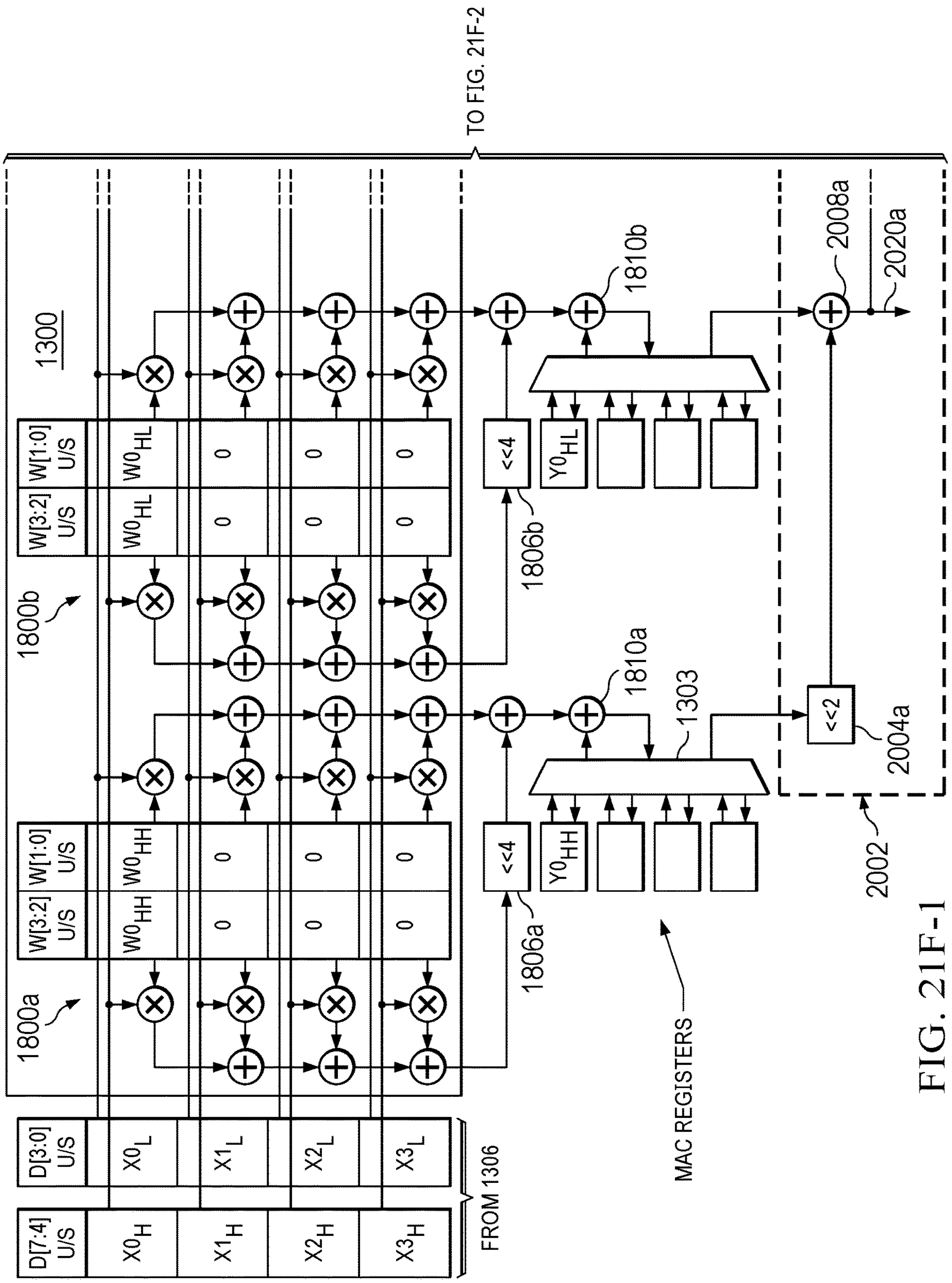
Figures 2, 21F:
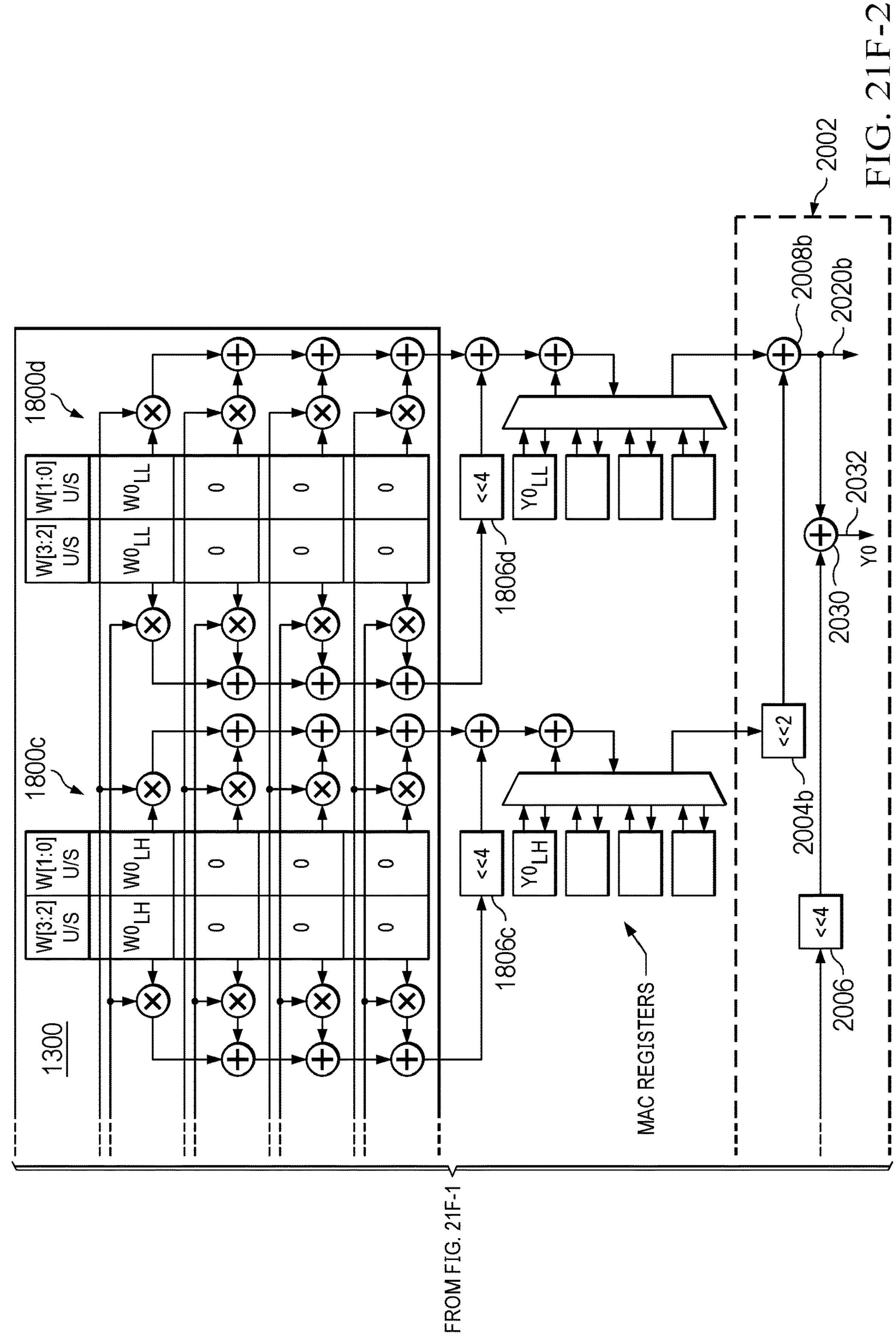
Figures 1, 21G:
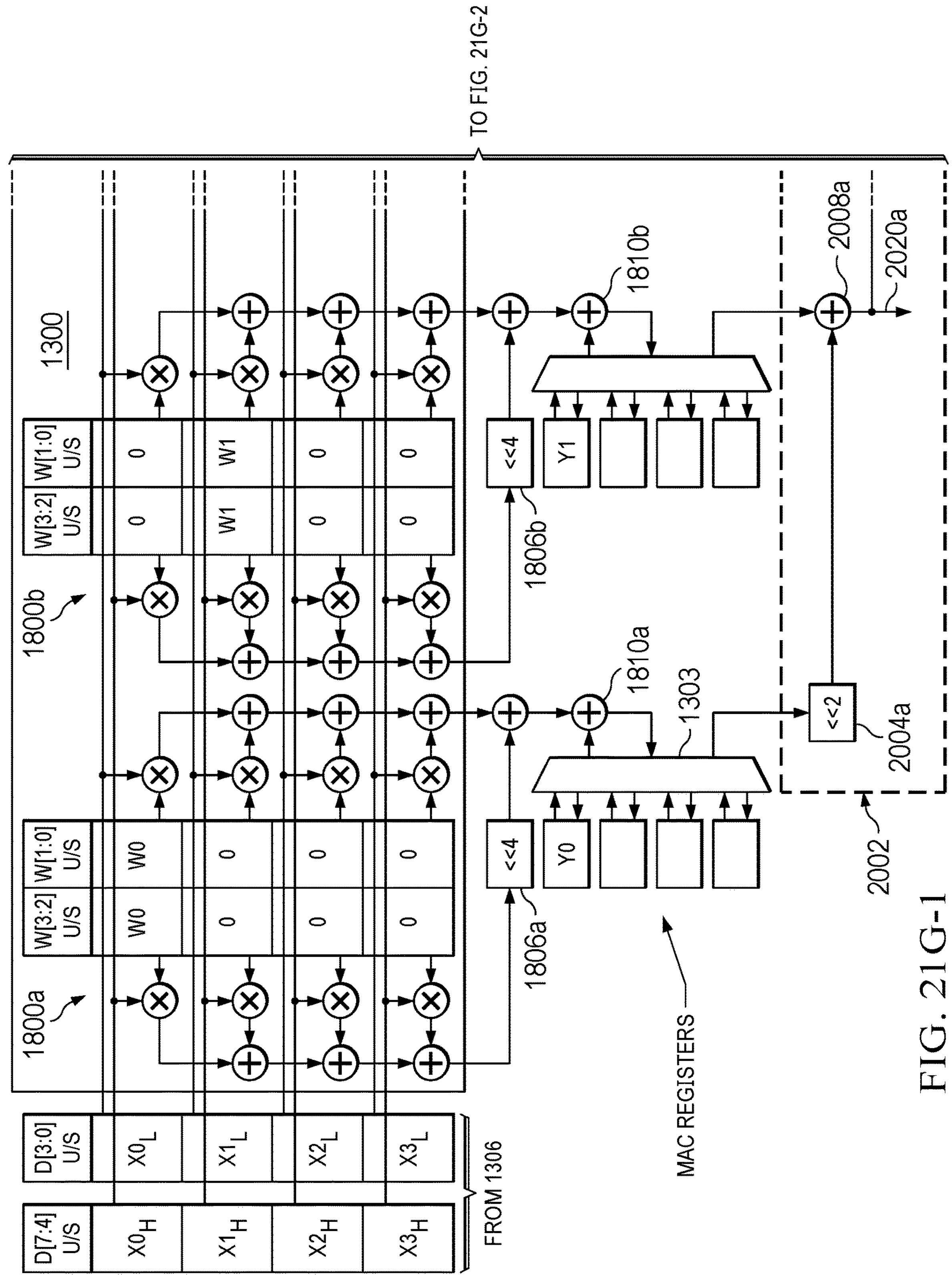
Figures 2, 21G:
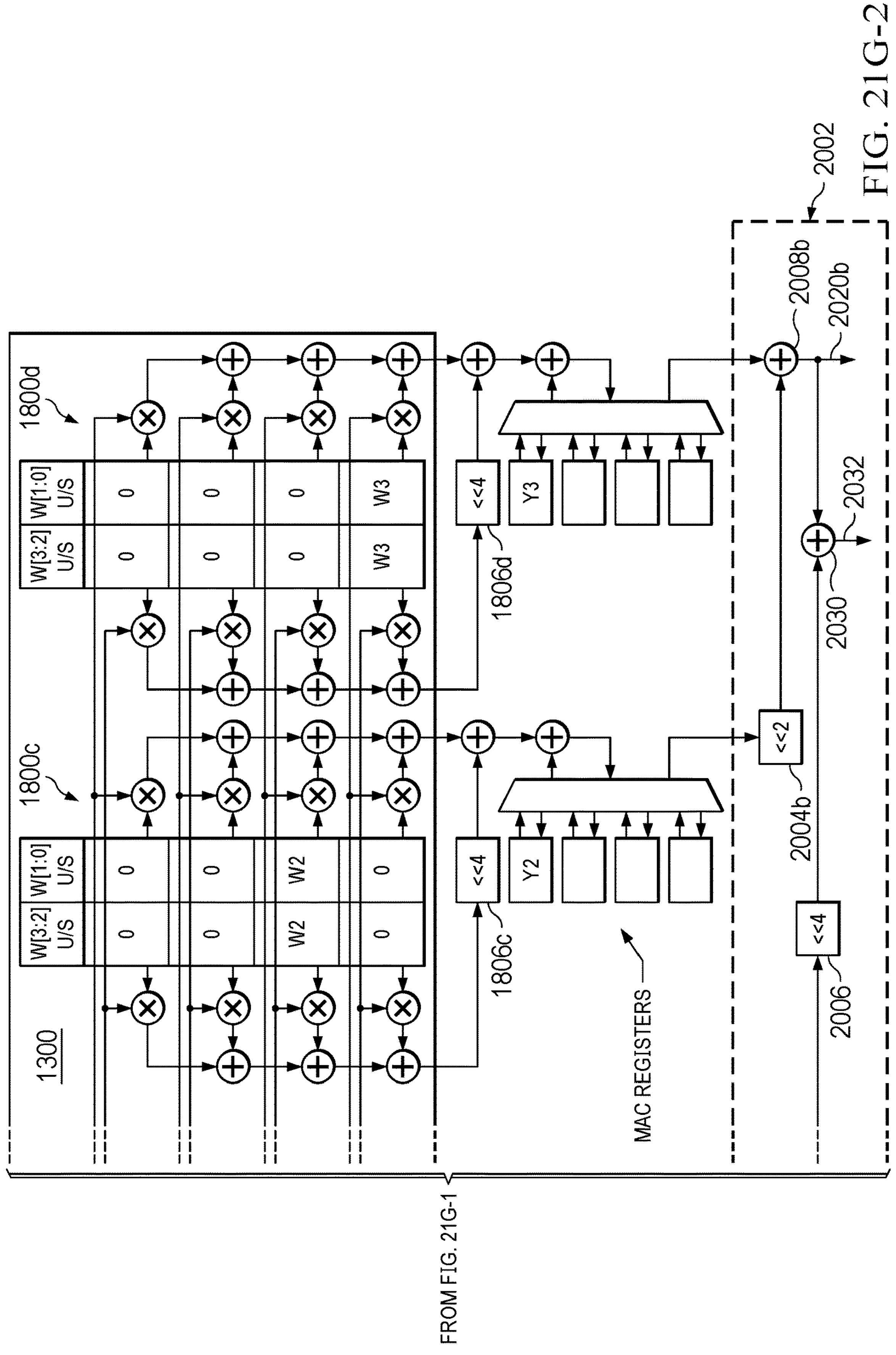
Figures 1, 21H:
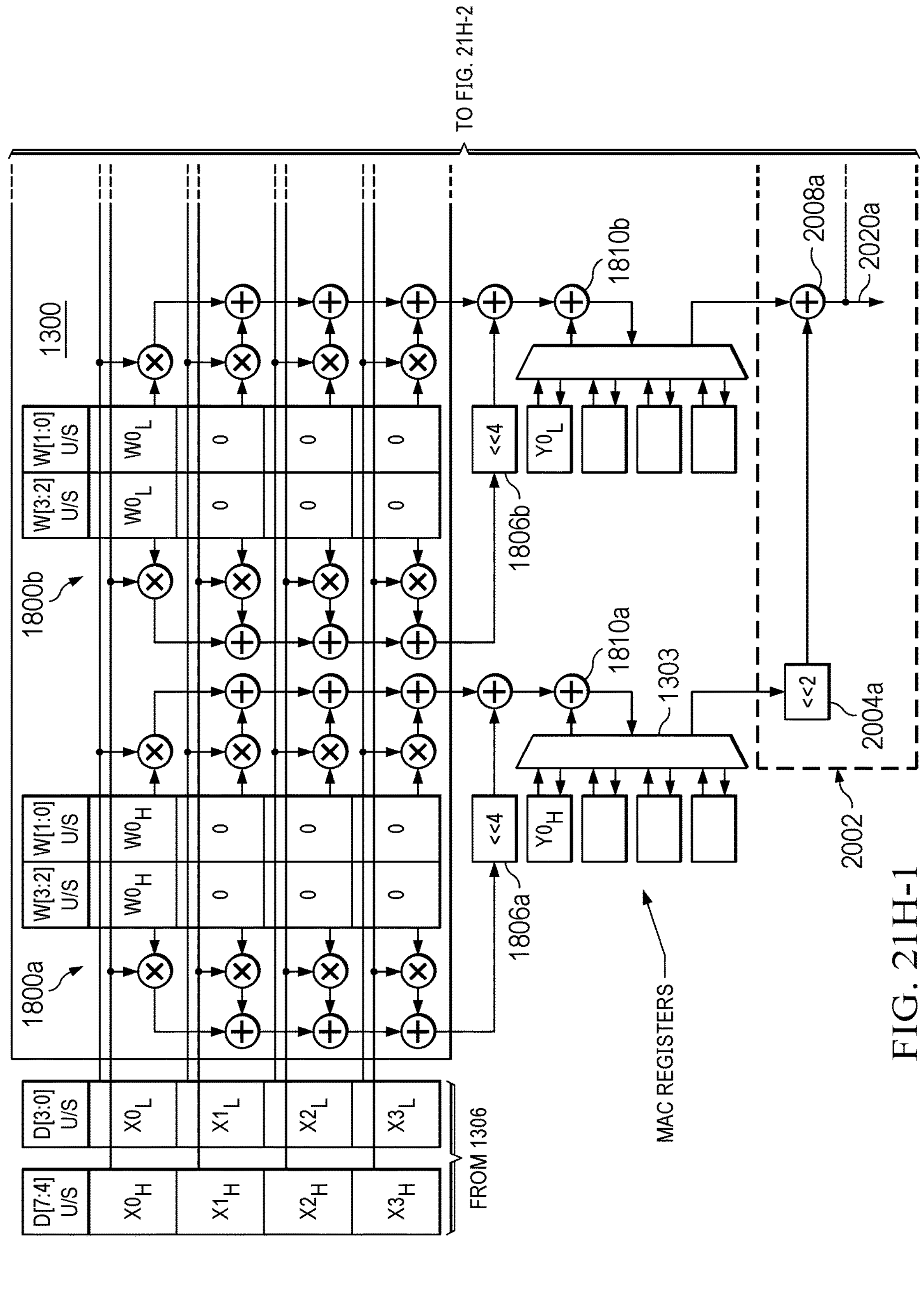
Figures 2, 21H:
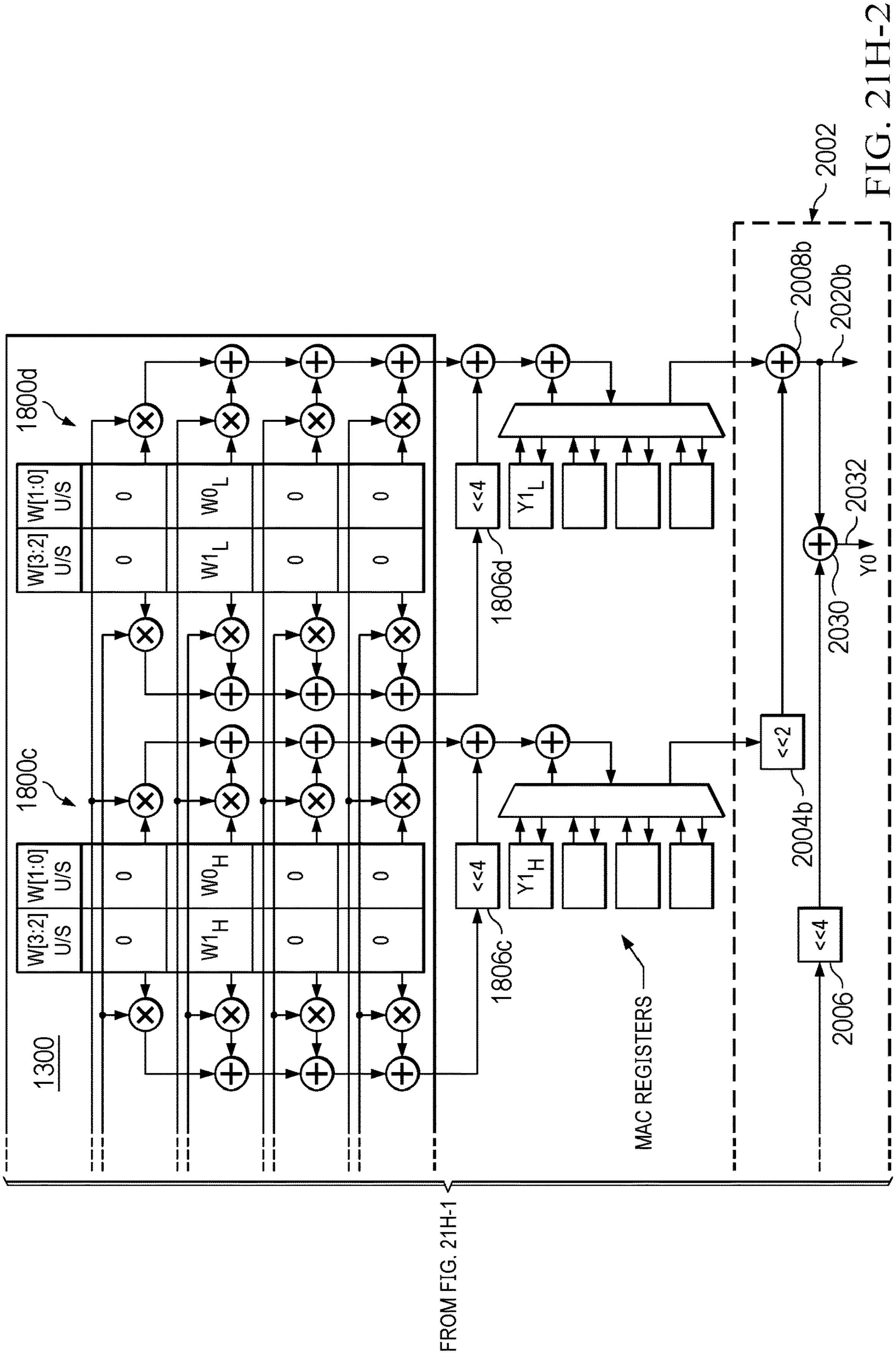

FIG. 21F, FIG. 21G, and FIG. 21H illustrate example configurations to support a depthwise convolution operation. As described above, for a depthwise convolution operation, the intermediate output data element can be generated from input data elements of the same channel. To support depth convolution operation, weights multiplexer 1304 can selectively forward zeros to certain multipliers assigned to perform multiplication operations on input data elements of a different channel, so that the output of such multipliers is zero and do not contribute to the intermediate output data element.

FIGS. 21F-1 and 21F-2 illustrate an example configuration to support a depthwise convolution operation between 8-bit input data elements and 8-bit weight elements. To support a depthwise convolution operation, computation units 1800*a-d* can receive non-zero weights for a particular channel (e.g., $W0_{HH}$, $W0_{HL}$, $W0_{LH}$, $W0_{LL}$), and zero weights for other channels from weights multiplexer 1304. With the configuration of FIG. 21F, computation units 1800*a-d*, together with data merge circuit 2002, can compute Y0 as follows:

$$Y0_{HH}=(W0_{HH}*X0_H)<<4+(W0_{HH}*X0_L) \quad \text{(Equation 17)}$$

$$Y0_{HL}=(W0_{HL}*X0_H)<<4+(W0_{HL}*X0_L) \quad \text{(Equation 18)}$$

$$Y0_{LH}=(W0_{LH}*X0_H)<<4+(W0_{LH}*X0_L) \quad \text{(Equation 19)}$$

$$Y0L=(W0_{LL}*X0_H)<<4+(W0_{LL}*X0_L) \quad \text{(Equation 20)}$$

$$Y0=Y0_{HH}<6+Y0_{HL}4+Y0_{LH}<<2+Y0_{LL} \quad \text{(Equation 21)}$$

FIGS. 21G-1 and 21G-2 illustrates an example configuration to support a depthwise convolution operation between 8-bit input data elements and 2-bit weight elements. In FIGS. 21G-1 and 21G-2, computation unit 1800*a* can be assigned to compute Y0 (of a first channel) and receive non-zero weights only of the first channel (W0) at the first computation weights input and zero weights for other channels at other computation weights inputs. Computation unit 1800*b* can be assigned to compute Y1 (of a second channel) and receive non-zero weights only of the second channel (W1) at the second computation weights input and zero weights for other channels at other computation weights inputs. Also, computation unit 1800*c* can be assigned to compute Y2 (of a third channel) and receive non-zero weights only of the third channel (W2) at the third computation weights input and zero weights for other channels at other computation weights inputs. Further, computation unit 1800*d* can be assigned to compute Y3 (of a fourth channel) and receive non-zero weights only of the fourth channel (W3) at the fourth computation weights input and zero weights for other channels at other computation weights inputs. With the configuration of FIG. 21G, computation units 1800*a-d* can compute Y0, Y1, Y2, and Y3 as follows:

$$Y0=(W0*X0_H)<<4+(W0*X0_L) \quad \text{(Equation 22)}$$

$$Y1=(W1*X1_H)<<4+(W1*X1_L) \quad \text{(Equation 23)}$$

$$Y2=(W2*X2_H)<<4+(W2*X2_L) \quad \text{(Equation 24)}$$

$$Y3=(W3*X2_H)<<4+(W3*X3_L) \quad \text{(Equation 25)}$$

FIGS. 21H-1 and 21H-2 illustrate an example configuration to support a depthwise convolution operation between 8-bit input data elements and 4-bit weight elements. In FIG. 21H, computation units 1800*a* and 1800*b* can be assigned to compute Y0 (of a first channel) and receive non-zero weights only of the first channel (W0) at the first computation weights input and zero weights for other channels at other computation weights inputs. Computation units 1800*c* and 1800*d* can be assigned to compute Y1 (of a second channel) and receive non-zero weights only of the second channel (W1) at the second computation weights input and zero weights for other channels at other computation weights inputs. With the configuration of FIG. 21H, computation units 1800*a-d* together with data merge circuit 2002 can compute Y0 and Y1 as follows:

$$Y0_H=(W0_H*X0_H)<<4+(W0_H*X0_L) \quad \text{(Equation 26)}$$

$$Y0_L=(W0_L*X0_H)<<4+(W0_L*X0_L) \quad \text{(Equation 27)}$$

$$Y1_H=(W1_H*X1_H)<<4+(W1_H*X1_L) \quad \text{(Equation 28)}$$

$$Y1_L=(W1_L*X1_H)<<4+(W1_L*X1_L) \quad \text{(Equation 29)}$$

$$Y0=Y0_H<<2+Y0_L \quad \text{(Equation 30)}$$

$$Y1=Y1_H<<2+Y1_L \quad \text{(Equation 31)}$$

In a subsequent cycle (not shown in the figures), computation units 1800*a* and 1800*b* can receive non-zero weights of the third channel (W2) at the third computation weights input and zero weights for other channels at other computation weights input, and computation units 1800*c* and 1800*d* can receive non-zero weights of the fourth channel (W3) at the fourth computation weights input and zero weights for other channels at other computation weights input, and compute Y2 and Y3 as follows:

$$Y2_H=(W2_H*X2_H)<<4+(W2_H*X2_L) \quad \text{(Equation 32)}$$

$$Y2_L=(W2_L*X2_H)<<4+(W2_L*X2_L) \quad \text{(Equation 33)}$$

$$Y3_H=(W3_H*X3_H)<<4+(W3_H*X3_L) \quad \text{(Equation 34)}$$

$$Y3L=(W3_L*X3_H)<<4+(W3_L*X3_L) \quad \text{(Equation 35)}$$

$$Y2=Y2_H<<2+Y2_L \quad \text{(Equation 36)}$$

$$Y3=Y3_H<<2+Y3_L \quad \text{(Equation 37)}$$

Figure 22A:
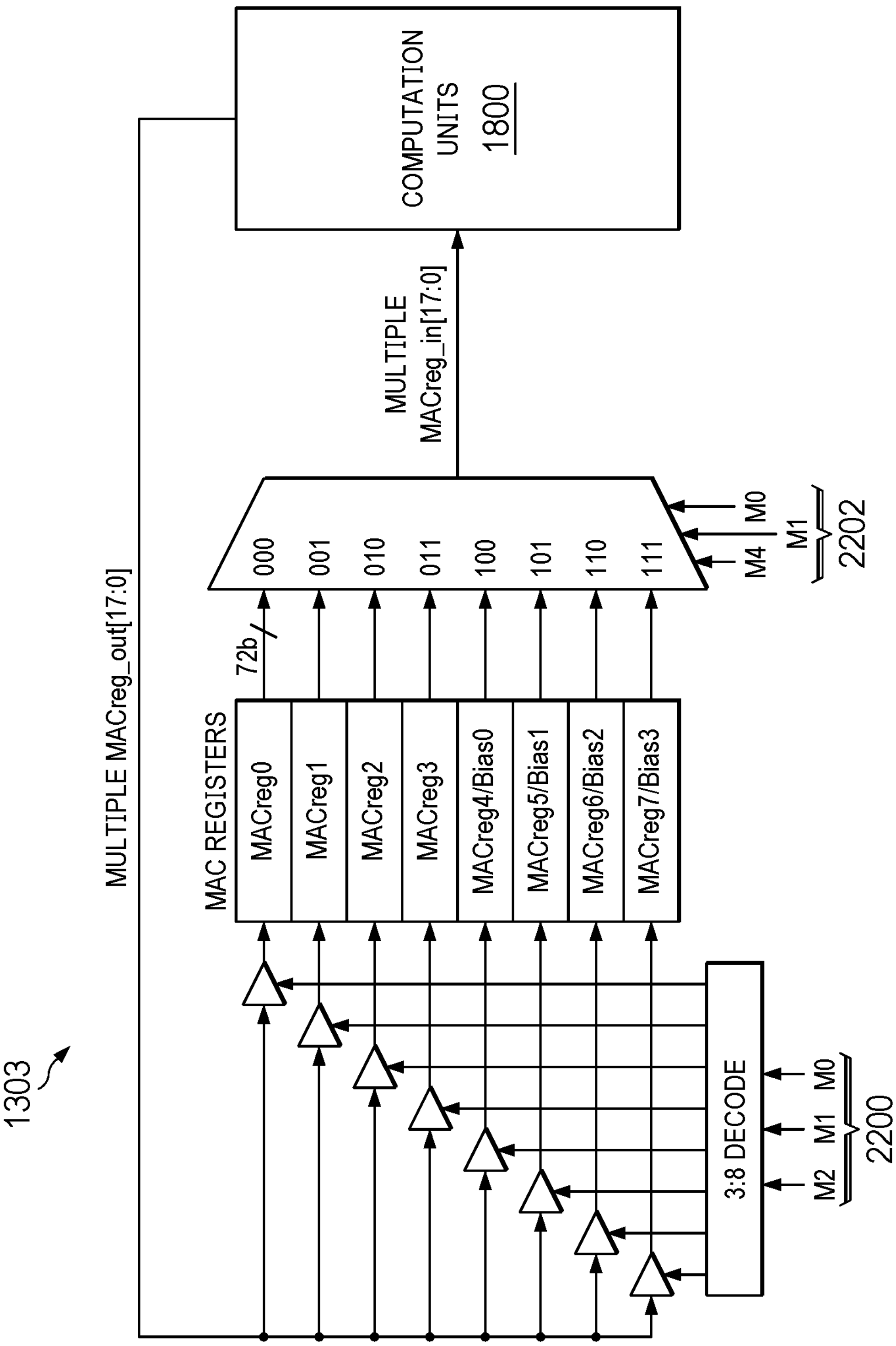
FIGS. 22A, 22B, and 22C are schematics illustrating internal multiplexers of the computing engine of FIG. 13, according to some examples.
Figure 22B:
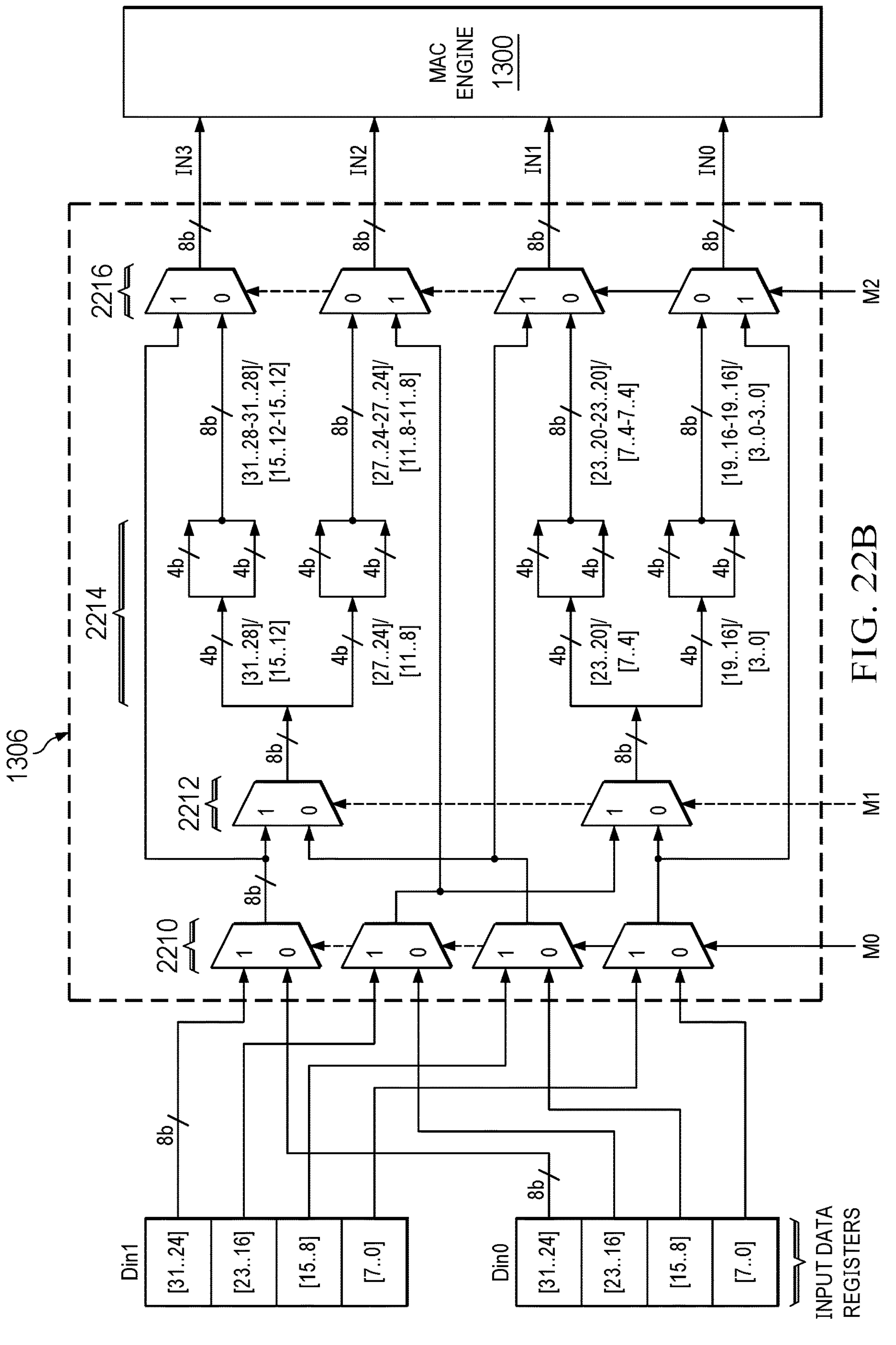
Figure 22C:
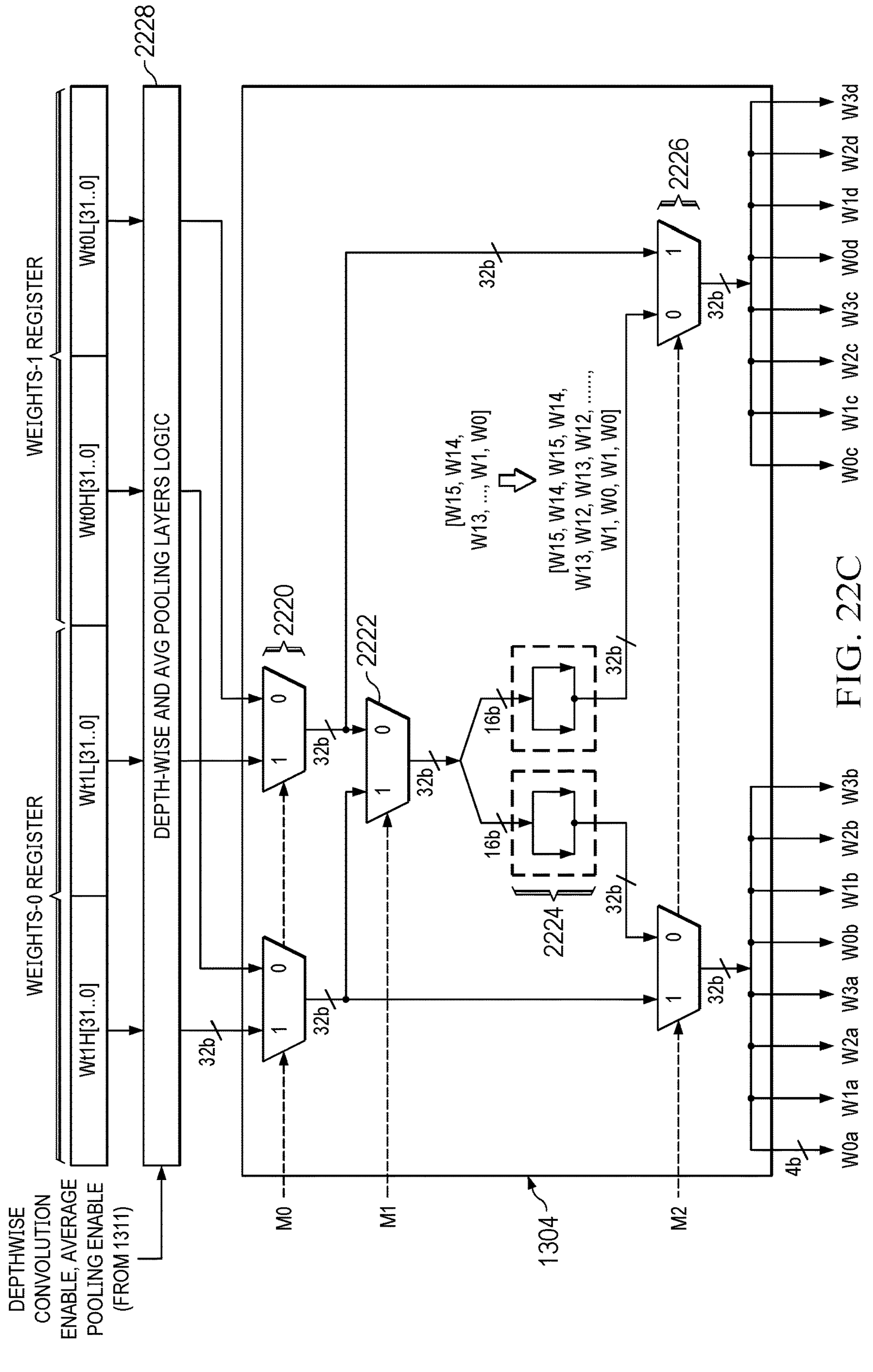

FIGS. 22A, 22B, and 22C illustrate examples of internal components of MAC registers multiplexer 1303, input data multiplexer 1306, and weights multiplexer 1304. FIG. 22A illustrates example internal components of MAC registers multiplexer 1303. Referring to FIG. 22A, MAC registers multiplexer 1303 can include a demultiplexer circuit 2200 and multiplexer circuit 2202. Demultiplexer circuit 2200 is coupled between the outputs (multiple MACreg_out[17:0], such as four MACreg_outs, eight MACreg_outs, etc.) of a set of computation units 1800 and inputs of MAC registers, and multiplexer circuit 2202 is coupled between the outputs of MAC registers and the inputs (multiple MACreg_in[17:0]) of the set of computation units 1800. Demultiplexer circuit 2200 can be controlled by computation controller 522 (e.g., based on a sub-instruction) to either connect the outputs of computation units 1800 to the inputs of the MAC registers to store the partial sums generated by computation units 1800, or to store bias values (Bias0, Bias1, Bias2, and Bias3) into some of the MAC registers. The bias values can be added to the partial sums as part of the post-processing operations. Computation controller 522 can control demultiplexer circuit 2200 to store the bias values into the MAC registers responsive to executing a first sub-instruction of a neural network layer computation. By introducing the bias values into the MAC registers as part of an initialization operation, the latency caused by adding the bias as part of a post-processing operation by post processing engine 1302 can be avoided. Also, multiplexer 2202 can be controlled by computation controller 522 based on a sub-instruction to select which of the MAC register to provide a prior partial sum for updating by a particular computation unit 1800.

FIG. 22B illustrates example internal components of input data multiplexer 1306. Referring to FIG. 22B, input data multiplexer 1306 can have inputs coupled to first input data register (Din0) and second input data register (Din1), and outputs coupled to MAC engine 1300 to provide four input data IN0, IN1, IN2, and IN3. Input data multiplexer 1306 also includes multiplexers 2210, 2212, duplication circuits 2214, and multiplexers 2216. Multiplexers 2210, 2212, and 2216 are controlled by control signals M0, M1, and M2, some of which can be derived from input data and weights configuration 1310 and some of which can be provided by computation controller 522. For example, multiplexer 2210 can be controlled by control signal M0 to selectively provide data from one of registers Din0 or Din1 as IN0, IN1, IN2, and IN3. Multiplexer 2212 can select 8 bits from upper 16 bits (bits 31-16) or lower 16 bits (bits 15-0) of the selected register for duplication of bits in D4 mode. Duplication circuit 2214 splits a selected 8-bit value into two 4-bit values and generate two 8-bits values by duplicating for each 4-bit values. Multiplexer 2216 can be controlled by control signal M2, which is set based on D4 or D8 mode, to either forward selected 8-bit values as IN0, IN1, IN2, and IN3 (in D8 mode), or forward 8-bit values each including respective duplicated 4-bit values as IN0, IN1, IN2, and IN3.

FIG. 22C illustrates example internal components of weights multiplexer 1304. Referring to FIG. 22C, weights multiplexer 1304 can have inputs coupled to a first weights register (weights-0 register) and a second weights register (weights-1 register), and outputs coupled to four groups of weights inputs of MAC engine 1300 to provide a first group of weights W0*a*, W1*a*, W2*a*, and W3*a*, a second group of weights W0*b*, W1*b*, W2*b*, and W3*b*, a third group of weights W0*c*, W1*c*, W2*c*, and W3*c*, and a fourth group of weights W0*d*, W1*d*, W2*d*, and W3*d*. Weights multiplexer 1304 also includes multiplexers 2220, 2222, duplication circuits 2224, and multiplexers 2226. Multiplexers 2220, 2222, and 2226 are controlled by control signals M0, M1, and M2, some of which can be derived from input data and weights configuration 1310 and some of which can be provided by computation controller 522. For example, multiplexer 2210 can be controlled by control signal M0 to selectively provide 64-bit data from one of weights-0 register or weights-1 register as the groups of weights. Multiplexer 2222 can select 16 bits from upper 32 bits (one of Wt1H or Wt0H) or lower 32 bits (one of Wt1L or Wt0L) of the selected register for duplication of bits in D8 mode. Duplication circuit 2224 splits a selected 32-bit value into two 16-bit values and generate two 32-bits values by duplicating for each 16-bit values. Multiplexer 2226 can be controlled by control signal M2, which is set based on D4 or D8 mode, to either forward 64-bit values from the selected register as the groups of weights in D4 mode, or forward two 32-bits values from the duplicates of 16-bit values as the groups of weights in D8 mode.

In addition, weights multiplexer 1304 also includes a depthwise and average pooling logic 2228. When enabled by a depthwise convolution enable signal (e.g., from configuration 1311), logic 2228 can select one of the 8-bits from one of the 64-bit weights-0 or weights-1 registers, splits the 8-bits into 4 groups of 2 bits, and pads the weight groups with zeros and send the weight groups to the computation units 1800*a*, 1800*b*, 1800*c*, and 1800*d*. Also, depending on weight precision from input data and weights configuration 1310, weights multiplexer 1304 can pad different weights in each group with zero, as shown in FIGS. 21F-21H. Also, when enabled by an average pooling enable signal (e.g., from configuration 1311), weights multiplexer 1304 can provide duplicates of weight elements W0, W1, W2, and W3 in groups of first, second, third, and fourth weight elements as in FIG. 21G-1 and FIG. 21G-2, with each of W0, W1, W2, and W3 equal to a logical one.

Figure 23:
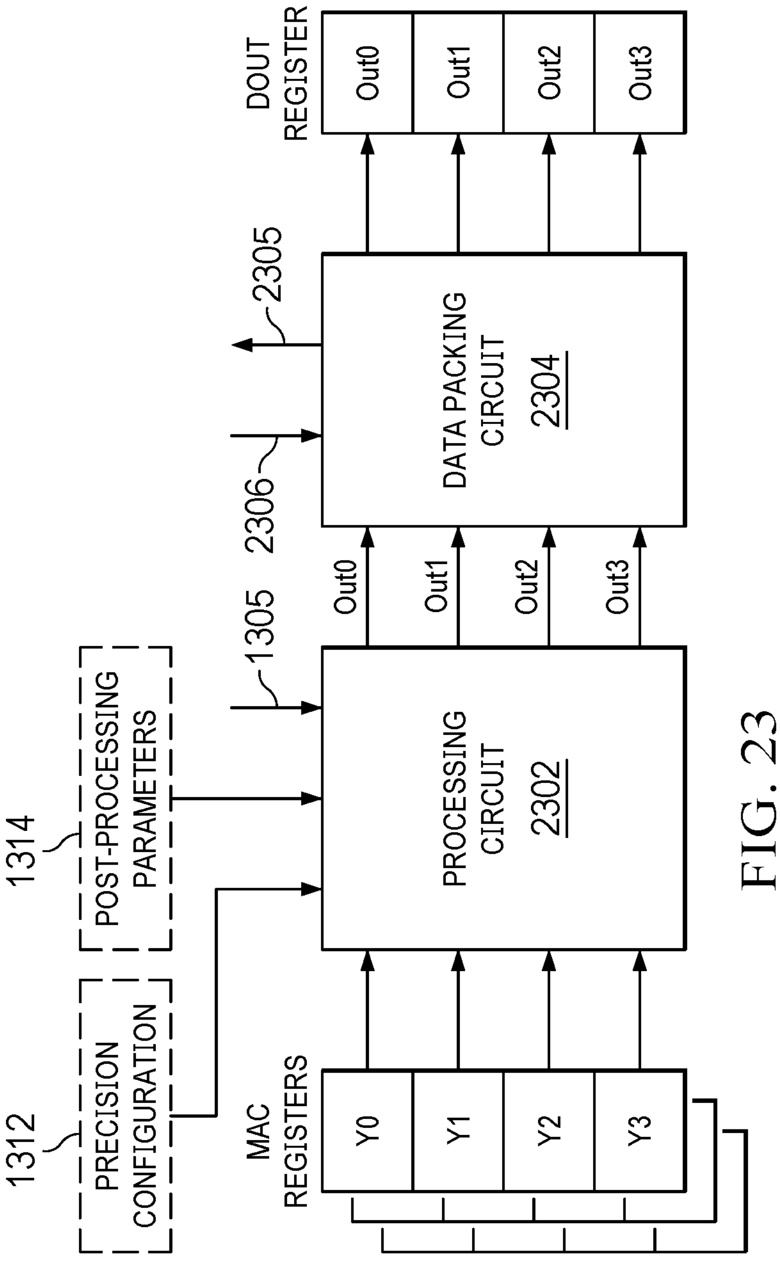
FIG. 23 is a schematic illustrating internal components of a post-processing engine of FIG. 13, according to some examples.

FIG. 23 illustrates example internal components of post processing engine 1302. Referring to FIG. 23, post processing engine 1302 includes a post processing circuit 2302 and a data packing circuit 2304. Post processing circuit 2302 can receive intermediate output data of different channels, such as Y0, Y1, Y2, and Y3, from the MAC registers. Post processing circuit 2302 includes circuits, such as arithmetic circuits and various logic circuits, to perform post processing operations (e.g., BatchNorm, residual layer processing, etc.) on the intermediate output data, responsive to control signal 1305 from computation controller 522, which generates the control signal responsive to sub-instruction 602 indicating the post processing operation. Processing circuit 2302 also receive precision configuration 1312, which indicates input, output and weight precisions, and post processing parameters 1314, which defines various parameters of the post processing operations including the output data bit size/precision, and configure the post processing operations based on precision configuration 1312 and post processing parameters 1314. In some examples, processing circuit 2302 can perform multiple post processing operations on intermediate output data Y0, Y1, Y2, and Y3 in parallel to generate output data Out0, Out1, Out2, and Out 3 in one clock cycle. In some examples, processing circuit 2302 can include data merge circuit 2002 of FIGS. 20A and 20B to provide intermediate output data elements for different input and weight precisions, as described above.

Data packing circuit 2304 can store output data, such as Out0, Out1, Out2, and Out3, at the DOUT register. In some examples, DOUT register has 32 bits. Data packing circuit 2304 is configured to store the output data at particular bit locations of the DOUT register and, responsive to DOUT register being filled with the output data (e.g., 32 bits of output data are stored), transmit a control signal 2305 to load/store controller 530 to fetch the output data from the DOUT register back to memory 512, which allows the DOUT register can be overwritten with new output data.

Specifically, for a certain set of input, output, and weight precisions, data packing circuit 2304 can generate four 8-bit output data elements Out0, Out1, Out2, and Out3 in one clock cycle. Data packing circuit 2304 can store the four 8-bit output data elements into DOUT register after one clock cycle, and then transmit control signal 2305 to load/store controller 530. For a different set of input, output, and weight precisions, processing circuit 2302 may generate 16-bit output data, such as four 4-bit output data elements, or two 8-bit output data elements, per clock cycle. In such cases, processing circuit 2302 may store the first set of 16-bit output data at first bit locations of the DOUT register after the first clock cycle, and then store the second set of 16-bit output data at second bit locations of the DOUT register after the second clock cycle. Such arrangements allow load/store controller 530 to transmit output data in chunks of a particular number of bits (e.g., 32 bits) that can be optimized for the write operations of memory 512. Such arrangements can reduce neural network process 502's access to memory 512 in writing back output data, which can reduce memory usage and power consumption.

In some examples, data packing circuit 2304 can also receive a control signal 2306 from computation controller 522, and transmit control signal 2305 responsive to control signal 2306. Computation controller 522 can generate control signal 2306 responsive to an instruction from instruction buffer 520.

Figure 24:
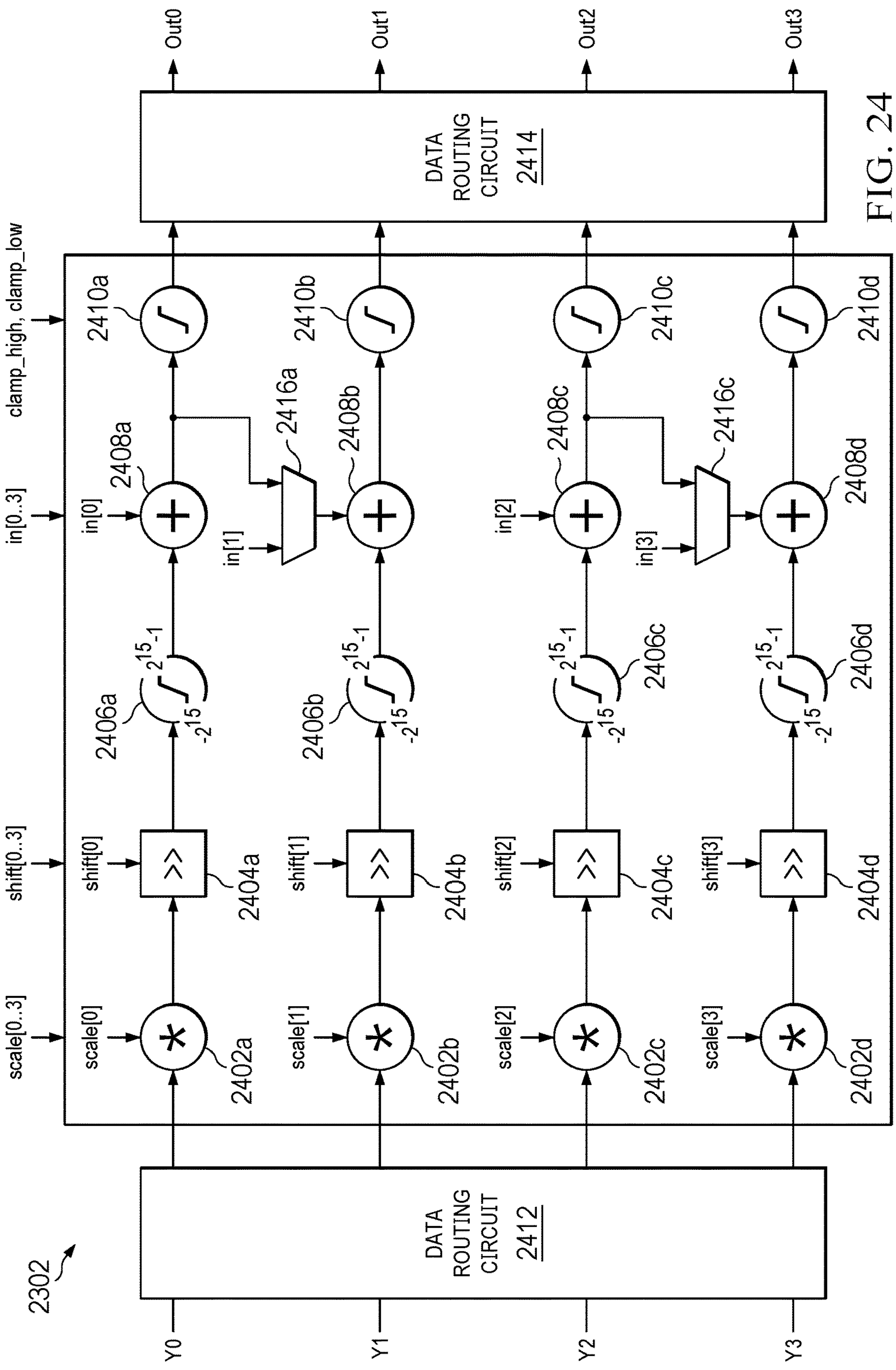
FIG. 24 is a schematic illustrating internal components of the post-processing engine of FIG. 13, according to some examples.

FIG. 24 illustrates examples of internal components of processing circuit 2302. Referring to FIG. 24, processing circuit 2302 can include a series of processing circuits coupled between a data input to receive an intermediate output data element, and a data output to provide an output data element. The processing circuits can include a multiplier circuit 2402, a bit shifter 2404, a saturation circuit 2406, an adder 2408, and a clamp circuit 2410, each can include arithmetic circuits (e.g., adder and multiplier) and/or logic circuits (e.g., bit shifter circuit, mapping tables implemented using multiplexers and demultiplexers for saturation and clamp circuits, etc.), to process an intermediate output data element and to provide an output data element. For example, processing circuit 2302 can include multiplier circuit 2402*a*, bit shifter 2404*a*, saturation circuit 2406*a*, adder 2408*a*, and clamp circuit 2410*a* coupled between a first input of processing circuit 2302 (e.g., to receive Y0) and a first output of processing circuit 2302 (e.g., to provide Out0); multiplier circuit 2402*b*, bit shifter 2404*b*, saturation circuit 2406*b*, adder 2408*b*, and clamp circuit 2410*b* coupled between a second input of processing circuit 2302 (e.g., to receive Y1) and a second output of processing circuit 2302

(e.g., to provide Out1); multiplier circuit 2402*c*, bit shifter 2404*c*, saturation circuit 2406*c*, adder 2408*c*, and clamp circuit 2410*c* coupled between a third input of processing circuit 2302 (e.g., to receive Y2) and a third output of processing circuit 2302 (e.g., to provide Out2); and multiplier circuit 2402*a*, bit shifter 2404*a*, saturation circuit 2406*a*, adder 2408*a*, and clamp circuit 2410*a* coupled between a fourth input of processing circuit 2302 (e.g., to receive Y3) and a fourth output of processing circuit 2302 (e.g., to provide Out3).

Processing circuit 2302 also includes a data routing circuit 2412 coupled between the inputs of processing circuit 2302 and the inputs of multiplier circuits 2402*a-d*, and a data routing circuit 2414 coupled between the outputs of clamp circuits 2410*a-d* and the outputs of processing circuit 2302. As to be described below, data routing circuit 2412 can route the intermediate output data elements to the multiplier circuits, and data routing circuit 2414 can route the output of the clamp circuits to the outputs of processing circuit 2302, based on input, output and weight precisions. Further processing circuit 2302 include a multiplexer circuit 2416*a* coupled between the output of adder 2408*a* and an input of adder 2408*b*, and a multiplexer circuit 2416*c* coupled between the output of adder 2408*c* and an input of adder 2404*d*. The multiplexer circuits 2416 can also be controlled based on weight precision.

Each multiplier circuit 2402 is coupled to a respective input of 2302 to scale an intermediate output data element with a scaling factor (labelled scale[0], scale[1], scale[2], and scale[3] in FIG. 24). The input of bit shifter 2404 is coupled to the output of the multiplier to perform a right shift of the scaled intermediate output data element by a number of bits specified by a shift parameter (labelled shift[0], shift[1], shift[2], and shift[3] in FIG. 24). The input of saturation circuit 2406 is coupled to the bit shifter output. Saturation circuit 2406 can forward the right shifted and scaled intermediate output data element if the data element is between $-2^{15}$ and $(2^{15}-1)$ otherwise output the lower limit $-2^{15}$ if the data element is below $-2^{15}$ and output the upper limit $(2^{15}-1)$ if the data element exceeds $(2^{15}-1)$. In some examples, the upper and lower limits of saturation circuit 2406 can be fixed/built-in and not programmable. Adder 2408 can add a value to the limited, right shifted, and scaled intermediate output data element. The value added can be from a residual layer output (labelled in[0], in[1], in[2], and in[3]), which can fetched from input data registers DIN0/DIN1, to provide residual layer processing. In some examples, the value added can also come from the output of another adder circuit 2408 in processing circuit 2302, based on the control to the multiplexer circuit 2416. The output of adder 2408*a* is coupled to the input of a clamp circuit 2410. Clamp circuit 2410 can implement a clamp function, which can be based on an activation function rectified linear unit (ReLU). The clamp function can also clamp/limit the output between an upper value (labelled clamp_high) and a lower value (labelled clamp_low). The scale, shift, clamp_high, and clamp_low values, as well as connection can be defined in precision configuration 1312 and/or post processing parameters 1314. For example, different clamp_high and clamp_low values can be set based on the output data precision as follows:

TABLE 3

| Output precision | Clamp_low value | Clamp_high value |
|---|---|---|
| 8-bit unsigned | 0 | 255 |
| 7-bit unsigned | 0 | 127 |

TABLE 3-continued

| Output precision | Clamp_low value | Clamp_high value |
|---|---|---|
| 8 bit signed | −128 | 127 |
| 4 bit un-signed | 0 | 15 |

For each intermediate output data element Y_n (e.g., Y0, Y1, Y2, and Y3), processing circuit 2302 can generate an output data element Out_n (e.g., Out0, Out1, Out2, and Out3) based on the following Equation. The scaling and shifting can be different for different channels. Also, the bias values bias[n] can be introduced in the MAC registers to initialize the intermediate output data elements, as described above in FIG. 22.

$$Out\_n = \text{clamp}(\text{Scale}[n]*(Y\_n+\text{bias}[n]))>>\text{shift}[n],\text{clamp\_high},\text{clamp\_low}) \quad \text{(Equation 38)}$$

In FIG. 24, the scale values (e.g., scale[0]-scale[3]) and the shift values (e.g., shift[0]-shift[3]) may vary between different neural network layers, and can be received from weights/parameter registers 529*b* (and weights and parameters buffer 526). The clamp_high and clamp_low values can be relatively static between different neural network layers and can be received from configuration registers 528*d*.

Figure 25A:
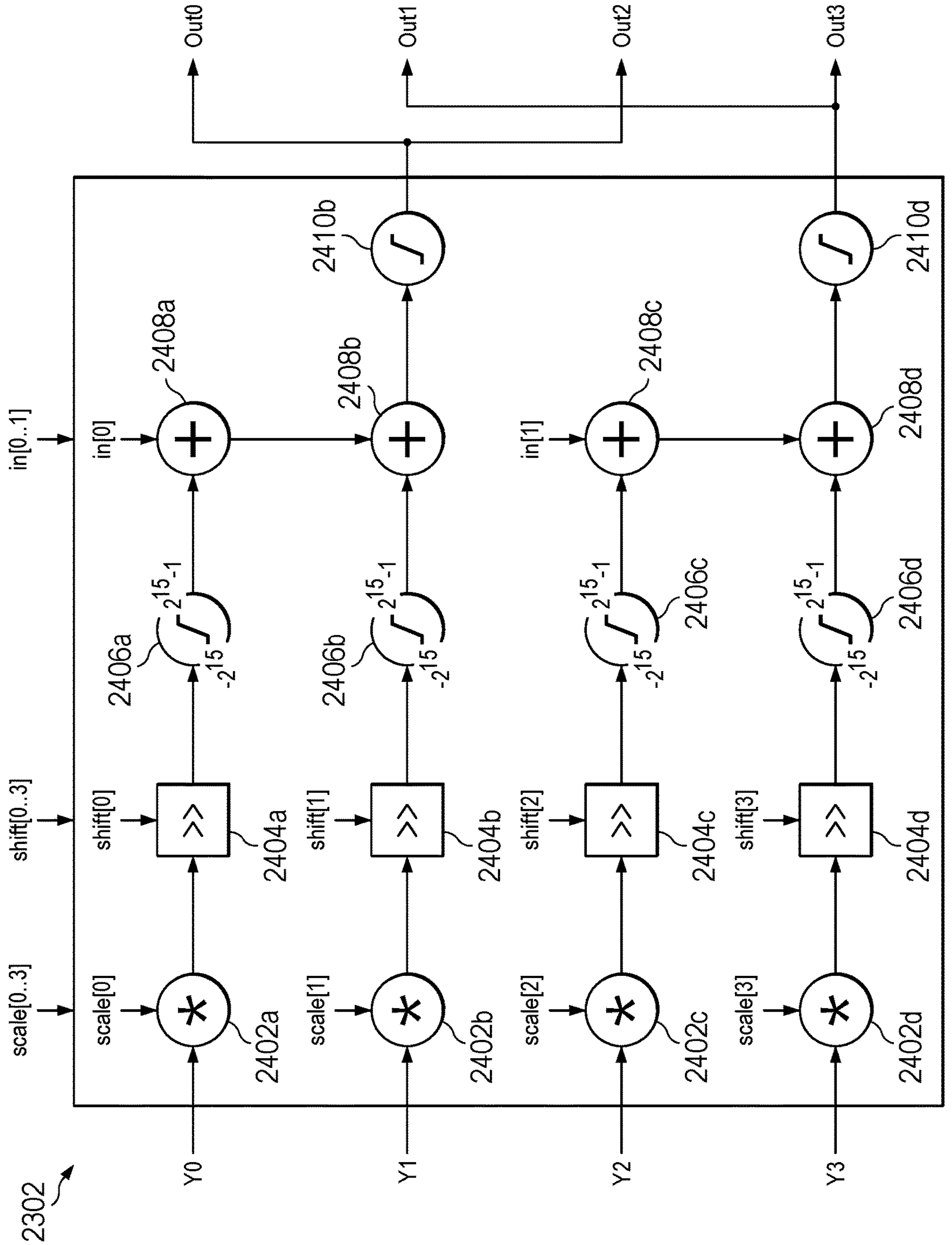
FIGS. 25A, 25B, and 25C are schematics illustrating configurations of the post-processing engine of FIG. 13, according to some examples.
Figure 25B:
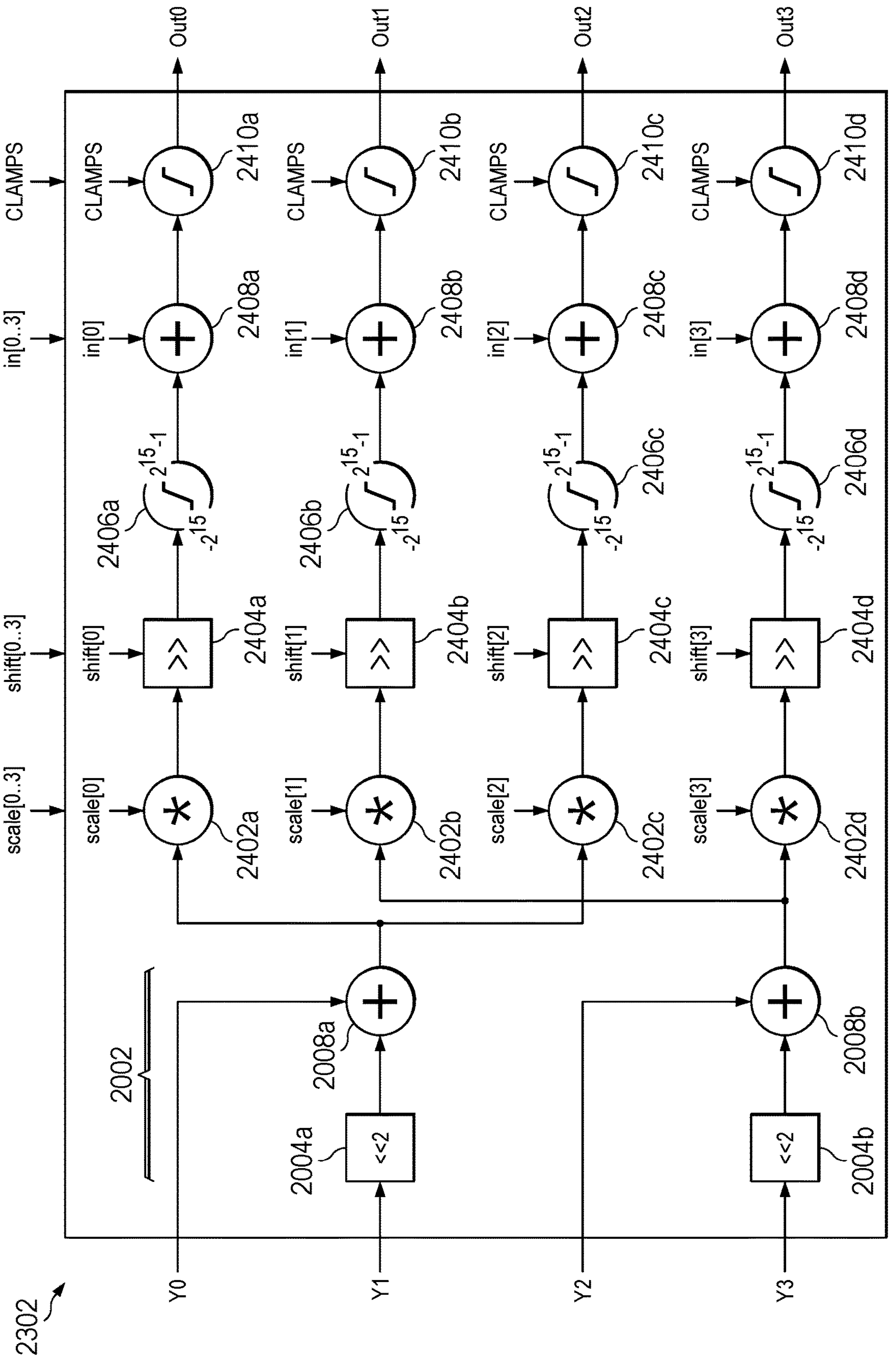
Figure 25C:
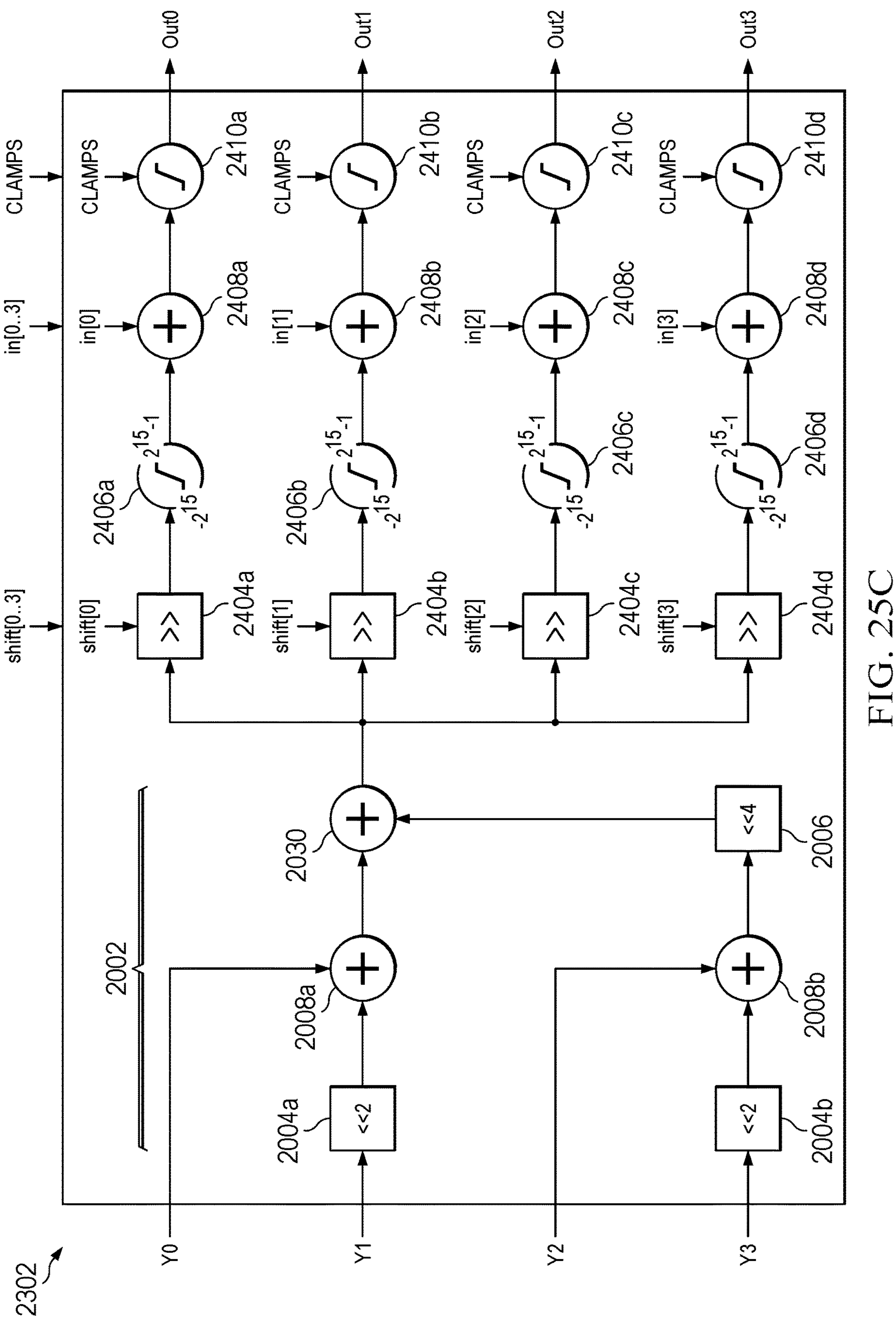

FIG. 25A, FIG. 25B, and FIG. 25C are schematics illustrating different configurations of processing circuit 2302 to support post-processing operations for different input and weight precisions. For brevity, data routing circuits 2412 and 2414 and multiplexer circuits 2416*a-c* are omitted, while their data routing operations are illustrated in FIGS. 25A-C.

FIG. 25A is an example configuration of processing circuit 2302 to support 8-bit data and 2-terniary (2T) weights, which is also illustrated in FIG. 15D. In FIG. 25A, data routing circuit 2412 can connect first input to multiplier circuit 2402*a*, second input to multiplier circuit 2402*b*, third input to multiplier circuit 2402*c*, and fourth input to multiplier circuit 2402*d*. Also, to support 2T weights operation, multiplexer circuit 2416*a* can route the output of adder 2408*a* to an input of adder 2408*b*, so that adder 2408*b* adds the output of saturation circuit 2406*a* (for Y0) and the output of saturation circuit 2406*b* (for Y1), and provide the sum to clamp circuit 2410*b*. Also, multiplexer circuit 2416*c* can route the output of adder 2408*c* to an input of adder 2408*d*, so that adder 2408*d* adds the output of saturation circuit 2406*c* (for Y2) and the output of saturation circuit 2406*d* (for Y3), and provide the sum to clamp circuit 2410*d*. Data routing circuit 2414 can route the output of clamp circuit 2410*b* to first and third outputs to provide duplicate Out0 and Out2, and route the output of clamp circuit 2410*d* to second and fourth outputs to provide duplicate Out1 and Out3. In some examples, data packing circuit 2304 can store one of Out0 or Out2 and one of Out 1 or Out 3 generated by processing circuit 2302 in a first clock cycle at first bit locations of the DOUT register, and then store one of Out0 or Out2 and one of Out 1 or Out 3 generated by processing circuit 2302 in a second clock cycle at second bit locations of the DOUT register, and then transmit control signal 2305 to initiate fetching of the output data from the DOUT register to memory 512. In some examples, data packing circuit 2304 can also store Out0, Out2, Out 1, and Out 3 generated by processing circuit 2302 in a clock cycle, and transmit control signal 2305 to initiate fetching of the output data from the DOUT register to memory 512.

FIG. 25B and FIG. 25C illustrate example configurations of processing circuit 2302 including data merge circuit 2002, which can be part of data routing circuit 2412. In FIG. 25B, data merge circuit 2002 is configured to support 8-bit input data and 4-bit weights, as in FIGS. 21D-1 and 21D-2. Data routing circuit 2412 can route the output of adder 2008*a* to the inputs of multiplier circuits 2402*a* and 2402*c*, and route the output of adder 2008*b* to the inputs of multiplier circuits 2402*b* and 2402*d*. Processing circuit 2302 may generate Out0 and Out2 as duplicates and Out1 and Out3 as duplicates. Data packing circuit 2304 may store Out0 and Out2 as duplicate data and Out1 and Out3 as duplicate data generated in one clock cycle in the DOUT register, or store different sets of Out0/Out2 and Out1/Out3 from two different clock cycles in the DOUT register, as described above.

Also, in FIG. 25C, data merge circuit 2002 is configured to support 8-bit input data and 8-bit weights, as in FIG. 21E. Data routing circuit 2412 can route the output of adder 2008*a* to the inputs of multiplier circuits 2402*a* and 2402*c*, and route the output of adder 2030 to the inputs of multiplier circuits 2402*a-d*. Processing circuit 2302 may generate Out0, Out1, Out2, and Out4 as duplicates. Data packing circuit 2304 may store Out0-Out3 as duplicate data generated in one clock cycle in the DOUT register, or a different Out0/Out1/Out2/Out3 from four different clock cycles in the DOUT register, as described above.

FIGS. 26A-1, 26A-2, and 26B illustrate examples of internal components of max pooling engine 1320 and their operations. Max pooling engine 1320 can compare the input data elements of one of DIN0 or DIN1 input data registers with the output data elements of the DOUT register, and replace a particular output data element in the DOUT register if it has a lower value than the input data element being compared against. Max pooling engine 1320 can also be bypassed so as not to overwrite the DOUT register, or output a zero as a result of the max pooling operation.

Figures 1, 26A:
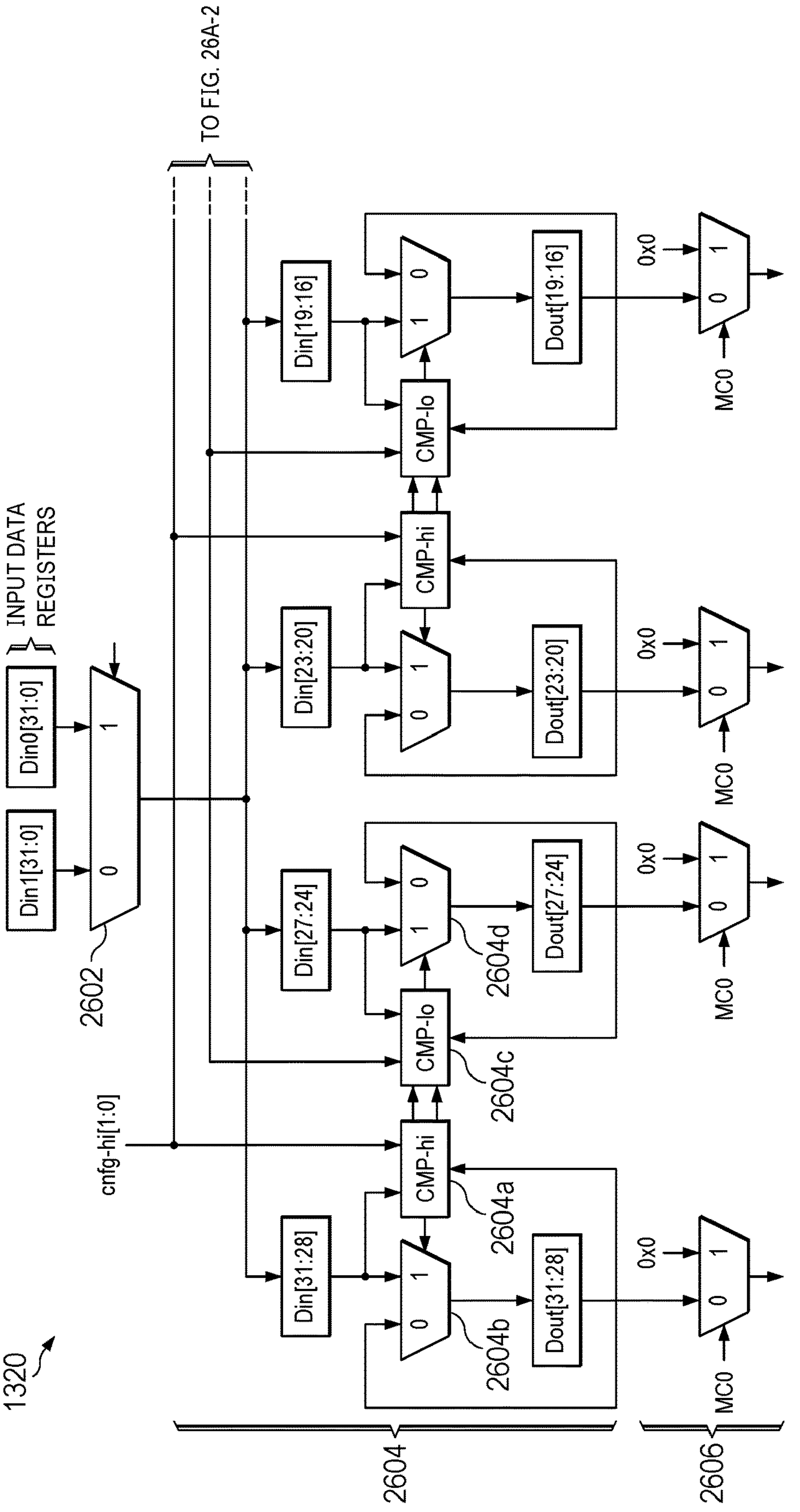
Figures 2, 26A:
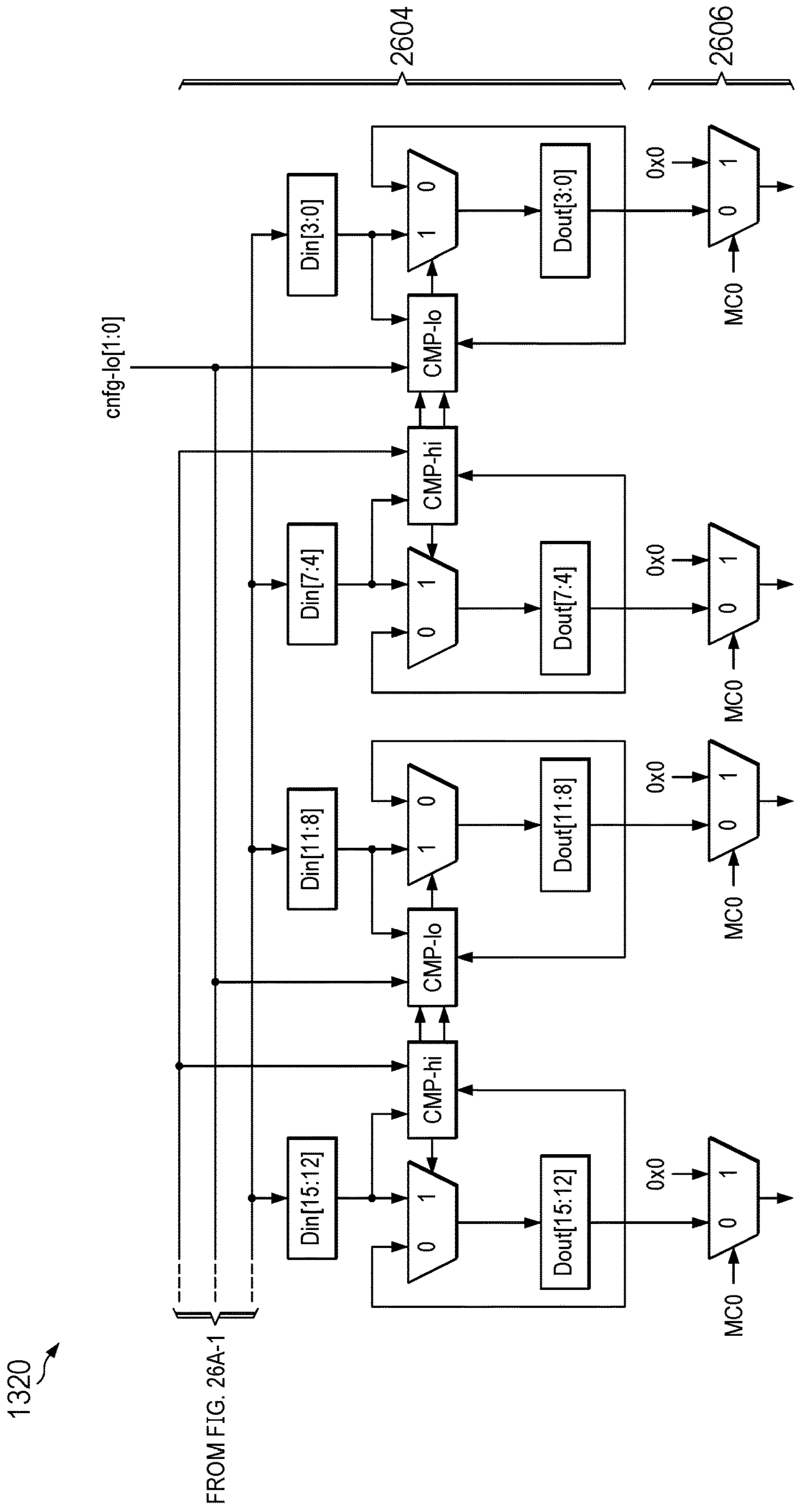

Referring to FIGS. 26A-1 and 26A-2, max pooling engine 1320 can include a multiplexer 2602, comparison circuitry 2604, and multiplexers 2606. Multiplexer 2602 can be controlled (e.g., based on post processing parameters 1314) to select which of input data registers DIN0 or DIN1 to perform the max pooling operation. Comparison circuitry 2604 can receive configuration data via terminals cnfg-hi[1:0] and cnfg-lo[1:0] indicating, for example, whether to perform 4-bit or 8-bit comparison, whether the comparison is signed or unsigned, etc., and compare the input data (from one of DIN0 or DIN1) and the output data (in DOUT) in 8-bit chunks (e.g., between DIN[31:24] and DOUT[31:24], between DIN[23:16] and DOUT[23:16], between DIN[15:8] and DOUT[15:8], and between DIN[7:0] and DOUT[7:0], based on the configuration data. The configuration data can be part of post processing parameters 1314 from configuration registers 528*d*.

For each 8-bit chunk, the comparison between 4-bit MSBs can be performed by an MSB comparison circuit, such as compare circuit 2604*a* (also labelled CMP-hi in FIGS. 26A and 26B), and the comparison between 4-bit LSBs can be performed by a LSB comparison circuit, such as compare circuit 2604*b* (also labelled CMP-lo in FIGS. 26A and 26B). CMP-hi circuit can also transmit the 4-bit MSB comparison result to CMP-lo circuit to ensure that for an 8-bit comparison, CMP-lo circuit does not indicate that DOUT is smaller than DIN when the MSBs of DOUT has the same or a larger value than the MSBs of DIN, but the LSBs of DOUT have a smaller value than the LSBs of DIN. Also, depending on the result of the comparison, a multiplexer (e.g., multiplexers 2604*c* and 2604*d*) can overwrite the 4-bit MSBs and/or the 4-bit LSBs of the 8-bit chunk of the output data with the input data. In a case of 8-bit comparison, the multiplexer overwrites the 8-bit DOUT data with 8-bit DIN data only if the entire 8-bit DOUT data has a lower value than the 8-bit DIN data. Further, multiplexers 2606 can either provide the 8-bit chunks of DOUT data or a zero. On the other hand, in a case of 4-bit comparison, the multiplexer compare between 4-bit DOUT data and 4-bit DIN data, and can replace the 4-bit DOUT data if the 4-bit DIN data exceeds the 4-bit DOUT data without consideration of comparison result between other 4-bit DIN/DOUT data.

FIG. 26B are charts 2610 and 2612 that illustrate example operations of CMP-hi and CMP-lo circuits. In FIG. 26B, charts 2610 and 2612 illustrate the logic operations of, respectively, CMP-hi and CMP-lo circuits, which are represented in the form of instructions, which can be synthesized into (and represent) logic circuits representing the CMP-hi and CMP-lo circuits.

Referring to chart 2610, CMP-hi circuit (e.g., compare circuit 2604*a*) can receive configuration data, such as whether the 4-bit MSBs of the 8-bit chunks of the DIN and DOUT data being compared are signed or unsigned data. If the data are signed, CMP-hi can sign extend both the 4-bit MSBs of the DIN and the DOUT data, otherwise pre-pend them with zero (by adding a zero before the MSBs).

If the 4-bit MSBs of the DIN data has a larger value than the 4-bit MSBs of DOUT data, CMP-hi circuit can set a control signal to the multiplexer (e.g., multiplexer circuit 2604*c*) to overwrite the 4-bit MSBs of the DOUT data with the 4-bit LSBs of the DIN data. CMP-hi circuit can also provide a first comparison signal (set cmp-res="GT") to the CMP-lo circuit. On the other hand, if the 4-bit MSBs of the DIN and DOUT data are the same, CMP-hi circuit can provide a second comparison signal (set cmp-res="EQ"). The first and second comparison signals are provided to CMP-lo circuit to avoid making the wrong comparison decision where the MSBs of DOUT has a higher value than DIN but the LSBs of DOUT has a lower value than DIN. In both cases where the 4-bit MSBs of the DIN data has the same or a lower value than the DOUT data, CMP-hi circuit can maintain the 4-bit MSBs of the DOUT data in the DOUT register.

Also, referring to chart 2612, CMP-lo circuit (e.g., compare circuit 2604*b*) can receive configuration data, such as whether the 4-bit LSBs of the 8-bit chunks of the DIN and DOUT data being compared are signed or unsigned data, and whether 8-bit comparison or 4-bit comparison are performed. If the data are signed, CMP-lo can sign extend both the 4-bit LSBs of the DIN and the DOUT data, otherwise pre-pend them with zero. Also, if 4-bit comparison is performed, CMP-lo circuit can ignore the control signals from CMP-hi circuit, and overwrite the 4-bit LSBs of DOUT data with 4-bit LSBs of DIN data if the latter has a higher value. Further, if 8-bit comparison is performed, CMP-lo circuit can overwrite the 4-bit LSBs of DOUT data with 4-bit LSBs of DIN data (using multiplexer circuit 2604*d*) only if the first control signal indicates that 4-bit MSBs of DOUT data has a higher value than the 4-bit MSBs of DIN data, or if the second control signal indicates the 4-bit MSBs are equal, and the 4-bit LSBs of the DOUT data has a lower value than the 4-bit LSBs of DIN data.

Figure 27:
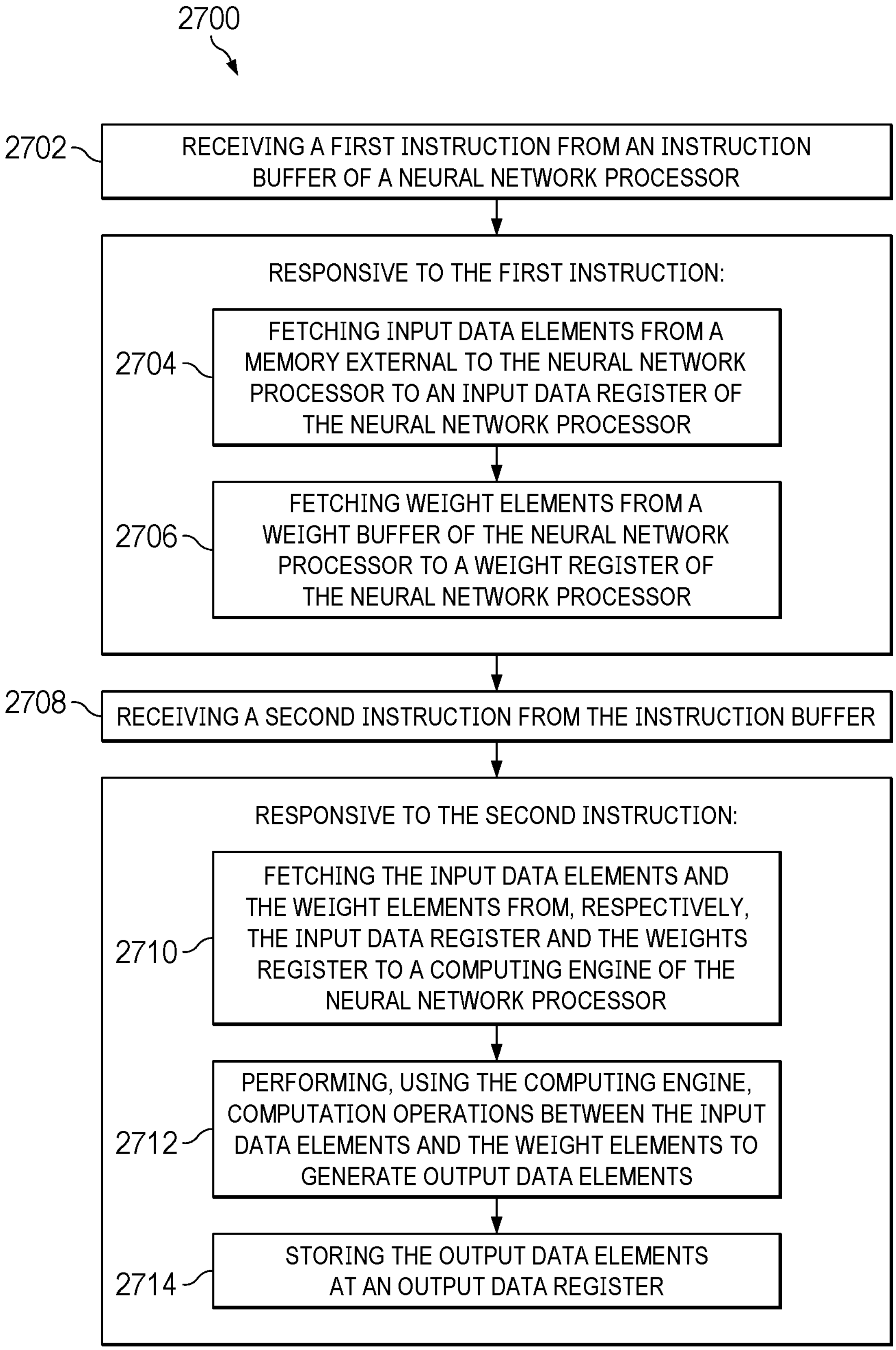
FIGS. 27, 28, 29A, and 29B are flowcharts illustrating operations of a neural network processor, according to some examples.

FIG. 27 illustrates a flowchart of a method 2700 of operation of a neural network processor. Method 2700 can be performed by various components of neural network processor 502 such as, for example, computation controller 522, load/store controller 530, computing engine 524, etc.

In operation 2702, computation controller 522 receives a first instruction from instruction buffer 520. Example syntax of the first instruction is illustrated in FIGS. 6A and 6B. The first instruction may include a sub-instruction 610 indicating fetching of input data elements to an input data register and a sub-instruction 608 indicating fetching of weight elements to a weights registers.

In operation 2704, responsive to the first instruction (e.g., sub-instruction 610), load/store controller 530 fetches the input data elements from a memory (e.g., memory 512) external to the neural network processor to an input data register (e.g., Din0 or Din1 of data register 528*a*) of the neural network processor. Load/store controller 530 can perform read operations via memory interface 534 to fetch the input data elements. The read address can be generated by address generators 532, and can be based on a circular addressing scheme as described in FIGS. 8A-10B.

Also, in operation 2706, responsive to the first instruction (e.g., sub-instruction 608), load/store controller 530 fetches the weight elements from a weights buffer of the neural network processor (e.g., weights and parameters buffer 526) to a weights register (e.g., weights-0 or weights-1 registers of weights/parameters registers 528*b*) of the neural network processor. The fetching of weight elements and input data elements can be performed in parallel.

In operation 2708, computation controller 522 receives a second instruction from instruction buffer 520. The second instruction can include sub-instruction 602 indicating a computation operation (e.g., MAC operations, post-processing operations, etc.) to be performed by computing engine 524 on weight elements stored in the weights register and input data elements stored in the input data register.

In operation 2710, responsive to the second instruction, the computing engine can fetch the input data elements and the weight elements from, respectively, the input data register and the weights register.

In operation 2712, responsive to the second instruction, the computing engine can perform computation operations, including MAC and post-processing operations, on the input data elements and the weight elements to generate output data elements.

In operation 2714, the computing engine can store the output data elements an output data register (e.g., Dout).

Figure 28:
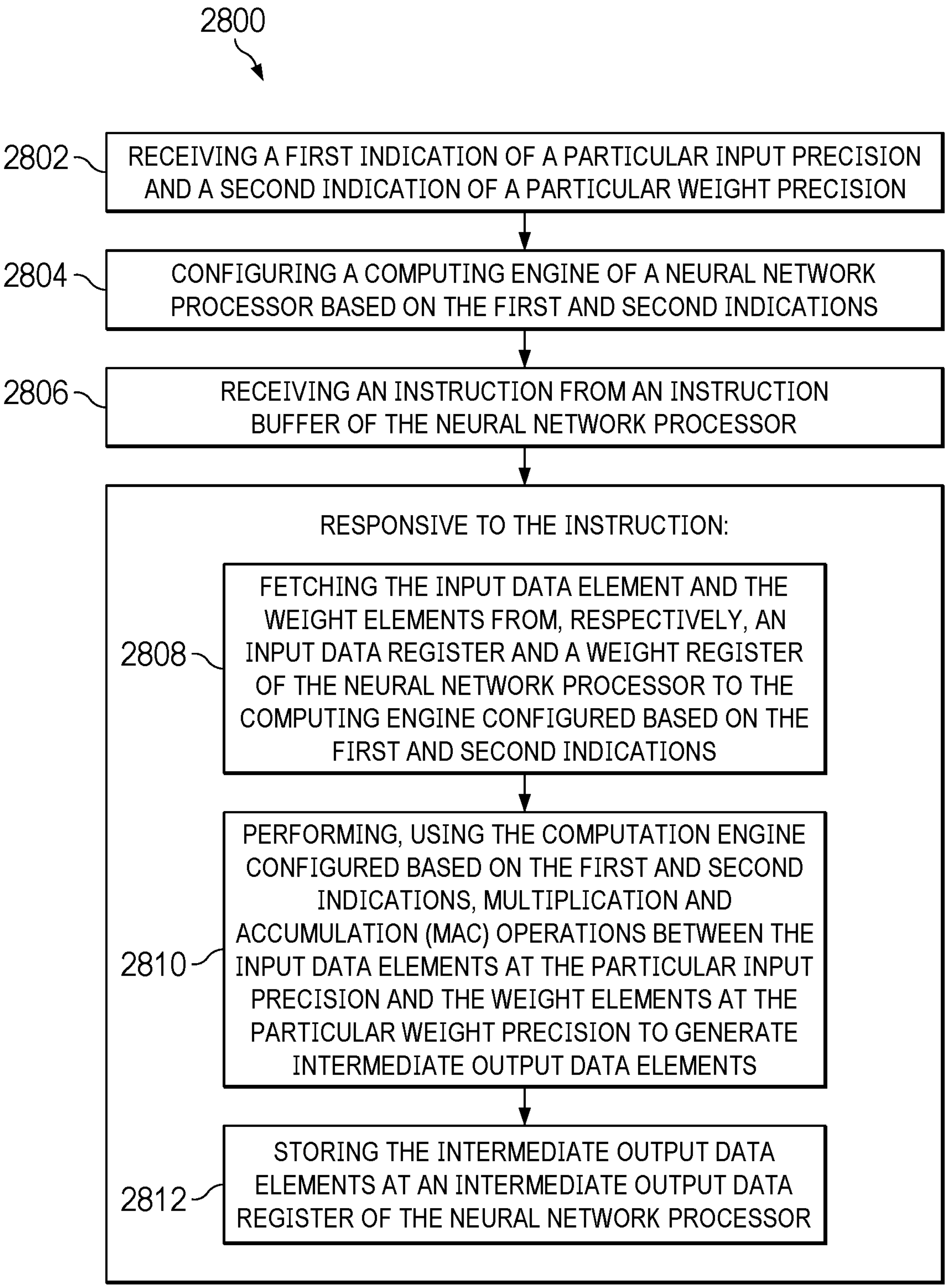

FIG. 28 illustrates a flowchart of a method 2800 of operation of a neural network processor. Method 2800 can be performed by various components of neural network processor 502 such as, for example, computation controller 522, load/store controller 530, computing engine 524 including MAC engine 1300, etc.

In operation 2802, computation controller 522 receives a first indication of a particular input precision and a second indication of a particular weight precision. The first and second indications can be received from configuration registers 528*c*.

In operation 2804, computation controller 522 configures a computing engine of a neural network processor based on the first and second indications. The configuration can be based on, for example, setting the D4/D8 modes for the weights multiplexer 1304 and input data multiplexer 1306, setting configuration 1710 including the binary mode (or no binary mode) for computation units 1800 of MAC engine 1300, etc.

In operation 2806, computation controller 522 receives an instruction from an instruction buffer. The instruction may include sub-instruction 602 indicating a set of MAC operations to be performed by MAC engine 1300 on weight elements stored in the weights register and input data elements stored in the input data register.

In operation 2808, responsive to the instruction, the computing engine configured based on the first and second indications can fetch input data elements and weight elements from, respectively, the input data register and the weights register. As described above, depending on whether the weights are 4-bit or 8-bit precisions, and whether the input data elements are 4-bit or 8-bit precisions, which can set the D8/D4 mode, weights multiplexer 1304 and data multiplexer 1306 can fetch the weight elements of different bit precisions and input data elements of different bit precisions to the computation units 1800, as illustrated in FIGS. 21A-21H. Depending on the bit precisions, weights multiplexor 1304 can provide different bits of a weight element to different computation units, or different weight elements to different computation units. Weights multiplexor 1304 may also duplicate some of the bits in D8 mode. Also, data multiplexer 1306 can provide duplicates of input data elements in D4 mode.

In operation 2810, responsive to the instruction, the computing engine configured based on the first and second indications can perform multiplication and accumulation (MAC) operations between the input data elements at the particular input precision and the weight elements at the particular weight precision to generate intermediate output data elements. For example, for binary mode, the computing engine can perform bitwise XNOR operations between the input data elements and the weights elements. Also, for certain data and weight precisions (e.g., 8-bit input precision and 2-bit weight precision, 4-bit input and weight precisions, etc.), each computation unit can generate an intermediate output data element. For other data and weight precisions (e.g., 8-bit input precision and 4-bit weight precision, 8-bit input precision and 8-bit weight precision), the computing engine can use a data merge circuit (e.g., data merge circuit 2002) to merge outputs from different computation units to generate an intermediate output data element, as illustrated in FIGS. 21D and 21E.

In operation 2812, the computing engine can store the intermediate output data elements at intermediate output data registers (e.g., MAC registers).

Figure 29A:
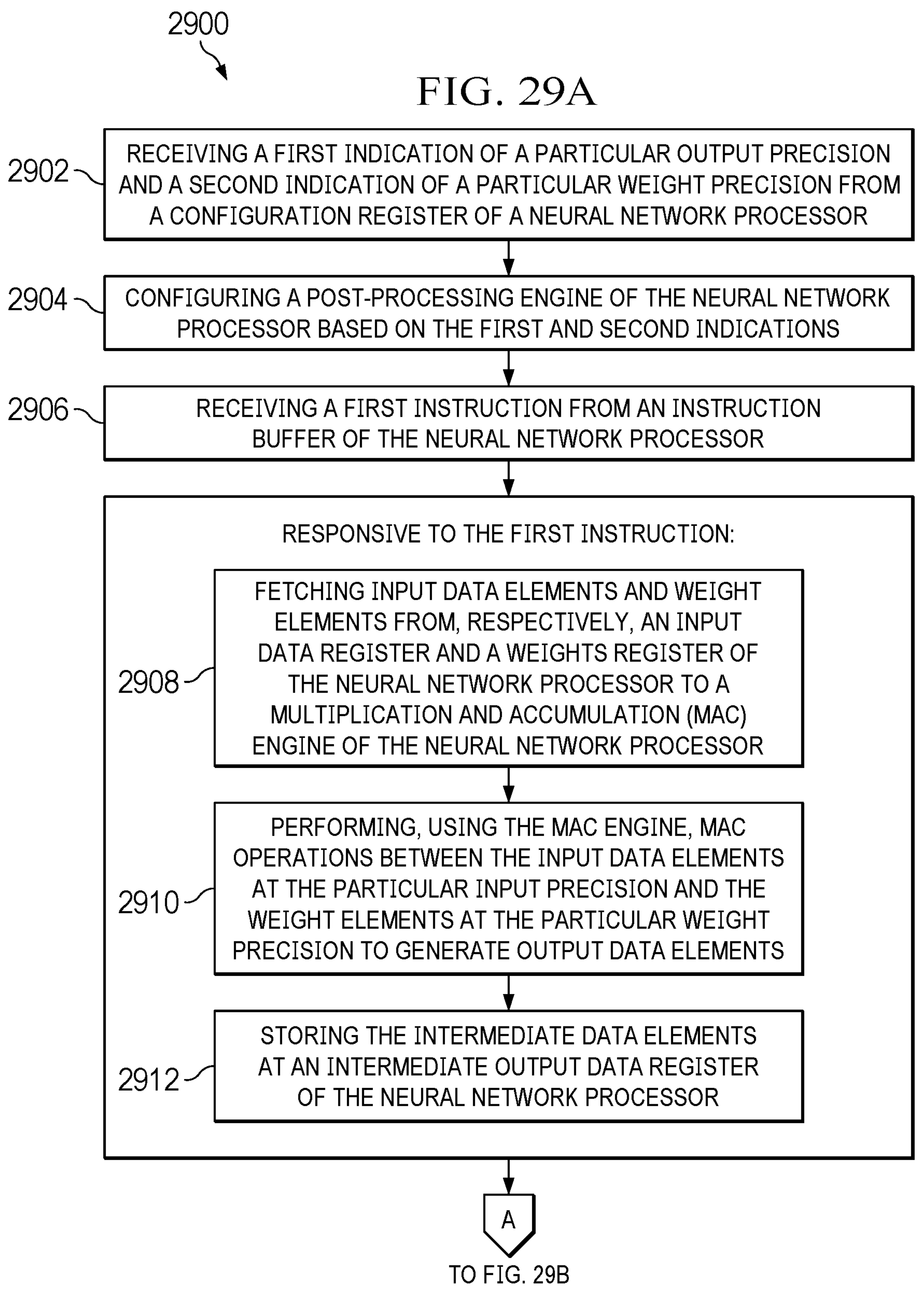
Figure 29B:
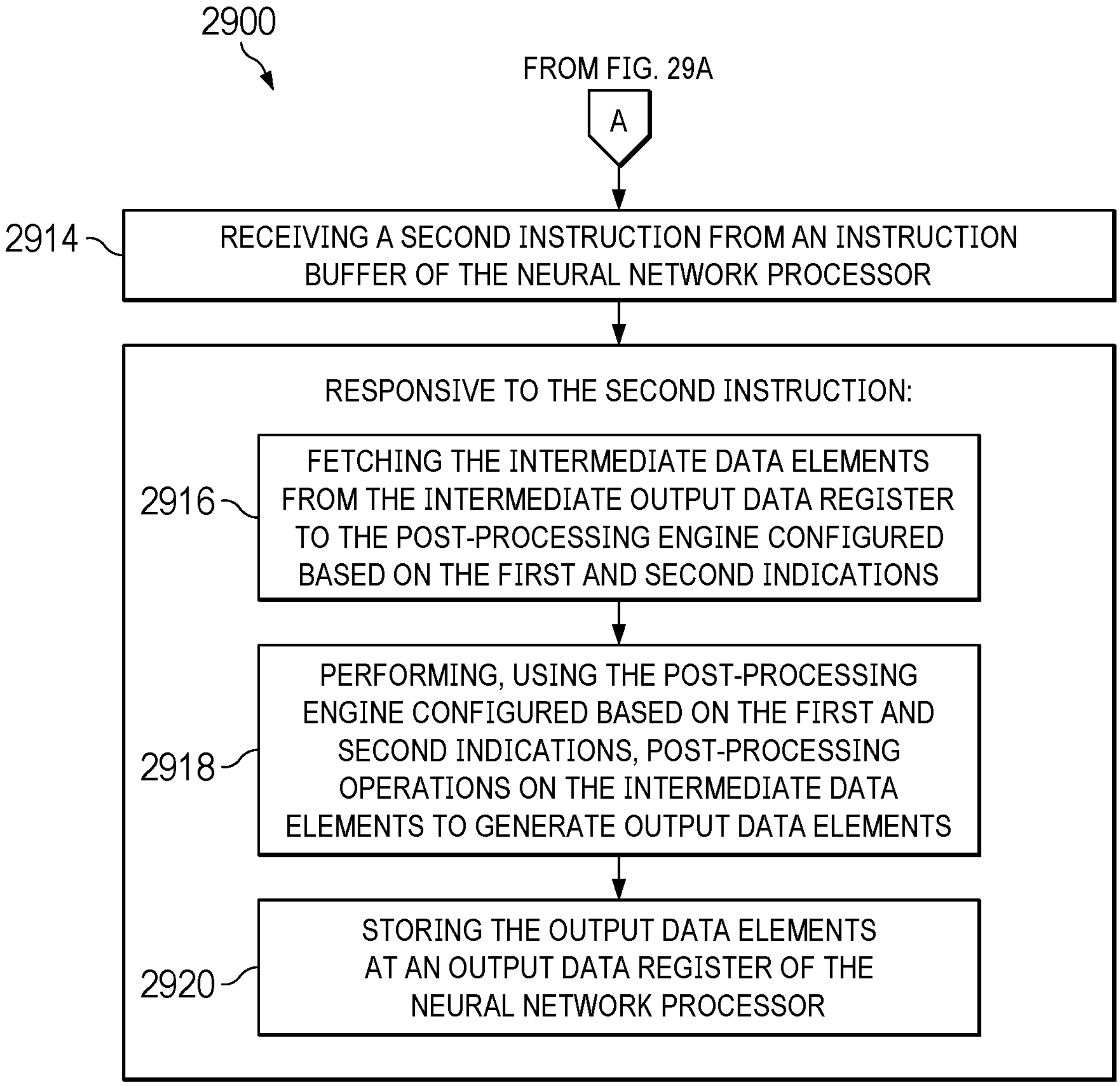

FIGS. 29A and 29B illustrate a flowchart of a method 2900 of operation of a neural network processor. Method 2900 can be performed by various components of neural network processor 502 such as, for example, computation controller 522, load/store controller 530, computing engine 524 including MAC engine 1300, etc.

In operation 2902, computation controller 522 receives a first indication of a particular output precision and a second indication of a particular weight precision. Computation controller 522 may also receive a third indication of a particular input precision. The first, second, and third indications can be received from configuration registers 528*c*.

In operation 2904, computation controller 522 configures post-processing engine 1302 based on the first and second indications (and third indication). The configuration can be based on, for example, setting the clamp high and clamp low value based on the output precision (8 bit or 4 bit), setting multiplexer circuit 2416*a* to route adder 2408*a* output to adder 2408*b* input and multiplexer circuit 2416*b* to route adder 2408*c* output to adder 2408*d* input to support 2-terinary weights, setting data routing circuit 2412 to route the output of data merge circuit 2002 to multipliers 2402*a-d* to support 8-bit input precision and 4-bit weight precision or 8-bit input precision and 8-bit weight precision, as shown in FIGS. 25A-25C.

In operation 2906, computation controller 522 receives a first instruction from an instruction buffer. The first instruction may include sub-instruction 602 indicating a set of MAC operations to be performed by MAC engine 1300 on weight elements stored in the weights register and input data elements stored in the input data register.

In operation 2908, responsive to the first instruction, MAC engine 1300 of computing engine 524 can fetch input data elements and weight elements from, respectively, the input data register and the weights register. In some examples, computing engine 524 can also be configured based on the input and weights precisions. As described above, depending on whether the weights are 4-bit or 8-bit precisions, and whether the input data elements are 4-bit or 8-bit precisions, which can set the D8/D4 mode, weights multiplexer 1304 and data multiplexer 1306 can fetch the weight elements of different bit precisions and input data elements of different bit precisions to the computation units 1800, as illustrated in FIGS. 21A-21H. Depending on the bit precisions, weights multiplexor 1304 can provide different bits of a weight element to different computation units, or different weight elements to different computation units. Weights multiplexor 1304 may also duplicate some of the bits in D8 mode. Also, data multiplexer 1306 can provide duplicates of input data elements in D4 mode.

In operation 2910, responsive to the instruction, MAC engine 1300 can perform multiplication and accumulation (MAC) operations between the input data elements at the particular input precision and the weight elements at the particular weight precision to generate intermediate output data elements. For example, for binary mode, the computing engine can perform bitwise XNOR operations between the input data elements and the weights elements. Also, for certain data and weight precisions (e.g., 8-bit input precision and 2-bit weight precision, 4-bit input and weight precisions, etc.), each computation unit can generate an intermediate output data element. For other data and weight precisions (e.g., 8-bit input precision and 4-bit weight precision, 8-bit input precision and 8-bit weight precision), the computing engine can use a data merge circuit (e.g., data merge circuit 2002) to merge outputs from different computation units to generate an intermediate output data element, as illustrated in FIGS. 21D and 21E.

In operation 2912, MAC engine 1300 can store the intermediate output data elements at intermediate output data registers (e.g., MAC registers).

Referring to FIG. 29B, in operation 2914, computation controller 522 receives a second instruction from an instruction buffer. The second instruction may include sub-instruction 602 indicating a post-processing operation (e.g., BNorm) to be performed by post-processing engine 1302 on the intermediate output data.

In operation 2916, responsive to the second instruction, post-processing engine 1302 configured based on the first and second (and third) indications fetch the intermediate output data elements from the intermediate output data registers.

In operation 2918, responsive to the second instruction, post-processing engine 1302 configured based on the first and second (and third) indications perform post-processing operations, such as BNorm operations, residual layer processing, etc., on the intermediate data elements to generate output data elements, as illustrated in FIGS. 24 and 25A-C. A post-processing operation, including scaling, bit shifting, clamping, etc., can be performed in one clock cycle.

In operation 2920, responsive to the second instruction, post-processing engine 1302 stores the output data elements at an output data register (e.g., Dout) of data registers 528*a*. The storing of the output data elements can be performed by data packing circuit 2304. Upon storing a threshold size of data at Dout (e.g., 32 bits), data packing circuit 2304 can transmit a control signal 2305 to load/store controller 530 to fetch the output data to memory 512.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While particular transistor structures are referred to above, other transistors or device structures may be used instead. For example, p-type MOSFETs may be used in place of n-type MOSFETs with little or no additional changes. In addition, other types of transistors (such as bipolar transistors) may be utilized in place of the transistors shown. The capacitors may be implemented using different device structures (such as metal structures formed over each other to form a parallel plate capacitor) or may be formed on layers (metal or doped semiconductors) closer to or farther from the semiconductor substrate surface.

As used above, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described examples, and other examples are possible, within the scope of the claims.

What is claimed is:

1. A neural network processor comprising:

a memory interface;

an instruction buffer;

an input data address register;

a weights buffer;

an input data register;

a weights register;

an output data register;

a computing engine; and a controller configurable to:

receive a first instruction from the instruction buffer, the first instruction referring to the input data address register, and including sub-instructions for fetching input data elements and fetching weight elements;

responsive to the first instruction and based on content of the input data address register, access the memory interface to fetch the input data elements via the memory interface to the input data register, and fetch the weight elements from the weights buffer to the weights register;

receive a second instruction from the instruction buffer; and responsive to the second instruction:

fetch the input data elements and the weight elements from, respectively, the input data register and the weights register to the computing engine;

perform, using the computing engine, computation operations between the input data elements and the weight elements to generate output data elements; and store the output data elements at the output data register.

2. The neural network processor of claim 1, wherein the controller is configurable to:

extract a first sub-instruction from the first instruction, in which the first sub-instruction indicates fetching of the input data elements to the input data register;

extract a second sub-instruction from the first instruction, in which the second sub-instruction indicates fetching of the weight elements from the weights buffer to the weights register; and fetch the input data elements from the memory interface to the input data register responsive to the first sub-instruction, and fetch the weight elements from the weights buffer to the weights register responsive to the second sub-instruction.

3. The neural network processor of claim 2, wherein the controller is configurable to fetch the input data elements from the memory interface to the input data register and fetch the weight elements from the weights buffer to the weights register in parallel.

4. The neural network processor of claim 2, wherein the input data elements are first input data elements, the input data register is a first input data register, the neural network processor further comprises a second input data register, and the second instruction includes a third sub-instruction indicating fetching of second input data elements into the second input data register; and wherein the controller is configurable to fetch the second input data elements from the memory interface to the second input data register responsive to the third sub-instruction.

5. The neural network processor of claim 4, wherein the controller is configurable to perform the computation operations using the computing engine and fetch the second input data elements from the memory interface in parallel.

6. The neural network processor of claim 2, wherein:

the input data address register is configurable to store an input data memory address;

the first sub-instruction includes a reference to the input data address register; and the controller is configurable to perform a memory read operation at the input data memory address via the memory interface to fetch the input data elements responsive to the first sub-instruction.

7. The neural network processor of claim 6, wherein the input data memory address is a first input data memory address, the first instruction includes a third sub-instruction, in which the third sub-instruction indicates the first input data memory address is to be incremented or decremented, and the controller is configurable to:

extract the third sub-instruction from the first instruction;

responsive to the third sub-instruction, generate a second input data memory address by incrementing or decrementing the first input data memory address; and store the second input data memory address in the input data address register to overwrite the first input data memory address.

8. The neural network processor of claim 7, wherein the controller is configurable to generate the second input data memory address based on a start input data memory address and an end input data memory address, in which the start input data memory address and the end input data memory address define an input data memory region.

9. The neural network processor of claim 8, further comprising a configuration register configurable to store an indication of an address management mode and the start and end input data memory addresses, and wherein the controller is configurable to, responsive to the indication indicating a circular address mode:

if the second input data memory address is lower than the start input data memory address:

determine a first offset between the second input data memory address and the end input data memory address;

update the second input data memory address based on the end input data memory address and the first offset; and store the updated second input data memory address in the input data address register to overwrite the first input data memory address;

if the second input data memory address is high than the end input data memory address:

determine a second offset between the second input data memory address and the start input data memory address;

update the second input data memory address based on the start input data memory address and the second offset; and store the updated second input data memory address in the input data address register to overwrite the first input data memory address; and if the second input data memory address is between the start input data memory address and the end input data memory address, store the second input data memory address in the input data address register to overwrite the first input data memory address.

10. The neural network processor of claim 6, further comprising an output data address register configurable to store an output data memory address;

wherein the controller is configurable to:

receive a third instruction from the instruction buffer, in which the third instruction indicates writing of the output data elements from the output data register to a memory via the memory interface, and the third instruction includes a reference to the output data address register; and perform a memory write operation at the output data memory address via the memory interface responsive to the third instruction.

11. The neural network processor of claim 10, wherein the output data memory address is a first output data memory address, the third instruction includes a third sub-instruction, in which the third sub-instruction indicates the first output data memory address is to be incremented or decremented, and the controller is configurable to:

extract the third sub-instruction from the third instruction;

responsive to the third sub-instruction, generate a second output data memory address by incrementing or decrementing the first output data memory address; and store the second output data memory address in the output data address register to overwrite the first output data memory address.

12. The neural network processor of claim 11, wherein the controller is configurable to generate the second output data memory address based on a start output data memory address and an end output data memory address, in which the start output data memory address and the end output data memory address define an output data memory region.

13. The neural network processor of claim 12, further comprising a configuration register configurable to store an indication of an address management mode, the start output data memory address, and the end output data memory address, and wherein the controller is configurable to, responsive to the indication indicating a circular address mode:

if the second output data memory address is lower than the start output data memory address:

determine a first offset between the second output data memory address and the end output data memory address;

update the second output data memory address based on the end output data memory address and the first offset; and store the updated second output data memory address in the output data address register to overwrite the first output data memory address;

if the second output data memory address is high than the end output data memory address:

determine a second offset between the second output data memory address and the start output data memory address;

update the second output data memory address based on the start output data memory address and the second offset; and store the updated second output data memory address in the output data address register to overwrite the first output data memory address; and if the second output data memory address is between the start output data memory address and the end output data memory address, store the second output data memory address in the output data address register to overwrite the first output data memory address.

14. The neural network processor of claim 11, wherein the controller is configurable to generate the second output data memory address based on a start input data memory address and an end input data memory address, in which the start input data memory address and the end input data memory address define an input data memory region.

15. The neural network processor of claim 14, wherein the controller is configurable to:

if the second output data memory address is lower than the start input data memory address:

determine a first offset between the second output data memory address and the end input data memory address;

update the second output data memory address based on the end input data memory address and the first offset; and store the updated second output data memory address in the output data address register to overwrite the first output data memory address;

if the second output data memory address is high than the end input data memory address:

determine a second offset between the second output data memory address and the start input data memory address;

update the second output data memory address based on the start input data memory address and the second offset; and store the updated second output data memory address in the output data address register to overwrite the first output data memory address; and if the second output data memory address is between the start input data memory address and the end input data memory address, store the second output data memory address in the input data address register to overwrite the first output data memory address.

16. The neural network processor of claim 1, further comprising a configuration register configurable to store a loop count value, wherein the controller is configurable to:

receive a third instruction from the instruction buffer, in which the third instruction includes a loop start indicator, and a reference to the configuration register;

receive a fourth instruction from the instruction buffer;

execute the fourth instruction;

receive a fifth instruction from the instruction buffer, in which the fifth instruction including an end loop indicator; and responsive to the end loop indicator, repeat execution of the fourth instruction for a number of times based on the loop count value.

17. The neural network processor of claim 1, wherein the first and second instructions are associated with, respectively, a first program count (PC) value and a second PC value, and the controller is configurable to:

receive a third instruction from the instruction buffer, in which the third instruction includes an end indicator;

receive a fourth instruction from the instruction buffer, in which the fourth instruction includes a macro instruction indicator, a macro instruction PC value equals to the first PC value, and a repeat count value; and responsive to the macro instruction indicator and the end indicator, execute the first and second instructions for a number of times equal to the repeat count value.

18. The neural network processor of claim 1, wherein the controller is configurable to:

receive a third instruction from the instruction buffer;

extract a first instruction type indicator from the third instruction;

responsive to the first instruction type indictor, extract a first number of sub-instructions from the third instruction;

receive a fourth instruction from the instruction buffer;

extract a second instruction type indicator from the fourth instruction; and responsive to the second instruction type indictor, extract a second number of sub-instructions from the fourth instruction, in which the first and second numbers are different.

19. The neural network processor of claim 18, wherein the first instruction type indicator and the second instruction type indicator indicate different ones of: a first type of instruction including one sub-instruction, a second type of instruction including two sub-instructions, a third type of instruction including three sub-instructions, and a fourth type of instruction including five sub-instructions.

20. A method comprising:

receiving a first instruction from an instruction buffer of a neural network processor, the first instruction referring to an address register and including a first sub-instruction for fetching input data elements and a second sub-instruction for fetching weight elements;

responsive to the first instruction and based on content of the address register:

accessing a memory external to the neural network processor to fetch input data elements from the memory to an input data register of the neural network processor in response to the first sub-instruction; and fetching weight elements from a weights buffer of the neural network processor to a weights register of the neural network processor in response to the second sub-instruction;

receiving a second instruction from the instruction buffer; and responsive to the second instruction:

fetching the input data elements and the weight elements from, respectively, the input data register and the weights register to a computing engine of the neural network processor;

performing, using the computing engine, computation operations between the input data elements and the weight elements to generate output data elements; and storing the output data elements at an output data register of the neural network processor.

21. The method of claim 20, further comprising:

determining an input data memory address based on a circular addressing scheme; and fetching the input data elements from the memory by performing memory read operations using the input data memory address.

22. The method of claim 20, further comprising:

determining an output data memory address based on a circular addressing scheme; and storing the output data elements at the memory by performing memory write operations using the output data memory address.

23. A neural network processor comprising:

a memory interface;

an instruction buffer;

a weights buffer;

an input data register;

a weights register;

an output data register;

address registers;

an address generation engine configurable to set input data addresses, output data addresses, and weights addresses in the address registers;

a data load/store engine configurable to fetch input data from the memory interface to the input data register based on the input data addresses, fetch output data from the output data register to the memory interface based on the output data addresses, and fetch weights from the weights buffer to the weights register based on the weight addresses;

a computing engine configurable to perform computations based on the input data and the weights to generate the output data; and a controller configurable to, responsive to one or more instructions from the instruction buffer:

extract a first sub-instruction directed to the address generation engine to set one of the input data addresses or the output data addresses;

extract a second sub-instruction directed to the address generation engine to set the weights addresses;

extract a third sub-instruction directed to the computing engine to perform the computations;

extract a fourth sub-instruction directed to the data load/store engine to fetch the weights at the weight addresses of the weights buffer;

extract a fifth sub-instruction directed to the data load/store engine to fetch the input data at the input data addresses via the memory interface; and configure the address generation engine with the first and second sub-instructions, the computing engine with the third sub-instruction, and the data load/store engine with the fourth and fifth instructions in parallel.

24. The neural network processor of claim 23, wherein the one or more instructions include a first instruction and a second instruction, in which the first instruction has a different bit length from the second instruction.

* * * * *